(12) United States Patent
Henry et al.

(10) Patent No.: US 12,476,927 B2
(45) Date of Patent: Nov. 18, 2025

(54) USAGE SCENARIOS FOR UNIFIED MULTICHANNEL COMMUNICATION PLATFORM

(71) Applicant: Microsoft Technology Licensing, LLC, Redmond, WA (US)

(72) Inventors: Shawn P. Henry, Kirkland, WA (US); Juan Antonio Sanchez, Costa Mesa, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/537,750

(22) Filed: Dec. 12, 2023

(65) Prior Publication Data

US 2025/0193132 A1    Jun. 12, 2025

(51) Int. Cl.
*H04L 51/02* (2022.01)
*H04L 69/14* (2022.01)
*H04L 69/18* (2022.01)

(52) U.S. Cl.
CPC .............. *H04L 51/02* (2013.01); *H04L 69/14* (2013.01); *H04L 69/18* (2013.01)

(58) Field of Classification Search
CPC .......... H04L 51/02; H04L 69/14; H04L 69/18
See application file for complete search history.

(56) References Cited

U.S. PATENT DOCUMENTS

| | | |
|---|---|---|
| 2009/0319918 A1 | 12/2009 | Affronti et al. |
| 2013/0157626 A1 | 6/2013 | Talwar et al. |
| 2017/0279759 A1 | 9/2017 | Liden et al. |
| 2019/0020612 A1 | 1/2019 | Rosen et al. |
| 2020/0153918 A1 | 5/2020 | Laird-McConnell et al. |
| 2021/0044555 A1 | 2/2021 | Orr et al. |
| 2021/0406473 A1* | 12/2021 | Park .................. H04L 51/02 |
| 2022/0086108 A1 | 3/2022 | Higgins et al. |
| 2023/0043260 A1* | 2/2023 | Kiyanda ............ H04L 51/56 |
| 2023/0164096 A1 | 5/2023 | Annadata et al. |
| 2025/0193144 A1 | 6/2025 | Henry et al. |

OTHER PUBLICATIONS

International Search Report and Written Opinion dated Feb. 13, 2025, from International Patent Application No. PCT/US2024/055308, 14 pp.
International Search Report and Written Opinion dated Feb. 14, 2025, from International Patent Application No. PCT/US2024/055298, 14 pp.
Office Action dated Apr. 1, 2025, from U.S. Appl. No. 18/537,711, 21 pp.

* cited by examiner

*Primary Examiner* — Soe Hlaing
(74) *Attorney, Agent, or Firm* — Klarquist Sparkman, LLP

(57) ABSTRACT

Systems and techniques for facilitating unified multichannel communication are provided. The described systems and techniques improve communication technology through an encompassing, channel-agnostic approach which unifies disparate communication modes into a singular coherent thread. A unified multichannel communication ("UMC") service of a UMC platform can initialize a UMC thread for a UMC session, where the UMC thread can be used to facilitate unified multichannel communication. The UMC session can involve multiple participants, including human users and software agents (e.g., conversational bots, virtual agents, digital assistants, and other dialog interfaces). The UMC platform can facilitate creating and interacting with a digital assistant providing unified multichannel communication.

20 Claims, 33 Drawing Sheets

1660

1665 — Receive first communication message from a first participant, connected to a first communication channel of a set of multiple communication channels, to a software agent, connected to a second communication channel of the set of multiple communication channels, the first communication message being an event received from an event grid of the first communication channel, the event comprising a first participant channel identifier for the first communication channel and event data having a data type associated with a communication mode of the first communication channel, wherein the set of multiple communication channels comprises communication channels having different communication modes and associated data types

1670 — Process the event data of the first communication message

1675 — Determine the data type associated with the communication mode of the first communication channel

1680 — If the data type associated with the communication mode of the first communication channel is not a text data type, convert the event data to a text message

1685 — Add the event data of the first communication message, incorporating any conversion to text, to a UMC thread

1690 — if the data type associated with the communication mode of the first communication channel is different from a data type associated with a communication mode of the second communication channel, convert the event data to the data type associated with the communication mode of the second communication channel

1695 — providing the event data of the first communication message, incorporating any conversion to the data type associated with the communication mode of the second communication channel, to the second participant

FIG. 16C

USAGE SCENARIOS FOR UNIFIED MULTICHANNEL COMMUNICATION PLATFORM

BACKGROUND

Communication is of ever-growing importance within our modern world. We use a wide range of communication channels in our day-to-day lives. Communication channels are the medium through which messages between participants travel during the communication process. Examples of communication channels include, but are not limited to, communication channels for phone calls, text messages, emails, and social media messages. Challenges can arise when trying to manage communication between multiple participants and across many different communication channels.

SUMMARY

Systems and techniques for facilitating unified multichannel communication are provided. The described systems and techniques improve communication technology through an all-encompassing, channel-agnostic approach which unifies disparate communication modes into a singular coherent thread.

A unified multichannel communication service ("UMC") service of a UMC platform can initialize a UMC thread for a UMC session, where the UMC thread can be used to facilitate unified multichannel communication. The UMC session can involve multiple participants, including human users and software agents (e.g., conversational bots, virtual agents, digital assistants, and other dialog interfaces).

The UMC platform can facilitate creating and interacting with a digital assistant providing unified multichannel communication. An agent service can receive a request to create a digital assistant for a user, where the request includes an artifact and information associated with a set of parameters selected for the digital assistant. The request can also include, for each communication channel of a set of multiple communication channels, communication channel information and digital assistant configuration information. The set of multiple communication channels can include communication channels having different communication modes and associated data types. The artifact can include an image, a video, or a document (e.g., a fillable form). In some cases, the agent service may also be a UMC service.

The agent service can generate the digital assistant by processing the artifact and the information associated with the set of parameters. During the processing of the document and the information, the agent service can communicate with an artificial intelligence (AI) service to analyze the document and the information associated with the set of parameters; generate an AI prompt based on the analysis of the document and the information associated with the set of parameters; and train the digital assistant using the generated AI prompt.

A UMC service can initialize a UMC thread for a UMC session involving the digital assistant and a user. The UMC service can attach, to the UMC thread, a first communication channel having a first data type and a second communication channel having a second data type different than the first data type. Attaching the communication channels to the UMC thread can include retrieving, based on a thread identifier of the UMC thread, a thread metadata record for the UMC thread; storing, in the thread metadata record for the UMC thread, a first communication channel identifier for the first communication channel; and storing, in the thread metadata record for the UMC thread, a second communication channel identifier for the second communication channel. Attaching the communication channels to the UMC thread can also include storing, in the thread metadata record for the UMC thread, at least one identifier for the user and at least one user identifier for the digital assistant.

The UMC service can process a first communication message communicated over the first communication channel and a second communication message communicated over the second communication channel. In doing so, the thread metadata record continues to associate the digital assistant with the UMC thread even when the user switches between the first communication channel and the second communication channel. As part of the processing, the UMC service can receive the first communication message and add event data for the first communication message to the UMC thread. The UMC service can also receive the second communication message, convert event data for the second communication message from the second data type to the first data type, and add the converted event data for the second communication message to the UMC thread.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

BRIEF DESCRIPTION OF THE DRAWINGS

FIG. 5A illustrates an example process flow for initializing a UMC thread for a UMC session and FIG. 5B illustrates an example process flow for facilitating unified multichannel communication.

FIGS. 16A-16C illustrate an example process flow diagram for providing unified multichannel communication according to certain embodiments, where FIG. 16A illustrates an example process flow diagram for providing unified multichannel communication for a UMC session involving a software agent; FIG. 16B illustrates an example process flow diagram for creating a digital assistant providing unified multichannel communication; and FIG. 16C illustrates an example process flow diagram for interacting with a digital assistant providing unified multichannel communication.

DETAILED DESCRIPTION

Figure 1:
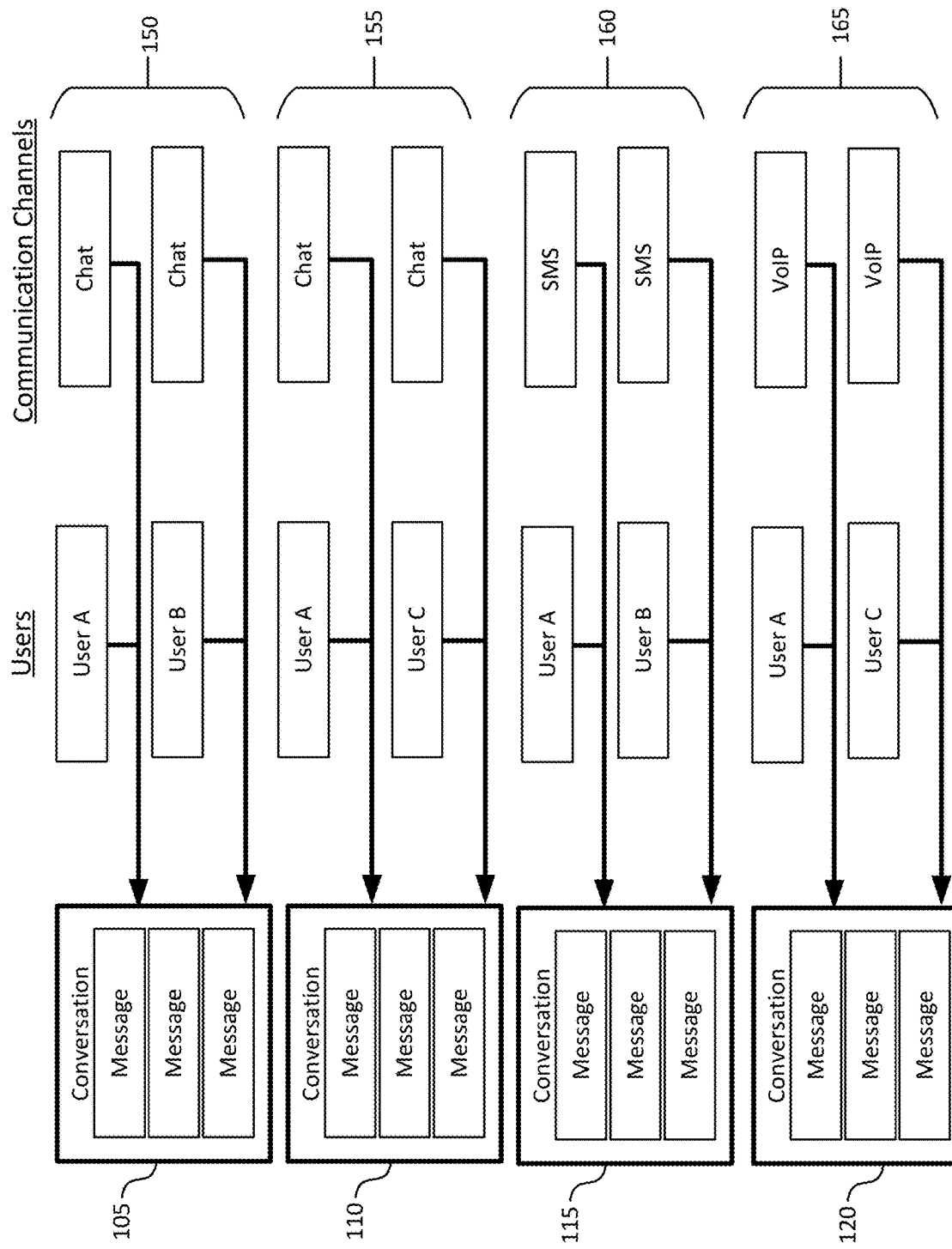
FIG. 1 illustrates an example data model for a conventional conversation API.

Systems and techniques for facilitating unified multichannel communication are provided. The described systems and techniques improve communication technology through an all-encompassing, channel-agnostic approach which unifies disparate communication modes into a singular coherent thread.

As previously described, there exists a variety of different communication channels through which a user can interact. Each communication channel has corresponding communication channel information. The communication channel information can include a communication mode and a data type associated with the communication mode. Each communication channel has a corresponding communication service. It should be noted that the terms "voice" and "audio" may be used interchangeably herein. The terms "channel" and "communication channel" may be used interchangeably herein. The terms "user" and "participant" may be used interchangeably herein.

One example of a communication channel includes a chat communication channel. A chat refers to the process of exchanging messages between two or more users in real-time (or near real-time) over the Internet or other network. The users interacting during a chat can include human users and software agents (e.g., bots). A bot can be a web application that has a conversational interface. Users connect to a bot through one of the communication channels. Examples of bots include, but are not limited to, conversational bots, virtual agents, digital assistants, and other dialog interfaces.

A chat communication channel can be connected to a chat communication service. The chat communication channel can have a chat message communication mode. The data type associated with the chat message communication mode for the chat communication channel can be a text data type, a video data type, or an audio data type.

Another example of a communication channel includes a calling communication channel. Calling communication channels can be of several different types, such as Voice Over IP ("VoIP"), Public switched telephone network ("PSTN"), video calls, and voice calls.

A PSTN call is a regular voice call trunked to the "plain old telephone system" (POTS) with a phone number. PSTN refers to the aggregate of the world's telephone networks that are operated by national, regional, or local telephony operators and used for voice-oriented communications. Anytime users interact with a traditional telephone number, calls are facilitated by PSTN voice calling.

VoIP refers to technology that allows a user to make voice calls using a broadband Internet connection instead of a regular (or analog) phone line. During a VoIP call, the voice data is trunked to a data interface, like a web browser. That is, when a user of an application calls another user of an application over an internet or data connection, the call is made over VoIP. Currently, in practice, many phone calls are VoIP for transport but are converted to PSTN at the 'last mile'.

In some cases, video calls are sometimes also called VoIP (where the "V" stands for video).

A calling communication channel can be connected to a calling communication service. The calling communication channel can have a variety of communication modes, such as a VoIP call communication mode ("VoIP calling communication channel"), a video call communication mode ("video calling communication channel"), or a voice call communication mode ("voice calling communication channel"). The data type associated with each of the communication modes for the calling communication channel can be an audio data type or a video data type.

Another example of a communication channel includes a Short Message Service ("SMS") communication channel. SMS is a text messaging service component of most telephone, Internet and mobile device systems. SMS uses standardized communication protocols that let mobile devices exchange short text messages. Text, images, videos, links, and documents can be sent using SMS.

An SMS communication channel can be connected to an SMS communication service. The SMS communication channel can have an SMS message communication mode. The data type associated with the SMS message communication mode for the SMS communication channel is a text data type, a video data type, or an audio data type.

Yet another example of a communication channel includes an email communication channel. Email communication refers to the exchange of short informational messages between at least two users over a computer network. Email messages can contain plain text, images, and document attachments and are delivered through email web-based services like Google Gmail, Microsoft Outlook, or Yahoo Mail.

An email communication channel can be connected to an email communication service. The email communication channel can have an email message communication mode. The data type associated with the email message communication mode for the email communication channel is a text data type.

Yet another example of a communication channel includes a social media communication channel. Social media communication can be of several different types, such as chat, video calls, and voice calls.

Social media communication refers to the means of interactions between users in which they create, share, and/or exchange ideas and information, including text and visuals, in virtual communities and networks. Examples of social media platforms include Facebook Messenger, YouTube, WhatsApp, and Instagram.

A social media communication channel can be connected to a social media communication service. The social media communication channel can have variety of communication modes, such as a voice call communication mode, a video call communication mode, or a chat message communication mode. The data type associated with each of the communication modes for the calling communication channel can be an audio data type, a video data type, or a text data type.

As discussed, interactions between multiple users (or participants) can take place across many different communication channels. For instance, during Business to Consumer ("B2C") interactions, employees and services can engage external customers using SMS messaging, voice, video, and text chat in browser and native apps.

As an example, voice and video calling communication channels can be used by a business to host customer voice and video calls to diagnose appliance issues and provide support to their customers. As another example, a business can use chat communication channels to add live chat to their website providing instant help, support, and sales to users looking at their products. As yet another example, business can use SMS communication channels to deliver and manage appointment reminders for call-outs to customers. As yet another example, social media communication channels can be used by a business to engage in conversation with a customer for product inquiry and customer service scenarios or send out messages like appointment reminders, shipping updates, two-factor authentication, and other notification scenarios.

During a single communication session or over a number of communication sessions, participants may move between different communication channels. As an illustrative example, a customer may begin their conversation with a company bot over chat on the company's website. Then, the conversation may move into a voice call. Further, there may be a follow up between the customer and the company at a later time over SMS and then a summary may be sent to the customer by email. In this example, the conversation takes place across four different communication channels.

Problems arise within communication technology when trying to manage these communications between multiple participants across many different communication channels. Typically, during a chat conversation, a chat thread is created, and messages are exchanged back and forth across that chat thread. Participants can be added to and removed from the chat thread, and at the end of the chat conversation, the chat thread can provide a transcript of that conversation.

Continuing with the illustrative example, during the conversation with the company bot over a text-based chat on the company's website, a chat thread would be created and the messages between the customer and the bot would be exchanged across that chat thread. At the end of the chat conversation, the chat thread can provide a transcript of that conversation. However, using current available communication technologies, it would not be possible for the customer to switch to a voice call and still continue the same chat conversation with the bot. The chat thread created during the text-based chat would not be able to maintain any context from the voice call between the customer and the bot.

These two interactions (the text-based chat and the voice call) would be separate interactions and are not connected in any way. Here, the context from each separate interaction does not persist across communication channels. The identity of the customer is also not persisted across these separate interactions and communication channels.

Additionally, since the two interactions within the same conversation are separate and not connected in any way, there is no way for AI or telemetry to draw insights across the entire conversation.

The described unified multichannel communication platform enables conversations between multiple users (e.g., humans and bots) and across multiple communications channels (e.g., chat, SMS, phone call, IVR, and chatbot) using a chat message thread model. Advantageously, using a UMC thread allows a single endpoint to be targeted for multiple communication channels. That is, other communication channels, such as communication channels for SMS, voice and video calls, email, and social media, can be created and attached to the UMC thread and interfaced with. The conversation can flow and move asynchronously between communication channels, for example starting on chat and moving to voice call or SMS, then back to chat or email. The conversation is persisted long-term so the conversation can be resumed and manipulated at any time, can be accessed by multiple users and bots, and is stored in a compliant data store. The persistence of the UMC thread also allows for bot automation and AI enhancements to be added in a single location and through a single API.

Approaches described herein provide technical solutions to technical problems in managing communication between multiple participants and across many different communication channels. The technical solutions use an encompassing, channel-agnostic approach which unifies disparate communication modes into a singular coherent UMC thread. The UMC thread allows a single endpoint to be targeted for multiple communication channels. Communication channels, such as communication channels for SMS, voice and video calls, email, and social media, can be created and attached to the UMC thread and interfaced with.

Thus, the approaches described herein provide several technical advantages.

For example, the approaches enable a conversation to flow and move asynchronously between communication channels, for example starting on chat and moving to voice call or SMS, then back to chat or email. Typically, these two interactions (the text-based chat and the voice call) would be separate interactions and not connected in any way because the identity of the participants and the context from each separate interaction do not persist across communication channels.

The approaches allow multiple users to be bound to a conversation object through different types of communication channels. Messages can pass through those communication channels and can be persisted long-term with the conversation object.

As another example, since the UMC thread is persisted long-term in a compliant data store, the UMC session can be resumed at any time (e.g., many days, months, or even years later). When the customer continues a conversation later, the conversation is not a cold start conversation. Advantageously, the UMC thread can include historical information from past conversations (e.g., the chat conversation between the customer and the bot and the voice call conversation between the customer and the human agent). The historical information can be brought in to have a more valuable, more insightful, and more meaningful conversation.

As another example, the persistence of the UMC thread allows for bot automation and AI enhancements to be added in a single location and through a single API. Typically, since two interactions within the same conversation are separate and not connected in any way, there is no way for AI or telemetry to draw insights across the entire conversation. Through the described approaches, the entire conversation can be enriched with additional data. For example, AI or telemetry can be used to draw insights across the entire conversation.

FIG. 1 illustrates an example data model for a conventional conversation API. In an example data model for a conventional conversation API, each interaction between users is considered a distinct interaction; and each distinct interaction is associated with a separate conversation object.

Referring to FIG. 1, an example data model for a conventional conversation API can include conversation objects (e.g., conversation object 105, conversation object 110, conversation object 115, and conversation object 120), users (e.g., User A, User B, and User C), and communication channels (e.g., a chat communication channel, an SMS communication channel, and a VoIP communication channel).

Each conversation object stores information for an interaction (e.g., interaction 150, interaction 155, interaction 160, and interaction 165) between users over a communication channel. In the illustrative example, conversation object 105 corresponds to interaction 150, conversation object 110 corresponds to interaction 155, conversation object 115 corresponds to interaction 160, and conversation object 120 corresponds to interaction 165.

Here, interaction 150 is between User A and User B over the chat communication channel, interaction 155 is between User A and User C over the chat communication channel, interaction 160 is between User A and User B over the SMS communication channel, and interaction 165 is between User A and User C over the VoIP communication channel.

In an example where User A is a customer and User B is a Bot for a company, User A can start a conversation with User B on a chat UI of a website. This conversation between User A and User B over a chat communication channel can be shown as interaction 150 and the conversation would be stored within conversation object 105.

Continuing with the example, User A can then decide they would like to speak to a live agent. User A can call a phone number for the company and start a conversation with a live agent (User B). This conversation between User A and User C is over a VoIP communication channel and can be shown as interaction 165. Here, this conversation between User A and User C would be stored within conversation object 120.

In this illustrative example, even though User B and User C are from the same company, each of these interactions (interaction 150 and interaction 165) are separate and distinct interactions and are not connected. That is, the call (between User A and User C) would not have any context from the chat messages between User A and User B because the identities of the users are not persisted across these two interactions. Thus, even if User A calls a live agent from the same company, and even if User A just had an interaction with the bot (User B) on the company's website, User C would have to ask for the same information over again (e.g., what is your name and what is your account number?).

Figure 2:
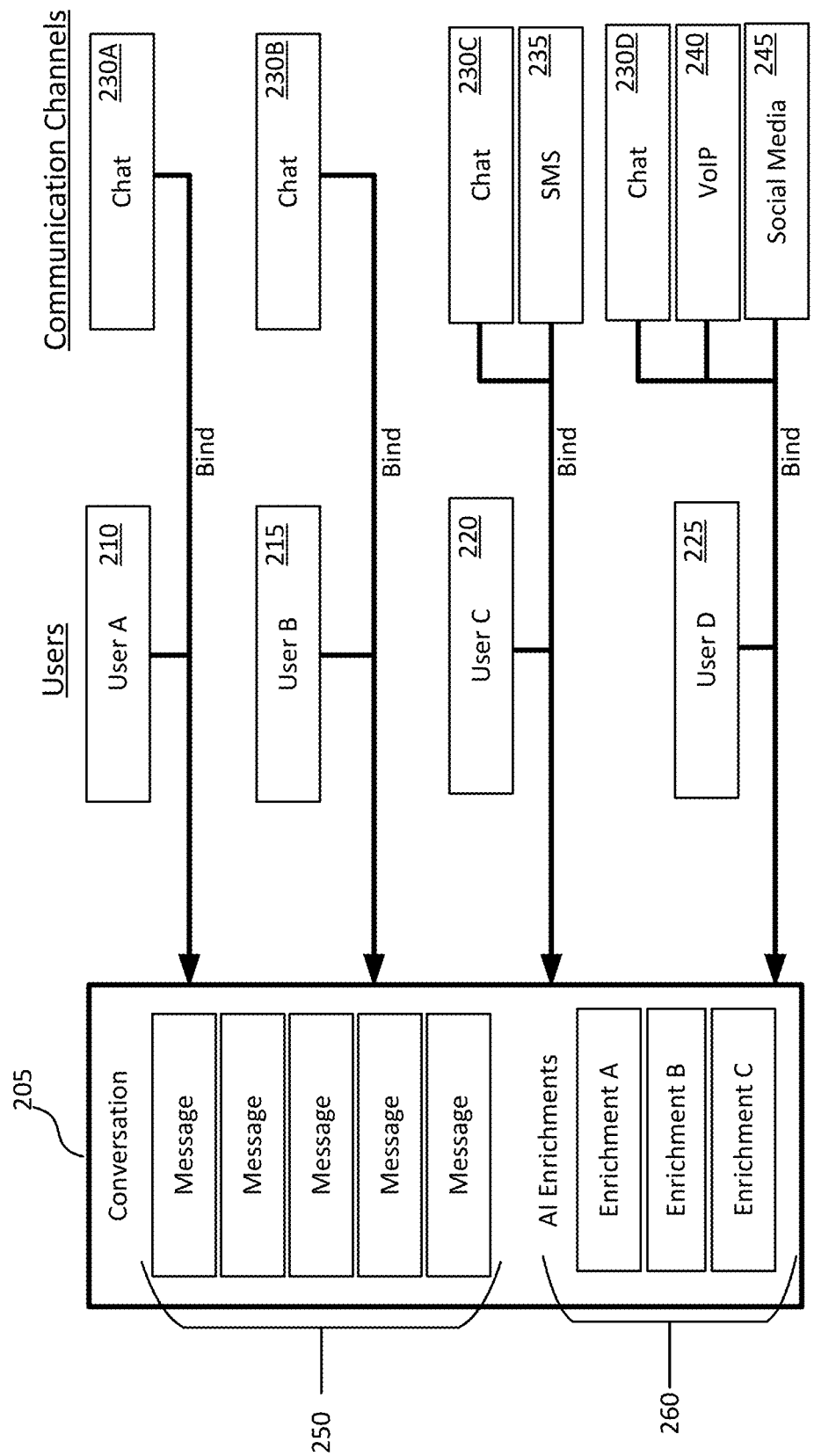
FIG. 2 illustrates an example data model for a UMC API.

FIG. 2 illustrates an example data model for a UMC API. Referring to FIG. 2, in an example data model for the UMC API, a conversation object is bound by a communication channel to a user and messages can pass through those communication channels. The example data model for the UMC API enables conversations between multiple users (e.g., humans and bots) and across multiple communications channels (e.g., a chat communication channel, an SMS communication channel, a calling communication channel, and a chatbot) to manifest with a single conversation object. Additionally, the example data model for the UMC API allows for the addition of AI enhancements and bot automation.

Referring to FIG. 2, an example data model for a UMC API can include a conversation object (e.g., conversation object 205), users (e.g., User A 210, User B 215, User C 220, and User D 225), and communication channels (e.g., a chat communication channel 230, an SMS communication channel 235, a VoIP communication channel 240, and a social media communication channel 245).

In some example implementations, a UMC thread is implemented using a thread metadata record for the UMC thread and a thread content record for the UMC thread. The thread metadata record includes information about communication channels associated with the UMC thread, where each of the communication channels is identified by a communication channel identifier. For example, the thread metadata record includes a list of communication channel identifiers. The thread metadata record also includes information about users associated with the UMC thread, where a given user is identified by a user identifier. The list of users can be organized by communication channels (e.g., with channel-specific user identifiers for the users of a given communication channel). The thread content record includes messages recorded on the UMC thread. Together, the thread metadata record for the UMC thread and the thread content record for the UMC thread, possibly in combination with one or more other databases that store information about communication channels and users, can provide a conversation object.

In such example implementations, a UMC thread itself has a thread identifier. A UMC service maintains a database of thread metadata records for UMC threads. For example, the UMC service maintains a hash table of thread metadata records for different UMC threads. For a given hash category of the hash table, the hash table has a list of thread metadata records for UMC threads having thread identifiers that hash to the given hash category.

In such example implementations, the UMC service, or another service such as a chat service, also maintains a database of thread content records for UMC threads, organized by thread identifier. For example, the database of thread content records can be a hash table of thread content records for different UMC threads. For a given hash category of the hash table, the hash table has a list of thread content records for UMC threads having thread identifiers that hash to the given hash category. The database of thread content records can be at a separate location from the database of thread metadata records. A thread content record for a UMC thread stores event data for messages in the UMC thread.

In such example implementations, to "initialize" a new UMC thread for a UMC session, the UMC service creates a new thread metadata record for the new UMC thread, which has a thread identifier. The UMC service adds the thread metadata record for the new UMC thread to the database of thread metadata records. The UMC service also creates, or causes another service to create, a thread content record for the new UMC thread. The UMC service adds, or causes another service to add, the thread content record for the new UMC thread to the database of thread content records.

In such example implementations, to "attach" a new communication channel to a UMC thread, the UMC service retrieves the thread metadata record for the UMC thread and adds a communication channel identifier for the new communication channel to the thread metadata record. When a new UMC thread is initialized, one or more communication channels can be attached to the new UMC thread at the same time, adding communication channel identifier(s) for the channel(s) to the thread metadata record for the UMC thread. Conversely, to "remove" a communication channel from a UMC thread, the UMC service retrieves the thread metadata record for the UMC thread and deletes the channel identifier for that communication channel from the thread metadata record.

In such example implementations, to "add" a user to a UMC thread or communication channel of the UMC thread, the UMC service retrieves the thread metadata record for the UMC thread and adds a user identifier for the new user to the thread metadata record at the appropriate location (e.g., adding a channel-specific user identifier in association with a given communication channel to which the user is added). When a new UMC thread is initialized, one or more users can be added to the new UMC thread at the same time, adding user identifier(s) for the user(s) at appropriate location(s) in the thread metadata record for the UMC thread. Conversely, to "remove" a user from a UMC thread, the UMC service retrieves the thread metadata record for the UMC thread and deletes the user identifier for that user from the thread metadata record.

In such example implementations, the UMC service subscribes to events on communication channels that have been added to a UMC thread. The respective communication channels, in turn, can subscribe to receive relevant events from the UMC service. When the UMC service receives a communication message for an event from a communication channel, the UMC service can process (or cause another service to process) event data for the message (e.g., using conversion operations, as described below) then add the event data to the UMC thread. To "add" the event data to the UMC thread, the UMC service (or another service at the direction of the UMC service) retrieves the thread content record for the UMC thread and stores the event data in the thread content record for the UMC thread.

In such example implementations, the UMC service can also maintain a database of information about communication channels. For example, each of the communication channels includes communication channel information. The communication channel information can include a communication channel identifier, a communication mode, and one or more associated data types for each communication channel of the set of communication channels. The communication channel information can also include communication channel metadata. For example, the communication channel metadata can include information indicating whether a phone number can handle SMS (e.g., a mobile number versus a landline number).

In such example implementations, the UMC service can also maintain one or more databases of information about users. A database can store channel-specific user information. For example, each of the users has a channel-specific user identifier (also called a participant channel identifier) associated with each communication channel through which the user is communicating. For example, a channel-specific user identifier for an SMS communication channel could include a phone number of the user, a channel-specific user identifier for an email communication channel could include an email address of the user, a channel-specific user identifier for a calling communication channel could include a same or different phone number for the user, and a channel-specific user identifier for a social media communication channel could include social media identifier for the user. A database can also store information that associates or links, for a given user, different channel-specific user identifiers for the given user. For example, a channel-independent user identifier for the given user can be used to associate different channel-specific user identifiers with the given user. Using information that associates different channel-specific user identifiers with the given user, messages from the given user on different channels (having different channel-specific user identifiers) can be recorded or presented in a way that attributes the messages to the given user.

In the illustrative example of FIG. 2, User A 210 and User B 215 are connected to the chat communication channel 230 (chat communication channel 230A and chat communication channel 230B, respectively). User C 220 is connected to both the chat communication channel 230C and the SMS communication channel 235. User D 225 is connected to the chat communication channel 230D, the VoIP communication channel 240, and the social media communication channel 245.

Unlike the data model for a conventional conversation API, as described with respect to FIG. 1, all disparate interactions between the users are associated with a single conversation object. Indeed, any messages (e.g., messages 250) sent by the users are stored within the conversation object 205.

For example, one of the messages 250 may be a message sent by User C 220 (connected to the SMS communication channel 235) to User A 210 (connected to the chat communication channel 230A). Another one of the messages 250 may be a message sent by User D 225 (connected to the VoIP communication channel 240) to User A 210 (connected to the chat communication channel 230A).

The persistence of the conversation object 205 also allows for bot automation and AI enhancements or enrichments (e.g., AI enrichments 260) to be added in a single location and through a single API. Here, the entire conversation can be enriched with additional data. For example, AI or telemetry can be used to draw insights across the entire conversation.

AI enrichments 260 can be enrichments relating to, for example, emotional sentiment, providing summarization and insights, or analyzing images to recognize objects or faces.

Figure 3:
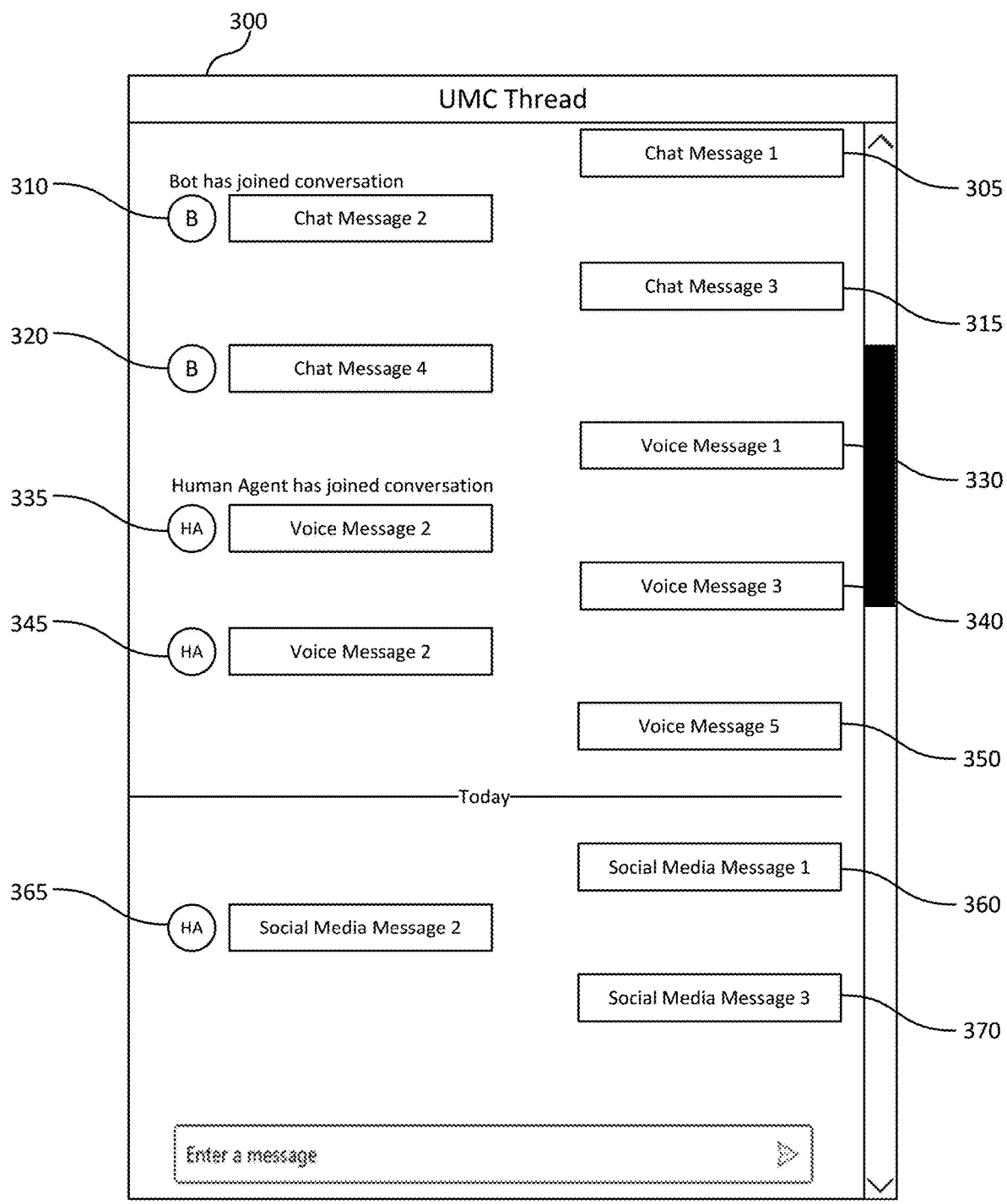
FIG. 3 illustrates an example user interface displaying a list of messages from a UMC thread.

FIG. 3 illustrates an example user interface displaying a list of messages from a UMC thread. Referring to FIG. 3, an example UI 300 can display a list of messages between a customer and a company during a UMC session as a long, single, communication channel-agnostic UMC thread.

Participants of the UMC session can include a customer, a customer agent bot ("bot") provided by a company, and a human agent employed by the company. In an example scenario, a customer can reach out to the company by starting a chat conversation with a bot through a UI 300 on the company's website.

When the customer starts the chat conversation (and thus, the UMC session), a UMC thread can be initialized as a thread metadata record having a thread identifier within a UMC thread data resource, which includes a database of thread metadata records for UMC threads, and as a thread content record having the thread identifier within the UMC thread data resource. The thread metadata record for the UMC thread can include a list of communication channel identifiers for communication channels attached to the UMC thread.

The thread metadata record for the UMC thread can also include, for each participant of the UMC thread, a channel-specific user identifier associated with each communication channel in which that participant participates. For example, a channel-specific user identifier for an SMS communication channel could include a phone number of the user, a channel-specific user identifier for an email communication channel could include an email address of the participant, a channel-specific user identifier for a calling communication channel could include a same or different phone number for the participant, and a channel-specific user identifier for a social media communication channel could include social media identifier for the participant.

Anytime a participant and/or a communication channel is added or attached to the UMC thread, the thread metadata record for the UMC thread is updated to include the corresponding communication channel identifier and/or participant channel identifier.

When messages are exchanged between participants, a message comes in through a communication channel (having a communication channel identifier) and is also associated with a channel-specific user identifier for the participant who sent the message. Using the communication channel identifier and the channel-specific user identifier, the message can be added to the UMC thread. For example, the UMC service receives an event for the message from a communication channel service and determines a thread identifier for a UMC thread to which the message should be added (e.g., using a thread identifier in the event, or using information associated with the event to find the UMC thread, or using a communication channel identifier and/or user identifier for the event to find the UMC thread). If appropriate, the UMC service or another service can perform conversion operations on event data for the message (e.g., converting audio to text). The UMC service (or another service to which event data for the message has been passed) retrieves the thread content record for the UMC thread and stores event data for the message in the thread content record.

In the illustrative example of FIG. 3, the user can communicate with a customer agent bot ("bot") provided by the company. Here, the conversation between the user and the bot is a chat conversation over a communication channel having a chat communication mode.

Through the UI 300, the bot and the user exchange chat messages (e.g., chat message 1 305 (from user), chat message 2 310 (from bot), chat message 3 315 (from user), and chat message 4 320 (from bot)) through text data.

At some point during the chat conversation, the user decides to change to a different communication mode. For example, the customer can send a message asking the bot to have a human agent call the customer so they can continue the conversation through a voice call with a live person.

While the customer and the human agent are interacting over a voice call, the audio data can be converted to text data and added to the UMC thread as messages. Advantageously, through the UI 300, the customer can see a transcript of the phone call as messages (e.g., voice message 1 330 (from customer), voice message 2 335 (from bot), voice message 3 340 (from customer), voice message 4 345 (from bot), and voice message 5 350 (from customer) in the UMC thread. Not only can the customer see the transcript of the phone call as messages in the UMC thread, but the customer can interact with the UMC thread while on the phone call (e.g., by also having their browser window open with UI 300 displayed).

After a period of time, the customer can continue the conversation with the company. The customer can reach out to the company (either the bot or the human agent) through one of the company's social media communication channels. For example, the customer may contact the company through a WhatsApp message using the company's phone number.

In the illustrative example of FIG. 3, the customer and the human agent exchange social media chat messages. Each of the social media chat messages are added to the UMC thread as messages (e.g., social media message 1 360 (from user), social media message 2 365 (from human agent), and social media message 3 370 (from user))

Since the UMC thread is persisted long-term in a compliant data store, the UMC session can be resumed at any period of time later (e.g., many days, months, or even years later). When the customer continues a conversation at a later date, the conversation is not a cold start conversation. Advantageously, the UMC thread can include historical information from past conversations (e.g., the chat conversation between the customer and the bot and the voice call conversation between the customer and the human agent). The historical information can be brought in to have a more valuable, more insightful, and more meaningful conversation.

Figure 4:
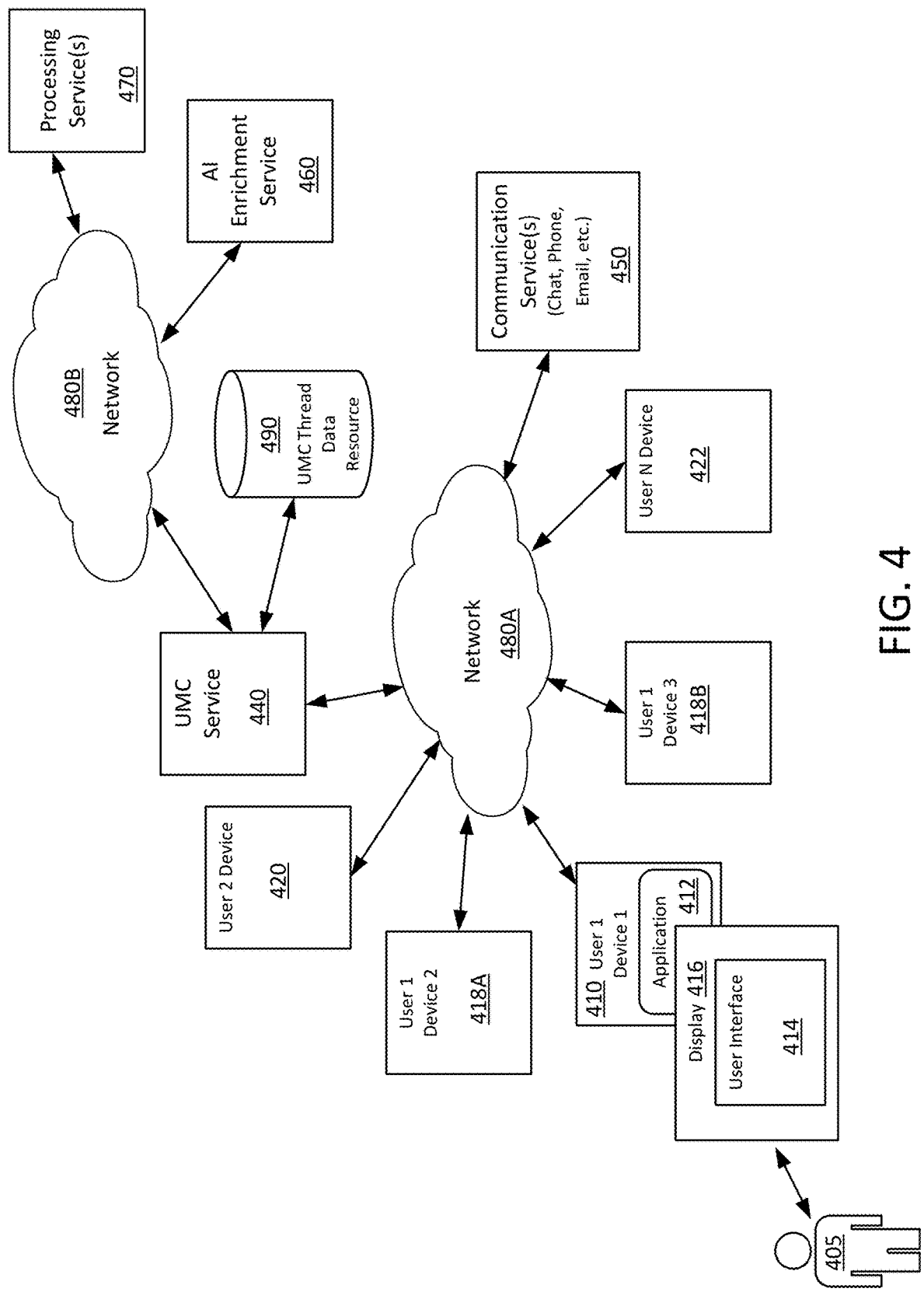
FIG. 4 illustrates an example operating environment in which various embodiments of the invention may be practiced.

FIG. 4 illustrates an example operating environment in which various embodiments may be practiced. Referring to FIG. 4, an example operating environment may include users (e.g., user 405), one or more user computing devices (e.g., user computing device 410 running an application 412, such as a chatbot application, through a UI 414 displayed on a display 416 associated with the computing device 410, a second user computing device 418A of the same user 1 (user 1), a third user computing device 418B of the same user 1 (user 1), a user 2 computing device 420 and a user N computing device 422), one or more services (e.g., UMC service 440, communication service(s) 450, AI enrichment service 460, and processing service(s) 470), and a network 480 (e.g., network 480A and network 480B).

The user computing device 410 can be, but is not limited to, a personal computer (e.g., desktop computer), laptop, personal digital assistant (PDA), video game device, mobile phone (or smart phone), tablet, slate, terminal, an interactive whiteboard, and the like. It should be apparent that the user computing device 410 may be any type of computer system that provides its user the ability to load and execute software programs and the ability to access a network, such as network 480. The second device 418A and third device 418B may include the same types of devices (or systems) as user computing device 410 and they may or may not be of a same form. For example, a user 405 may have a laptop, a tablet, and a smart phone as the three devices.

User 2 computing device 420 and user N computing device 422 may include the same types of devices (or systems) as user computing device 410 and they may or may not be of a same form.

A computing device (e.g., the user computing device 410) is configured to receive input from a user (e.g., user 405) through, for example, a keyboard, mouse, trackpad, touch pad, touch screen, microphone, or other input device. The display 416 of the user computing device 410 is configured to display one or more user interfaces (including UI 414) to the user 405.

The UI 414 enables a user to interact with various applications, such as application 412, running on or displayed through the user computing device 410. Generally, UI 414 is configured such that a user may easily interact with functionality of an application. For example, a user may simply select (via, for example, touch, clicking, gesture or voice) an option within UI 414 to perform an operation such as sending a message in an application 412.

In some cases, the user 405 may have multiple devices running a similar program and the user 405 can view and interact with a same or different UMC thread (or other content) across multiple user computing devices (such as second device 418A and/or third device 418B).

In some cases, the user computing device 410 (as well as the second device 418A and the third device 418B) may communicate with one or more other user computing devices (e.g., user 2 computing device 420 and user N computing device 422).

Components (computing systems, services, storage resources, and the like) in the operating environment may operate on or in communication with each other over the network 480. The network 480 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 480 may include one or more connected networks (e.g., a multi-network environment) including public networks, such as the Internet, and/or private networks such as a secure enterprise private network. Access to the network 480 may be provided via one or more wired or wireless access networks as will be understood by those skilled in the art.

As will also be appreciated by those skilled in the art, communication networks can take several different forms and can use several different communication protocols. Certain embodiments can be practiced in distributed-computing environments where tasks are performed by remote-processing devices that are linked through a communications network. In a distributed-computing environment, program modules can be located in both local and remote computer-readable storage media.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

The application 412 can be stored on the user computing device 410 (e.g., a client-side application). In another embodiment, the user 405 may access a web-based application (e.g., running on a server or hosted on a cloud) using a web browser (e.g., a standard internet browser), and the application's interface may be displayed to the user 405 within the web browser. Thus, the application may be a client-side application and/or a non-client side (e.g., a web-based) application.

The UMC service 440 can manage a live transcript of an entire conversation through a UMC thread. That is, the UMC service 440 can manage communication channels and interactions with the communication channels during a UMC session. The UMC service 440 can manage the communication channels using a single UMC API. The UMC API consolidates the communication channels having disparate communication modes into a singular coherent UMC thread to allow for a single endpoint to be targeted.

The UMC thread is persisted long-term in a compliant data store (e.g., data resource 490). Since the UMC thread is persisted long-term, the conversation can be resumed at any time (even many days/months later). The data resource 490 can be a compliant users data store. Thus, there are no issues with a variety of data policies, such as retention, geolocation, and user access.

Data resource 490 can include thread metadata records and thread content records for a plurality of UMC threads. Each UMC thread can be stored as a thread metadata record and thread content record having a thread identifier within the data resource 490. Each thread metadata record can include a list of communication channel identifiers for the respective communication channels attached to the UMC thread. A thread metadata record can include other communication channel information for each communication channel including a communication mode, one or more associated data types, and communication channel metadata. For example, the communication channel metadata can include information indicating whether a phone number can handle SMS (e.g., a mobile number versus a landline number).

Each UMC thread metadata record can also include, for each participant of the UMC session, a channel-specific user identifier (also called a participant channel identifier) associated with each communication channel. For example, a participant channel identifier for an SMS communication channel could include a phone number of the user, a participant channel identifier for an email communication channel could include an email address of the participant, a participant channel identifier for a calling communication channel could include a same or different phone number for the participant, and a participant channel identifier for a social media communication channel could include social media identifier for the participant.

Anytime a participant and/or a communication channel is added or attached to the UMC thread, the thread metadata record for the UMC thread is updated to include the corresponding communication channel identifier and/or participant channel identifier.

When messages are exchanged between participants, a message comes in through a communication channel (having a communication channel identifier) with a participant channel identifier. Using the communication channel identifier and the participant channel identifier, the message can be added or attached to the UMC thread. For example, the thread identifier for the UMC thread can be found using the communication channel identifier and the participant channel identifier, the thread content record for the UMC thread can be retrieved using the thread identifier for the UMC thread, and event data for the message can be stored in the thread content record for the UMC thread.

In some cases, UMC thread content (e.g., message content and AI enrichment content) can be stored as part of a thread content record in a data resource separate from data resource 490 storing the thread metadata record. The separate data resource can be a repository of content for each UMC thread. The UMC thread content can be organized, in thread content records, by thread identifier within the separate data resource. In this case, when the UMC service 440 receives a communication message, event data for the communication message is sent to the separate data resource to be stored with the corresponding UMC thread.

The communication service(s) 450 can include, for example, a chat communication service, a calling communication service, an SMS communication service, an email communication service, a social media communication service.

The processing service(s) 470 can be services that are used to process incoming and outgoing messages. Examples of processing service(s) include, but are not limited to, services for speech-to-text processing, text-to-speech processing, call automation, translation, image recognition, image analysis, document analysis.

The AI enrichment service 460 can include, for example, cloud-based AI services and can provide AI enrichments to a UMC thread. The AI enrichment service 460 can provide machine learning capabilities for analyzing text for emotional sentiment, providing summarization and insights, or analyzing images to recognize objects or faces.

The AI enrichment service 460 can be a generative AI service and include a large language model (LLM). An LLM is a type of generative AI that can understand and generate human-like text, while multi-model generative AI extends this capability to generate a variety of media types, including text, images, audio, video, etc., allowing for more diverse and versatile content creation. In generative AI, such as LLMs, a prompt serves as an input or instruction that informs the AI of the desired content, context, or task, allowing users to guide the AI's text generation to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided to LLMs to generate responses. Prompts in LLMs can be initial input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Users can experiment with prompt variations to manipulate output, using techniques like prefixing, temperature control, top-K sampling, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

In some cases, the processing service(s) 470 and the AI enrichment service 460 may be a same service.

In operation, the UMC service 440 can implement various operations to initialize a UMC thread, update metadata for the UMC thread, and update content in the UMC thread. For example, the UMC service 440 receives a request for a UMC session and, responsive to the request, initializes a UMC thread for the UMC session. To initialize the UMC thread, the UMC service 440 can create a thread metadata record for the UMC thread and a thread content record for the UMC thread. The thread metadata record for the UMC thread is configured to store (a) information about any communication channels attached to the UMC thread as well as (b) information about users of any communication channels attached to the UMC thread. The UMC service 440 can add the thread metadata record for the UMC thread to a database of thread metadata records for different UMC threads, such as a database stored in the UMC thread data resource 490. The thread content record for the UMC thread is configured to store event data for messages on any communication channels attached to the UMC thread. The UMC service 440 can add the thread content record for the UMC thread to a database of thread content records for the different UMC threads, such as a database stored in the UMC thread data resource 490 or elsewhere.

As another example, to attach a communication channel to the UMC thread, the UMC service 440 can retrieve, based on a thread identifier of the UMC thread, a thread metadata record for the UMC thread and store, in the thread metadata record for the UMC thread, a communication channel identifier for the communication channel. In this way, the UMC service 440 can attach an arbitrary number of communication channels to the UMC thread. A given communication channel can have the same data type or different data type, compared to another communication channel. Thus, for example, the UMC service 440 can attach, to a UMC thread, a first communication channel having a first data type and a second communication channel having a second data type different than the first data type. In this case, the UMC service 440 stores, in the thread metadata record for the UMC thread, a first communication channel identifier for the first communication channel and a second communication channel identifier for the second communication channel.

When attaching a communication channel to the UMC thread, the UMC service 440 can perform other operations. For example, the UMC service 440 can store, in the thread metadata record for the UMC thread, a user identifier for each user communicating over the communication channel. As another example, the UMC service 440 can subscribe to events on the communication channel from a communication service 450 associated with the communication channel.

After a UMC thread has been initialized and a communication channel has been attached to the UMC thread, the UMC service 440 can receive communication messages communicated over the communication channel. For example, the UMC service 440 can receive an event representing a communication message and retrieving event data for the event from a communication service associated with the communication channel.

In response to receiving a communication message communicated over a communication channel, the UMC service 440 can add event data for the communication message to the UMC thread. For example, based on the thread identifier of the UMC thread, the UMC service 440 retrieves, from the database of thread content records, the thread content record for the UMC thread. The UMC service 440 stores, in the thread content record for the UMC thread, the event data for the communication message.

If appropriate, the UMC service 440 can convert event data between data types. For example, suppose the thread content record for the UMC thread stores data of a first data type (such as text), but the event data for a communication message has a second data type (such as audio) different than the first data type. The UMC service 440 converts the event data for the communication message from the second data type to the first data type. In this case, the event data that is added to the UMC thread is the converted event data for the communication message. To convert event data between data types, the UMC service 440 can send the event data to a processing service 470 and receive the converted event data from the processing service 470. The converted event data for a communication message can also be sent over one or more communication channels associated with the data type of the converted event data.

A user device can perform operations to render event data (or converted event data) for communication messages to a window on a display device. For example, the window is associated with the UMC thread. Event data for the communication messages is rendered in a data type associated with the UMC thread. Alternatively, the window can be associated with a chat communication channel. In this case, event data for the communication messages is rendered in a data type associated with the chat communication channel.

The UMC service 440 can remove (detach) a communication channel from a UMC thread. For example, based on the thread identifier of the UMC thread, the UMC service 440 retrieves, from the database of thread metadata records, the thread metadata record for the UMC thread. The UMC service 440 removes, from the thread metadata record, the communication channel identifier for the to-be-removed communication channel and also removes, from the thread metadata record, the user identifier for each user communicating over the communication channel.

Similarly, the UMC service 440 can add or remove a user to a communication channel. To add a new user, the UMC service 440 can, based on the thread identifier of the UMC thread, retrieve, from the database of thread metadata records, the thread metadata record for the UMC thread and store, in the thread metadata record, a user identifier for the new user. To remove a user, the UMC service 440 can, based on the thread identifier of the UMC thread, retrieve, from the database of thread metadata records, the thread metadata record for the UMC thread and remove, from the thread metadata record, the user identifier for the to-be-removed user.

Figure 5A:
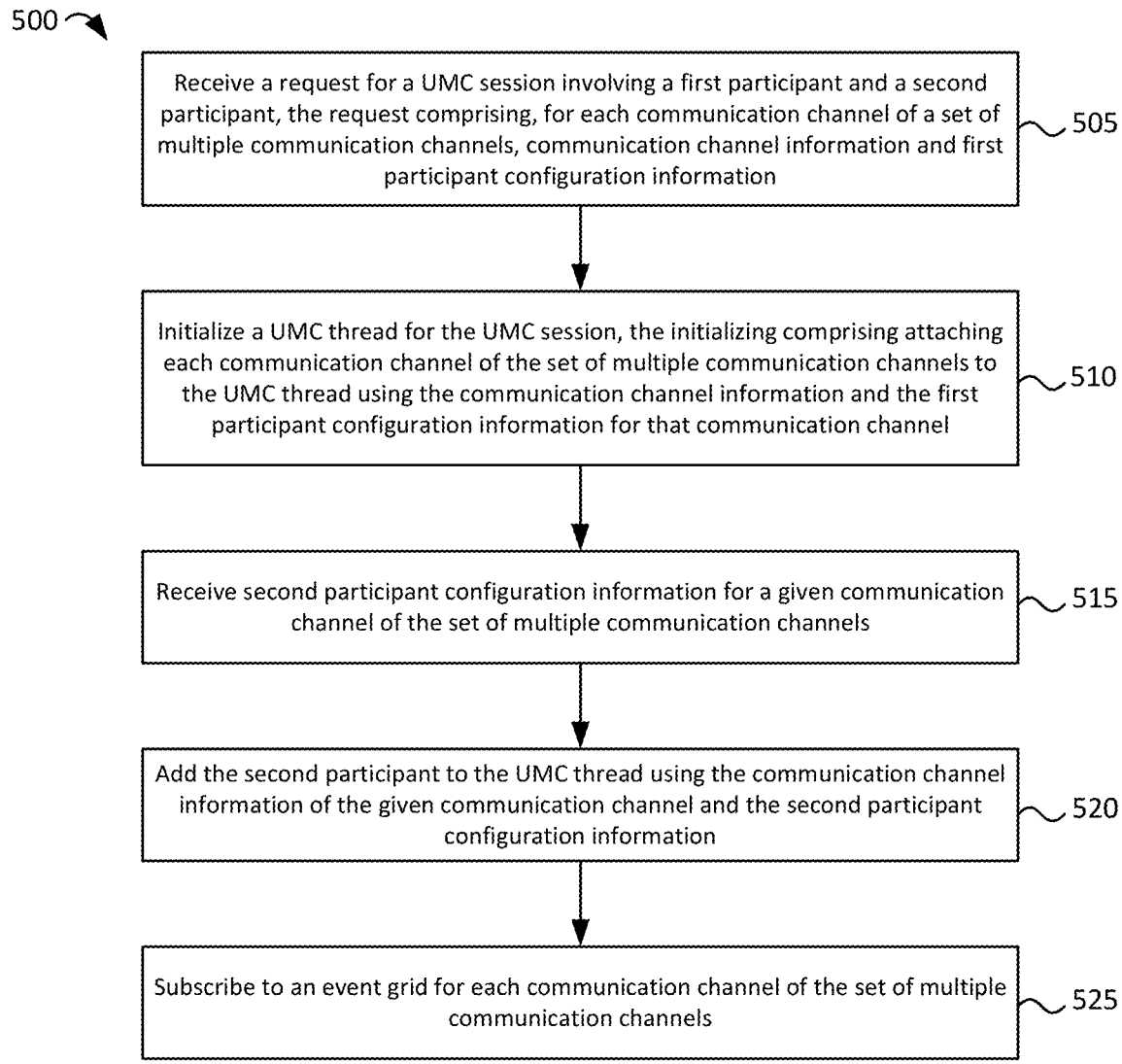
FIGS. 5A and 5B illustrate example process flow diagrams according to certain embodiments, where
Figure 5B:
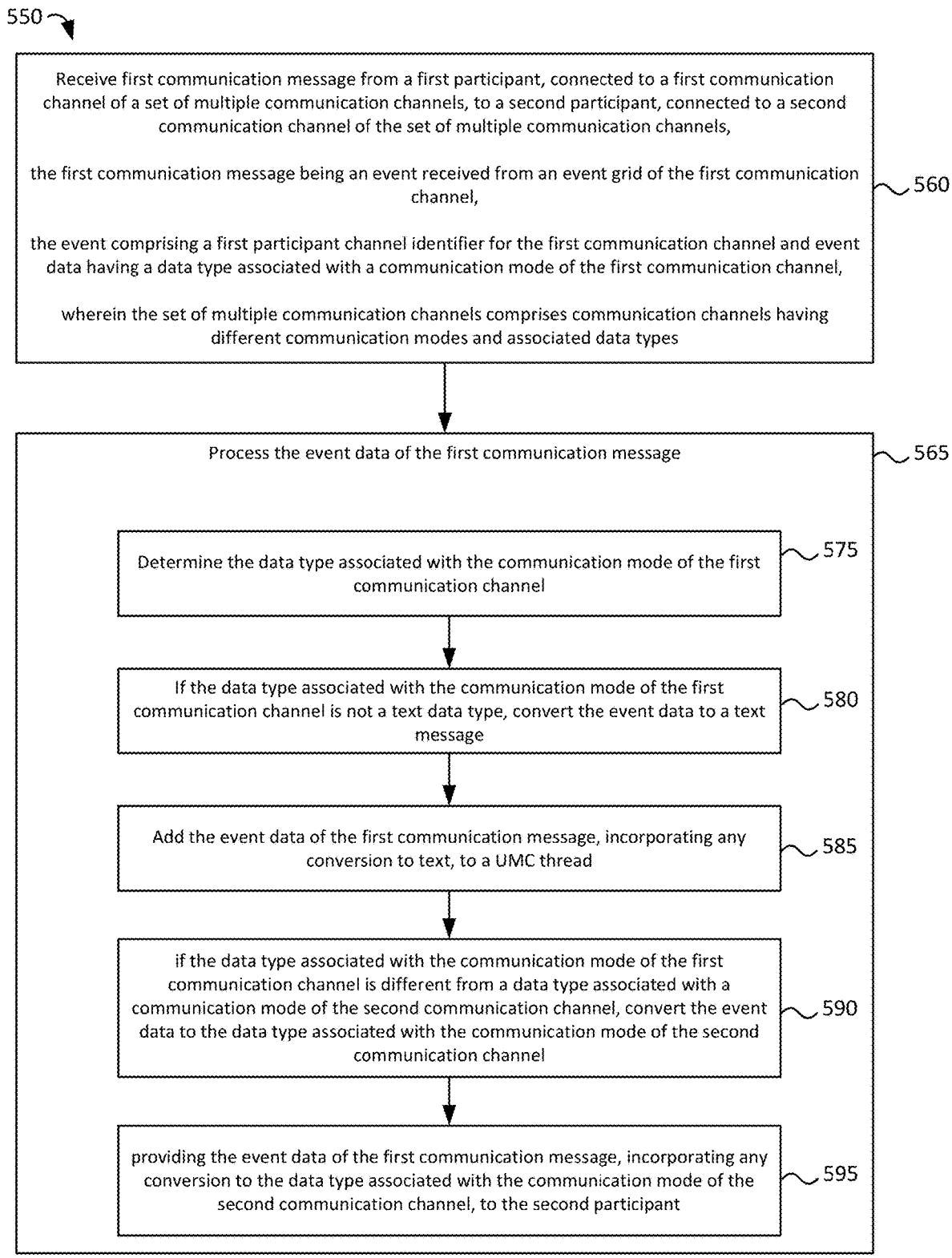

FIGS. 5A and 5B illustrate example process flow diagrams according to certain embodiments, where FIG. 5A illustrates an example process flow for initializing a UMC thread for a UMC session and FIG. 5B illustrates an example process flow for facilitating unified multichannel communication.

Figure 20:
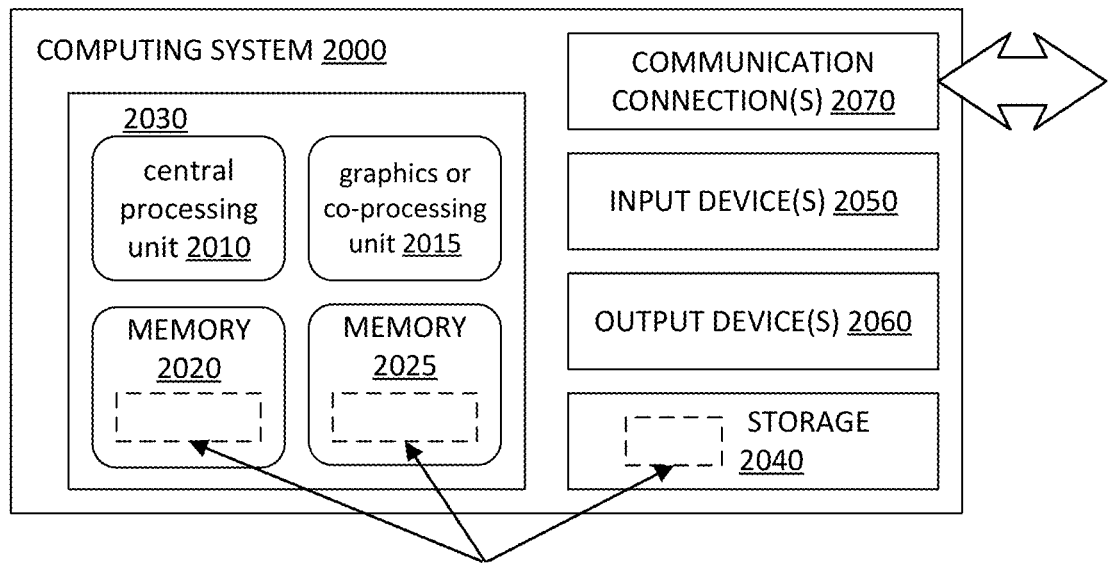
FIG. 20 illustrates a diagram of an example computing system in which some described embodiments can be implemented.

Referring to FIG. 5A and FIG. 5B, a UMC service performing process 500 described with respect to FIG. 5A and process 550 described with respect to FIG. 5B, can be implemented by a server, which can be embodied as described with respect to computing system 2000 shown in FIG. 20 and even, in whole or in part, by mobile device 2100 as shown in FIG. 2100. The UMC service enables conversations between multiple participants and across different communication channels.

Referring to process 500 of FIG. 5A, the UMC service can receive (505) a request for a UMC session involving a first participant and a second participant. The first participant and the second participant can be a human interacting through text, a human interacting through audio, or a bot interacting through text.

The request can be received as an API call from a client application. The request can be received in response to a variety of actions. For example, the request can be received in response to one of the participants starting an interaction with the other participant. Examples of the interaction can include a call at a call center, a text from a participant, or a request to chat with a bot on a website.

The request can include communication channel information and first participant configuration information for each communication channel of a set of multiple communication channels. Communication channel information and configuration information provide the UMC service information to identify a participant and an initial endpoint (e.g., Shawn at 555-1234), as well as a data type.

The communication channel information can include a communication channel identifier, a communication mode, and one or more associated data types for each communication channel of the set of communication channels. The communication channel information can also include communication channel metadata. For example, the communication channel metadata can include information indicating whether a phone number can handle SMS (e.g., a mobile number versus a landline number).

The set of multiple communication channels can include communication channels having different communication modes and associated data types. The data types can include audio data types, video data types, and text data types.

For example, the set of communication channels can include a chat communication channel having a chat message communication mode and an associated text data type, a chat communication channel having a chat message communication mode and an associated audio data type, an SMS communication channel having an SMS message communication mode and associated text data type, an email communication channel having an email message communication mode and associated text data type, and a social media communication channel having a chat message communication mode and associated text data type.

Configuration information can include, but is not limited to, a participant channel identifier associated with each communication channel of the set of communication channels. For example, a participant channel identifier for an SMS communication channel could include a phone number of the participant, a participant channel identifier for an email communication channel could include an email address of the participant, a participant channel identifier for a calling communication channel could include a same or different phone number for the participant, and a participant channel identifier for a social media communication channel could include social media identifier for the participant.

In some cases, the participant channel identifier is associated with a master channel identifier for a given user, which can link different participant channel identifiers (for different communication channels) with the given user. In this case, a separate data resource can be used to associate different participant channel identifiers with the master channel identifier.

The UMC service can initialize (510) a UMC thread for the UMC session. The initializing can include attaching each communication channel of the set of multiple communication channels to the UMC thread using the communication channel information and the first participant configuration information for that communication channel. The first participant configuration information comprising a first participant channel identifier.

When the UMC thread is initialized, a thread metadata record is created and stored in a data resource (e.g., data resource 490 as described with respect to FIG. 4). The thread metadata record for a UMC thread is assigned a thread identifier and can include a list of communication channel identifiers for each communication channel attached to the UMC thread, as well as a participant channel identifier associated with each communication channel for each participant of the UMC session.

In the illustrative example of FIG. 5A, for each communication channel of the set of multiple communication channels, communication channel information and the first participant configuration information for that communication channel is added to the thread metadata record.

Anytime a participant and/or a communication channel is added or attached to the UMC thread, the thread metadata record for the UMC thread is updated to include the corresponding communication channel identifier and/or participant channel identifier.

When messages are exchanged between participants, a message is received through a communication channel (having a communication channel identifier) and includes a participant channel identifier. Using the communication channel identifier and the participant channel identifier, the message can be added or attached to the UMC thread by updating a thread content record of the UMC thread.

The UMC service can receive (515) a second participant configuration information for a given communication channel of the set of multiple communication channels. The second participant configuration information comprising a second participant channel identifier. In some cases, the second participant configuration information for the second participant for a given communication channel of the set of communication channels is received with the request described in step 505. In some cases, the second participant configuration information is received in a separate request.

The UMC service can add (520) the second participant to the UMC thread using the communication channel information of the given communication channel and the second participant configuration information. Here, the thread metadata record of the UMC thread is updated to include communication channel information of the given communication channel and the second participant configuration information.

The UMC service can subscribe (525) to events for each communication channel of the set of multiple communication channels. When subscribing to events for each communication channel, the UMC service can subscribe to a respective communication channel service for each of the communication channels. The UMC service can then be notified when a message is communicated through one of the communication channels to which the UMC service is subscribed.

In some cases, the UMC service can receive a new request to add a third participant to the UMC session. The new request can include third participant configuration information for an additional given communication channel of the set of multiple communication channels. The third participant configuration information can include a third participant channel identifier. The UMC service can add the third participant to the UMC thread using the communication channel information of the additional given communication channel and the third participant configuration information and update the subscription for the events for the additional given communication channel. Here, the thread metadata record of the UMC thread is updated to include communication channel information of the additional given communication channel and the third participant configuration information.

In some cases, the UMC service can receive a new request to add an additional communication mode for the second participant to the UMC session. The new request can include second participant configuration information for an additional given communication channel of the set of multiple communication channels. The UMC service can update the UMC thread using the communication channel information of the additional given communication channel and the second participant configuration information for the additional given communication channel. The UMC service can also update the subscription for the events for the additional given communication channel. Here, the thread metadata record for the UMC thread is updated to include communication channel information of the additional given communication channel and the second participant configuration information.

In some cases, the UMC service can receive a new request to remove a communication mode for the first participant from the UMC session. The new request can include first participant configuration information for an additional given communication channel of the set of multiple communication channels. The UMC service can update the UMC thread to remove the communication mode using the communication channel information of the additional given communication channel and the first participant configuration information for the additional given communication channel. The UMC service can also update the subscription for the events for the additional given communication channel. Here, the thread metadata record for the UMC thread is updated to remove the communication channel information of the additional given communication channel and the associated first participant configuration information.

In some cases, the UMC service can receive a new request to remove the second participant from the UMC session. The new request can include second participant configuration information for an additional given communication channel of the set of multiple communication channels. The UMC service can update the UMC thread to remove the second participant using the communication channel information of the additional given communication channel and the second participant configuration information for the additional given communication channel. The UMC service can also update the subscription for the events for the additional given communication channel. Here, the thread metadata record for the UMC thread is updated to remove communication channel information of the additional given communication channel and the second participant configuration information.

The UMC service can facilitate unified multichannel communication using the UMC thread. Referring to process 550 of FIG. 5B, the UMC service can receive (560) a first communication message from a first participant to a second participant. The first participant can be connected to a first communication channel of a set of multiple communication channels, and the second participant can be connected to a second communication channel of the set of multiple communication channels.

The set of multiple communication channels can include communication channels having different communication modes and associated data types. The data types can include audio data types, video data types, and text data types. In some cases, the first communication channel and the second communication channel are communication channels having a same communication mode and data type. In some cases, the first communication channel and the second communication channel are communication channels having a different communication mode and data type.

The first communication message can be an event received from the first communication channel. The event can include a first participant channel identifier for the first communication channel and event data having a data type associated with the communication mode of the first communication channel.

When messages are exchanged between participants, a message is received through a communication channel (having a communication channel identifier) and includes a participant channel identifier. Using the communication channel identifier and the participant channel identifier, the message can be added or attached to the UMC thread by updating a thread content record for that UMC thread.

The UMC service can process (565) the event data of the first communication message. During the processing (565) of the event data, the UMC service can determine (575) the data type associated with the communication mode of the first communication channel.

If the data type associated with the communication mode of the first communication channel is not a text data type, the UMC service can convert (580) the event data to a text message. The UMC service can add (585) the event data of the first communication message to a UMC thread. Here, the UMC service can incorporate any conversion to text when adding the event data to the UMC thread.

If the data type associated with the communication mode of the first communication channel is different from a data type associated with a communication mode of the second communication channel, the UMC service can convert (590) the event data to the data type associated with the communication mode of the second communication channel.

The UMC service can provide (595) the event data of the first communication message to the second participant. Here, the UMC service can incorporate any conversion to the data type associated with the communication mode of the second communication channel when providing the event data to the second participant.

In some cases, processing of the event data of the first communication message also includes providing the event data of the first communication message, incorporating any conversion to the data type associated with the communication mode of the second communication channel, to the first participant. The UMC service can provide the message to the first participant for any communication channels the first participant is actively connected to. For example, the first participant may be talking on the phone, but also has the chat open in a browser. In this example, the UMC service can provide the message to the first participant through a calling communication channel and a chat communication channel. Advantageously, the UMC service can manage the communications to make sure the messages are provided having the correct data type associated with the communication mode of the communication channel through which the message is being provided.

In some cases, the UMC service can receive a second communication message from the first participant to a third participant, where both the first participant and the third participant are connected to the first communication channel. The second communication message can be an event received from the first communication channel. The event can include the first participant channel identifier corresponding to the first communication channel and event data having the data type associated with the communication mode of the first communication channel.

The UMC service can process the event data of the second communication message. During the processing of the event data, the UMC service can determine the data type associated with the communication mode of the first communication channel. If the data type associated with the communication mode of the first communication channel is not a text data type, the UMC service can convert the event data to a text message. The UMC service can then add the event data of the second communication message, incorporating any conversion to text, to the UMC thread. The UMC service can also provide the event data of the second communication message to the third participant.

In some cases, the second participant is active in the UMC session. Here, if the data type associated with the communication mode of the first communication channel is different from the data type associated with the communication mode of the second communication channel, the UMC service can convert the event data to the data type associated with the communication mode of the second communication channel; and provide the event data of the second communication message, incorporating any conversion to the data type associated with the communication mode of the second communication channel, to the second participant.

In some cases, the UMC service can receive a third communication message from the first participant to the second participant, where the first participant is connected to the second communication channel and the second participant is connected to the first communication channel. The third communication message can be an event received from the second communication channel. The event can include a first participant channel identifier corresponding to the second communication channel and event data having a data type associated with a communication mode of the second communication channel.

The UMC service can process the event data of the third communication message. During the processing of the event data, the UMC service can determine the data type associated with the communication mode of the second communication channel. If the data type associated with the communication mode of the second communication channel is not a text data type, the UMC service can convert the event data to a text message and add the event data of the third communication message, incorporating any conversion to text, to the UMC thread.

If the data type associated with the communication mode of the second communication channel is different from the data type associated with the communication mode of the first communication channel, the UMC service can convert the event data to the data type associated with the communication mode of the first communication channel and provide the event data of the third communication message, incorporating any conversion to the data type associated with the communication mode of the first communication channel, to the second participant.

As an example, the data type associated with the communication mode of the first communication channel is a voice data type and the data type associated with the communication mode of the second communication channel is a text data type. In this example, during the processing of the event data of the first communication message, the UMC service can determine the data type associated with the communication mode of the first communication channel is the voice data type; convert the event data to a text message; and add the event data of the first communication message, incorporating any conversion to text, to the UMC thread. The UMC service can also provide the event data of the first communication message converted to the text message to the second participant.

During the processing of the event data of the first communication message, the UMC service can also provide the event data of the first communication message converted to the text message to the first participant.

Continuing with the example where the data type associated with the communication mode of the first communication channel is a voice data type and the data type associated with the communication mode of the second communication channel is a text data type, the UMC service can receive a fourth communication message from the second participant to the first participant. The second participant can be connected to the second communication channel and the first participant can be connected to the first communication channel. The fourth communication message can be an event received from the second communication channel. The event can include a second participant channel identifier corresponding to the second communication channel and event data having the text data type associated with the communication mode of the second communication channel.

The UMC service can process the event data of the fourth communication message. During the processing of the event data, the UMC service can determine the data type associated with the communication mode of the second communication channel is the text data type and add the event data of the fourth communication message to the UMC thread. The UMC service can convert the event data to the voice data type and provide the event data of the fourth communication message, incorporating the conversion to the voice data type, to the first participant. The UMC service can provide the event data of the fourth communication message to the first participant.

In some cases, the UMC service can provide the event data of the first communication message, incorporating any conversion to text, to an AI service and receive AI enrichments associated with the event data from the AI service. The UMC service can provide the AI enrichments to any or all the participants.

A more detailed discussion of initializing the UMC thread will be discussed in FIG. 6 and a more detailed discussion of facilitating unified multichannel communication will be discuss in FIGS. 7-13.

FIGS. 6-13 illustrate sequence diagrams for various aspects of facilitating unified multichannel communication. The sequence diagrams illustrated in FIGS. 6-13 can include users (e.g., user and user2), a bot, a client, a UMC service, a chat thread service, an SMS communication service, a calling communication service, an email communication service, a social media communication service, and an AI enrichment communication service.

The users and the bot can be participants in a UMC session. Each of the users can be a human interacting through text or a human interacting through audio. The bot can be an automated conversation bot interacting through text.

The UMC service enables conversations across communication channels and the chat thread service maintains a UMC thread for the UMC session. The client can be any suitable client application, such as a web service. For example, the client can be a web browser or mobile application for a company managing the bot. At the client, interactions with the UMC service can be implemented using a software development kit (SDK). The bot can allow the user to interact with the client using, for example, text.

Figure 6:
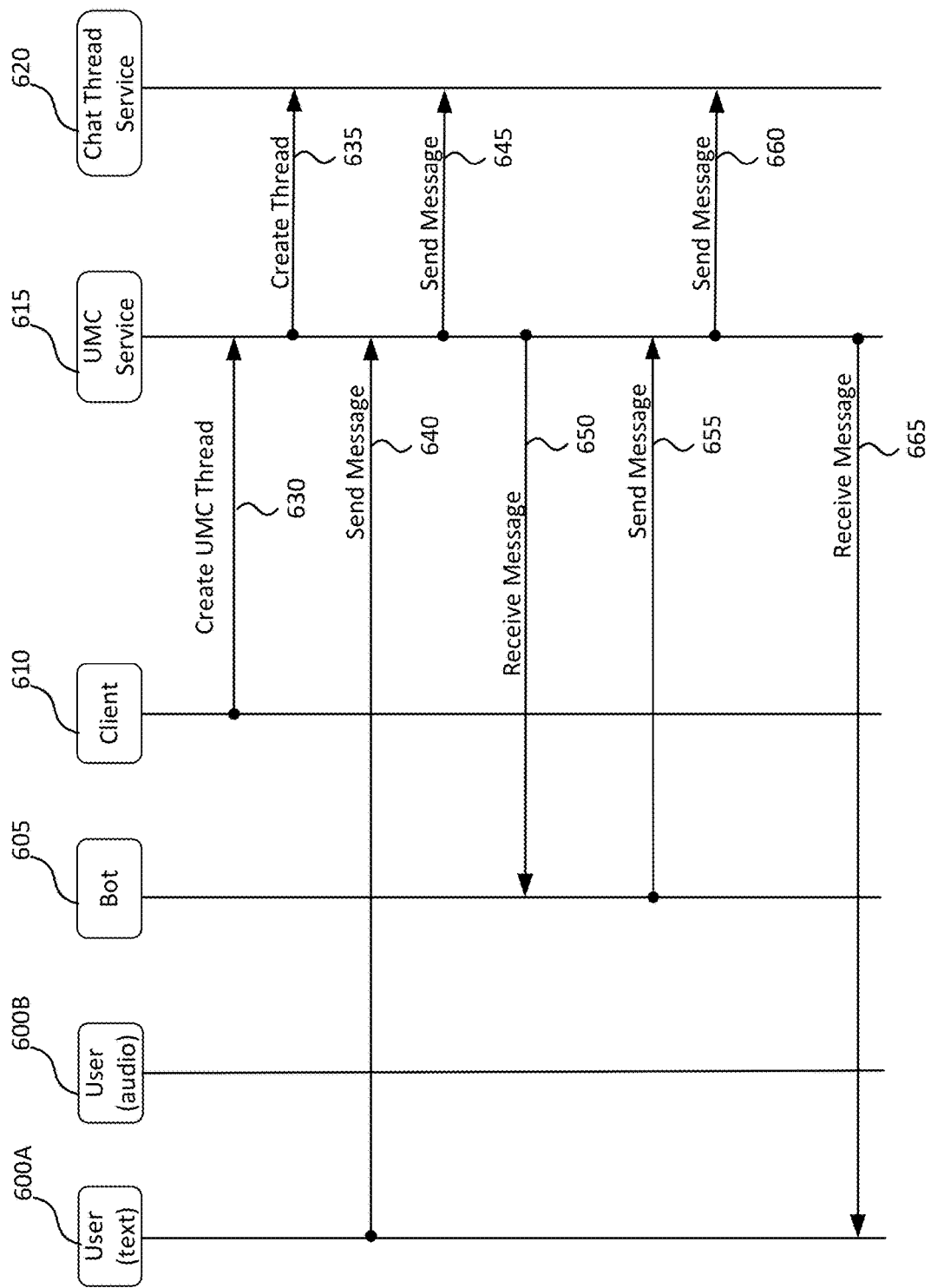
FIG. 6 illustrates an example sequence diagram for initializing a UMC thread for a UMC session.

FIG. 6 illustrates an example sequence diagram for initializing a UMC thread for a UMC session. Referring to FIG. 6, the sequence diagram includes a user 600, a bot 605, a client 610, a UMC service 615, and a chat thread service 620. The user 600 and the bot 605 can be participants in a UMC session. The user 600 can be a human interacting through chat text messages (e.g., user 600A) or a human interacting through a phone call (e.g., user 600B). The bot 605 can be an automated conversation bot interacting through chat text messages.

The sequence flow for initializing a UMC thread can begin when the client 610 communicates a request to create a UMC thread for a UMC session involving the user 600 and the bot 605 to the UMC service 615, as shown in flow 630.

The request can be received as an API call from the client 610. The request can be received in response to a variety of actions. For example, the request can be received in response to one of the participants (e.g., the user 600 or the bot 605) starting an interaction with the other participant. Examples of the interaction can include a call at a call center, a text from a participant, or a request to chat with a bot on a website.

The request can include communication channel information for each communication channel of a set of communication channels and configuration information for a first participant of the UMC session (e.g., the user 600 or the bot 605).

Communication channel information and configuration information provide the UMC service 615 information to identify a participant and an initial endpoint (e.g., Shawn at 555-1234), as well as a data type.

The communication channel information can include a communication mode and one or more associated data types for each communication channel of the set of communication channels. The communication channel information can also include communication channel metadata. For example, the communication channel metadata can include information indicating whether a phone number can handle SMS (e.g., a mobile number versus a landline number).

The set of communication channels can include multiple communication channels having different communication modes and associated data types. For example, the set of communication channels can include a chat communication channel having a chat message communication mode and an associated text data type, a chat communication channel having a chat message communication mode and an associated audio data type, an SMS communication channel having an SMS message communication mode and associated text data type, an email communication channel having an email message communication mode and associated text data type, and a social media communication channel having a chat message communication mode and associated text data type.

As previously described, configuration information can include, but is not limited to, a participant channel identifier associated with each communication channel of the set of communication channels. For example, a participant channel identifier for an SMS communication channel could include a phone number of the participant, a participant channel identifier for an email communication channel could include an email address of the participant, a participant channel identifier for a calling communication channel could include a same or different phone number for the participant, and a participant channel identifier for a social media communication channel could include social media identifier for the participant.

After receiving the request in flow 630, the UMC service 615 can initialize the UMC thread for the UMC session. The UMC service 615 can communicate with the chat thread service 620 to create the UMC thread, as shown in flow 635.

The UMC service 615 can attach each communication channel of the set of communication channels to the UMC thread using the communication channel information and the configuration information for the first participant for that communication channel received in the request described in flow 630.

When the UMC thread is initialized, a thread metadata record for the UMC thread is created and stored in a data resource (e.g., data resource 490 as described with respect to FIG. 4). The thread metadata record for a UMC thread is assigned a thread identifier and can include a list of communication channel identifiers for each communication channel attached to the UMC thread, as well as a participant channel identifier associated with each communication channel for each participant of the UMC session.

Anytime a participant and/or a communication channel is added or attached to the UMC thread, the thread metadata record is updated to include the corresponding communication channel identifier and/or participant channel identifier.

When messages are exchanged between participants, a message is received through a communication channel (having a communication channel identifier) and includes a participant channel identifier. Using the communication channel identifier and the participant channel identifier, the message can be added or attached to the UMC thread by updating the thread content record for the UMC thread record.

The UMC service 615 can receive configuration information for a second participant for a given communication channel of the set of communication channels. In the illustrative example of FIG. 6, if the first participant is the bot 605, then the second participant is the user 600. The configuration information for the second participant can include a participant channel identifier for the second participant. In some cases, the configuration information for the second participant for a given communication channel of the set of communication channels is received with the request described in flow 630. In some cases, the configuration information for the second participant is received in a separate request.

The UMC service 615 can add the second participant to the UMC thread using the communication channel information of the given communication channel and the configuration information of the second participant. The UMC service 615 can subscribe to events for each communication channel of the set of communication channels.

As previously described, when subscribing to events for each communication channel, the UMC service can subscribe to a respective communication channel service for each of the communication channels. The UMC service can then be notified when a message is communicated through one of the communication channels to which the UMC service is subscribed.

In an example scenario, a customer (e.g., user 600) can reach out to a company for technical support by starting a chat conversation with a bot (e.g., bot 605) on the company's website. Here, the client 610 can communicate with the UMC service 615 to create a UMC thread for a UMC session between the company's bot and the customer.

The UMC service 615 can receive communication channel information for each communication channel of a set of communication channels, as well as bot configuration information for each of those communication channels. For example, the UMC service 615 can receive a company 1-800 number as the bot configuration information for a calling communication channel and a company email address as the bot configuration information for an email communication channel. Each communication channel can be attached to a UMC thread using the communication channel information and the bot configuration information.

Continuing with the example scenario, the UMC service 615 can then receive customer configuration information for one or more of the communication channels. Here, the customer configuration information can be contact information stored for the customer in a data resource storing customer profiles. For example, the UMC service 615 can receive a phone number for the customer for the calling communication channel and a customer email address for the email communication channel.

The UMC service 615 can add the customer to the UMC thread using the communication channel information and the customer configuration information. The UMC service 615 can then subscribe to events for each communication channel.

Returning to the sequence diagram illustrated in FIG. 6, once the UMC thread is initialized, the user 600 and the bot 605 can interact with each other through one or more of the communication channels. In the illustrated sequence diagram, the UMC service 615 can receive a chat message sent from the user connected to a chat communication channel (e.g., user 600A), as shown in flow 640. The UMC service 615 can provide the message to the chat thread service 620 to be added to the UMC thread, as shown in flow 645. The UMC service 615 can send that message to the recipient of the message, the bot 605, as shown in flow 650.

The bot 605 can receive the message sent from the user 600A and communicated from the UMC service 615, as shown in flow 655. The bot 605 can then send a message to the user 600A in response. The bot 605 can communicate the message to the UMC service 615, as shown in flow 660. The UMC service 615 can provide the message to the chat thread service 620 to be added to the UMC thread, as shown in flow 665. The UMC service 615 can send that message to the user 600A. The user 600A can receive the message sent from the bot 605 and communicated from the UMC service 615, as shown in flow 670.

Figure 7:
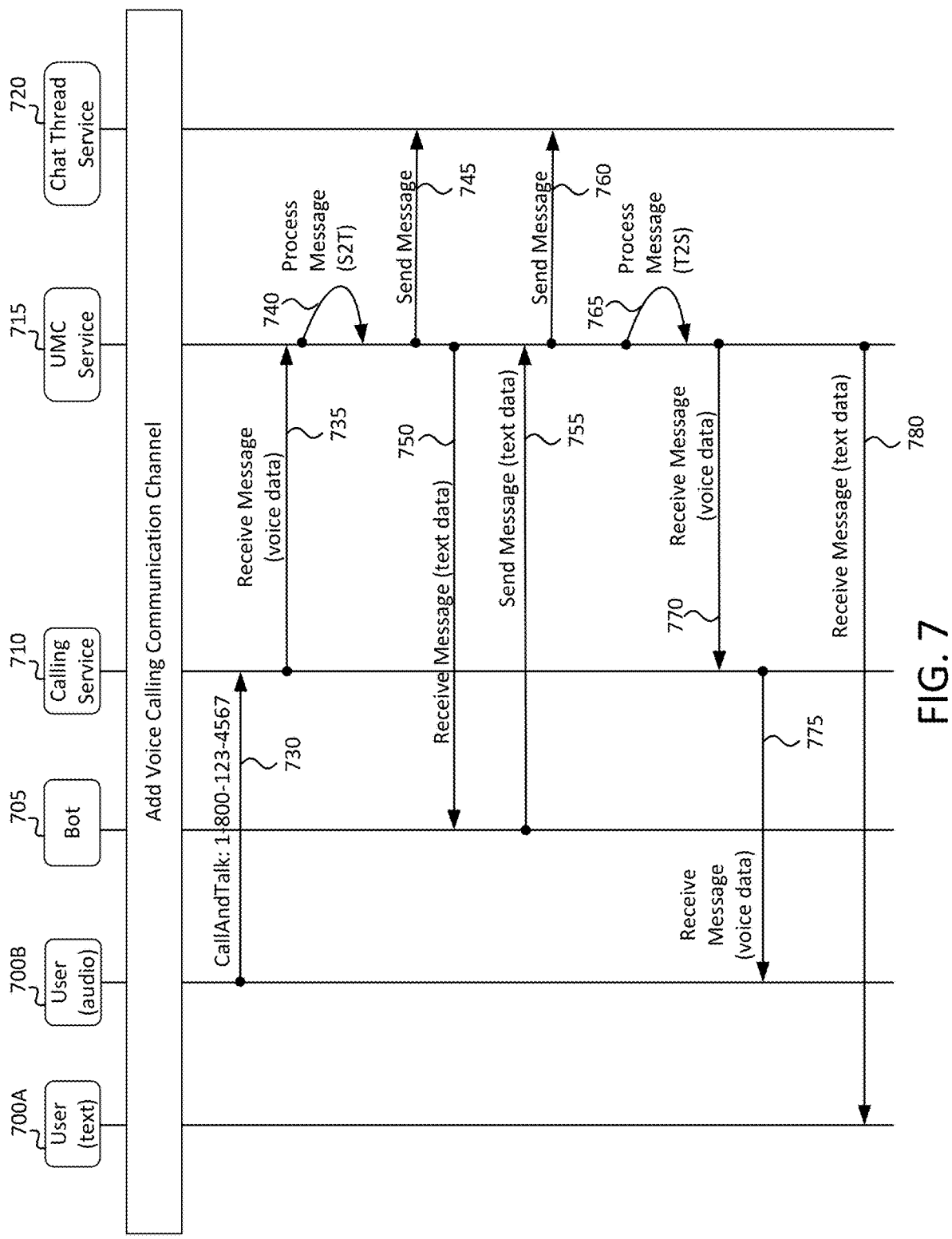
FIG. 7 illustrates an example sequence diagram for adding a communication channel to a UMC thread, where the communication channel is a voice calling communication channel.

FIG. 7 illustrates an example sequence diagram for adding a communication channel to a UMC thread, where the communication channel is a voice calling communication channel. Referring to FIG. 7, the sequence diagram includes a user 700, a bot 705, a calling communication service 710, a UMC service 715, and a chat thread service 720. The user 700 and the bot 705 can be participants in a UMC session. The user 700 can be a human interacting through text (e.g., user 700A) or a human interacting through audio (e.g., user 700B).

At some point during a conversation of a UMC session, the user 700A can ask to continue a conversation with the bot 705 through a different communication channel. For example, the user 700A may state "I need to commute to work can we continue this conversation over the phone?". To continue the conversation with a voice call, the user 700 can either be called by the bot 705 or in the case of this sequence diagram, can call to a phone number (e.g., 1-800-123-4567) for the company managing the bot 705, as shown in flow 730.

The UMC service 715 can subscribe to audio for the voice calling communication channel from the calling communication service 710. While the user 700B is communicating with the bot 705 through audio, the calling communication service 710 can send a message to the UMC service 715 containing the audio data from the user 700B, as shown in flow 735.

The UMC service 715 can process the received message, as shown in flow 740. Here, since the bot 705 is interacting through text and not connected to the voice calling communication channel, the UMC service 715 can convert the audio data of the message into text data. The UMC service 715 can provide the message to the chat thread service 720 to be added to the UMC thread as a chat message, as shown in flow 745.

The bot 705 can receive the message as text data from the UMC service 715, as shown in flow 750. Through the UMC thread, both the user 700 and the bot 705 see the messages as the data type associated with the communication channel in which they are interacting with. The bot 705 is interacting over a chat and the user 700 is interacting over a voice call. Here, since the bot 705 is interacting with a chat communication channel, the bot 705 sees audio data messages sent by the user 700 from the voice call as text data. Advantageously, there is no difference from the perspective of the bot 705, whether the user 700 is connected to and interacting with the same or a different communication channel (e.g., the same chat communication channel or a different voice calling communication channel).

The bot 705 can respond in text by communicating a text message to the UMC service, as shown in flow 755. The UMC service 715 can provide the text message to the chat thread service 720 to be added to the UMC thread as a chat message, as shown in flow 760.

Since the user 700B is connected to the voice calling communication channel, the UMC service 715 can convert the message into speech before communicating the message to the calling communication service 710, as shown in flow 765.

The calling communication service 710 can receive the message as audio data from the UMC service 715, as shown in flow 770. The calling communication service 710 can then communicate the message as audio data to the user 700B, as shown in flow 775.

The UMC service 715 can also communicate each message added to the UMC thread to the user 700A interacting with text, as shown in flow 780. If the user 700 wishes to interact with the UMC thread while on the phone call with the bot 705 (e.g., by also having their browser window open), the user 700A can see a transcript of the phone call as messages in the UMC thread.

Figure 8:
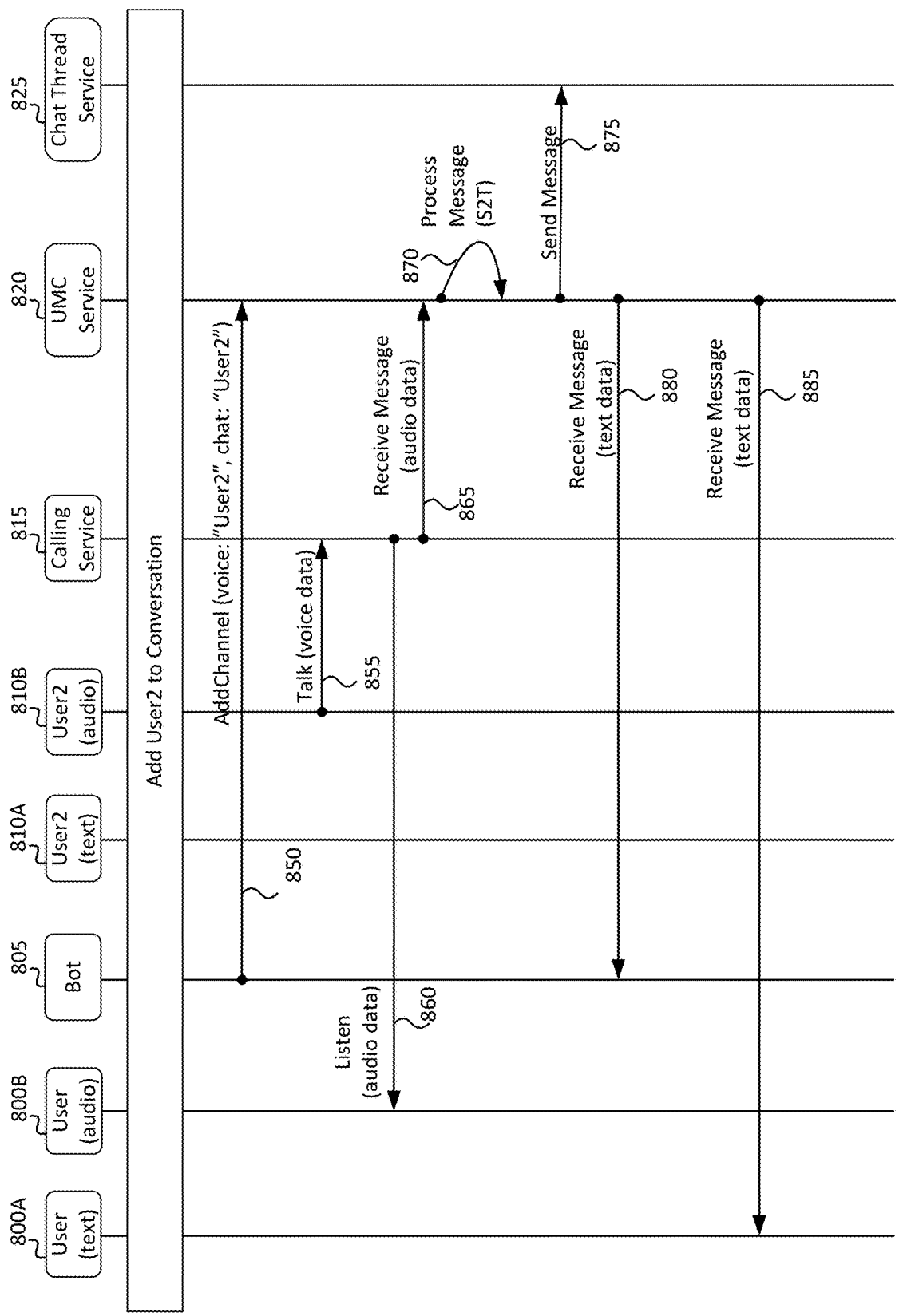
FIG. 8 illustrates an example sequence diagram for adding a participant to a UMC thread.

FIG. 8 illustrates an example sequence diagram for adding a participant to a UMC thread. Referring to FIG. 8, the sequence diagram includes a user 800, a bot 805, a second user (e.g., user2 810), a calling communication service 815, a UMC service 820, and a chat thread service 825. The user 800, the bot 805, and the user2 810 can be participants in a UMC session. The user 800 can be a human interacting through text (e.g., user 800A) or a human interacting through audio (e.g., user 800B). The user2 810 can be a human interacting through text (e.g., user2 810A) or a human interacting through audio (e.g., user2 810B).

At some point during a UMC session between the user 800 and the bot 805, another participant (e.g., user2 810) may be added to the conversation. For example, the user 800 may state "I would like to speak with a live agent." In another example, the bot 805 may state "I'm unable to answer the question but let me connect you to a technician who can help."

To continue the conversation with a voice call between the user 800 and the live agent (e.g., user2 810), the bot 805 can communicate a request to add user2 810 to the UMC session to the UMC service 820, as shown in flow 850. The request can include user2 configuration information for one or more of the communication channels including the voice calling communication channel. The user2 configuration information can include a user2 channel identifier associated with each of the one or more communication channels.

The UMC service 820 can add user2 810 to the UMC thread using the communication channel information of the one or more communication channels and the user2 configuration information. The UMC service 820 can also update the subscription for each of the one or more communication channels.

Once user2 810B is added to the voice call, the calling communication service 815 can relay audio data between the user 800B and user2 810B. Here, audio data is communicated from user2 810B to the calling communication service 815, as shown in flow 855. The calling communication service 815 can communicate that audio data to the user 800B, as shown in flow 860.

The calling communication service 815 can also send a message containing the audio data to the UMC service 820, as shown in flow 865. The UMC service 820 can process the received message, as shown in flow 870. Here, since the message contains audio data, the UMC service 820 can convert the audio data of the message into text data so the message can be added to the UMC thread as a chat message. The UMC service 820 can provide the message to the chat thread service 825 to be added to the UMC thread, as shown in flow 875.

In some cases, the bot 805 continues to listen to the conversation between the user 800B and user2 810B. Since the audio data relayed between the user 800B and user2 810B is added to the UMC thread as a chat message, the bot 805 is able to understand and interact with the conversation as well. In some cases, the bot 805 can act as a copilot and assist either the user 800B and/or user2 810B during the conversation. The bot 805 can receive the message as text data from the UMC service 820, as shown in flow 880.

The UMC service 820 can also communicate each message added to the UMC thread to the user 800A interacting with text, as shown in flow 885. If the user 800 wishes to interact with the UMC thread while on the phone call with the bot 805 (e.g., by also having their browser window open), the user 800A can see a transcript of the phone call as messages in the UMC thread.

Figure 9:
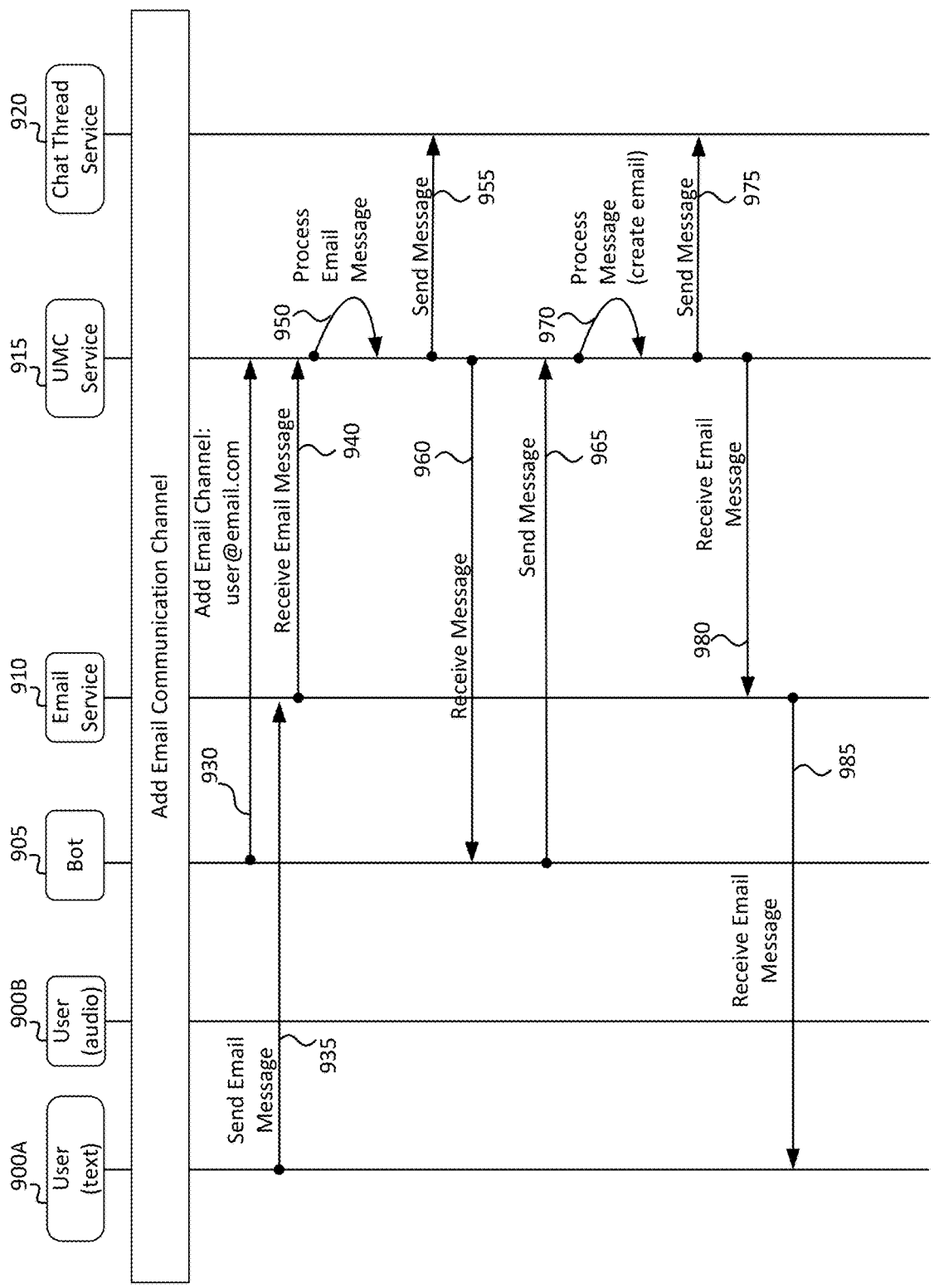
FIG. 9 illustrates an example sequence diagram for adding a communication channel to a UMC thread, where the communication channel is an email communication channel.

FIG. 9 illustrates an example sequence diagram for adding a communication channel to a UMC thread, where the communication channel is an email communication channel. Referring to FIG. 9, the sequence diagram includes a user 900, a bot 905, an email communication service 910, a UMC service 915, and a chat thread service 920. The user 900 and the bot 905 can be participants in a UMC session. The user 900 can be a human interacting through text (e.g., user 900A) or a human interacting through audio (e.g., user 900B).

At some point during a conversation of a UMC session, the user 900A and the bot 905 may continue the conversation through a different communication channel. For example, the bot 905 may ask the user 900A to send the bot 905 an email message.

The bot 905 can communicate a request to add an email communication channel to the UMC session to the UMC service 915, as shown in flow 930. The request can include user configuration information for the email communication channel. The user configuration information can include a user channel identifier associated with the email communication channel, such as a user email address (e.g., user@email.com).

The UMC service 915 can add the email communication channel to the UMC session and subscribe to emails associated with the user channel identifier from the email communication service 910.

When the user 900A sends an email message to the bot 905, the email message is sent to the email communication service 910, as shown in flow 935. The email communication service 910 can send the email message to the UMC service 915, as shown in flow 940.

The UMC service 915 can process the received email message, as shown in flow 950. The email message can be processed in a variety of ways. For example, the email message may be analyzed and summarized into data easily digestible by the bot 905. In another example, any attachments included in the email message may be individually analyzed.

The UMC service 915 can provide the email message to the chat thread service 920 to be added to the UMC thread, as shown in flow 955. In some cases, a link to the email message, including any attachments, is added to the UMC thread. In some cases, any text data included in the email message and/or a summary of the email message and any attachments is added to the UMC thread.

The bot 905 can receive the email message as text data from the UMC service 915, as shown in flow 960. Here, the text data can include any text data included in the email message and/or a summary of the email message and any attachments.

The bot 905 can respond to the email message in text by communicating a text message to the UMC service 915, as shown in flow 965. The UMC service 915 can processes the text message received from the bot 905, as shown in flow 970. For example, the UMC service 915 can use data from the text message to generate a response email message to be sent to the user 900A.

The UMC service 915 can provide the text message and/or the email message to the chat thread service 920 to be added to the UMC thread, as shown in flow 975. The UMC service 915 can send the email message to the email communication service 910, as shown in flow 980. The email communication service 910 can then relay the email message to the user 900A, as shown in flow 985.

Figure 10:
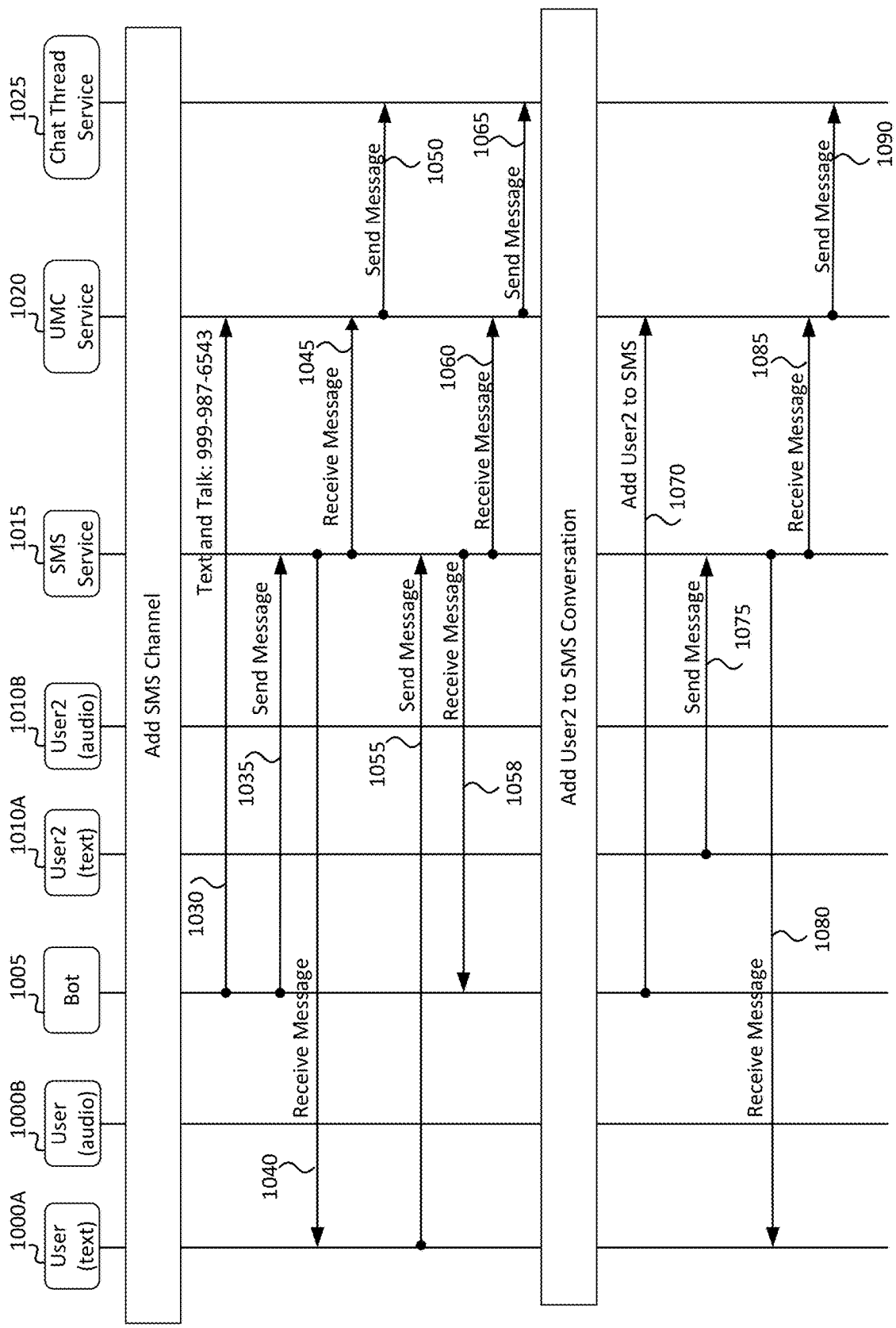
FIG. 10 illustrates an example sequence diagram for adding a communication channel and a participant to a UMC thread, where the communication channel is a SMS communication channel.

FIG. 10 illustrates an example sequence diagram for adding a communication channel and a participant to a UMC thread, where the communication channel is a SMS communication channel. Referring to FIG. 10, the sequence diagram includes a user 1000, a bot 1005, a second user (e.g., user2 1010), an SMS communication service 1015, a UMC service 1020, and a chat thread service 1025. The user 1000, the bot 1005, and the user2 1010 can be participants in a UMC session. The user 1000 can be a human interacting through text (e.g., user 1000A) or a human interacting through audio (e.g., user 1000B). The user2 1010 can be a human interacting through text (e.g., user2 1010A) or a human interacting through audio (e.g., user2 1010B).

At some point during a conversation of a UMC session, the user 1000 and the bot 1005 may continue the conversation through a different communication channel. For example, the bot 1005 may ask the user 1000 to send the bot 1005 an SMS text message.

The bot 1005 can communicate to the UMC service 1020 a request to add an SMS communication channel to the UMC session, as shown in flow 1030. The request can include user configuration information for the SMS communication channel. The user configuration information can include a user channel identifier for the user 1000 associated with the SMS communication channel, such as a user phone number (e.g., 999-987-6543).

The UMC service 1020 can add the SMS communication channel to the UMC session and subscribe to SMS text message associated with the user channel identifier from the SMS communication service 1015. The UMC service 1020 can subscribe to SMS data for the SMS communication channel from the SMS communication service 1015. The SMS data can be text data or audio data.

When the bot 1005 sends an SMS text message to the user 1000A, the SMS text message is sent to the SMS communication service 1015, as shown in flow 1035. The SMS communication service 1015 can relay the SMS text message to the user 1000A, as shown in flow 1040.

The UMC service 1020 can receive the SMS text message from the SMS communication service 1015, as shown in flow 1045. The UMC service 1020 can provide the SMS text message to the chat thread service 1025 to be added to the UMC thread, as shown in flow 1050.

The user 1000A can respond to the SMS text message by communicating an SMS text message to the SMS communication service 1015, as shown in flow 1055, and the SMS communication service 1015 can relay the SMS text message to the bot 1005, as shown in flow 1058.

The UMC service 1020 can receive the SMS text message from the SMS communication service 1015, as shown in flow 1060, and the UMC service 1020 can the SMS text message to the chat thread service 1025 to be added to the UMC thread, as shown in flow 1065.

In cases where the SMS message from the user 1000A includes audio data (e.g., where the user sent a voice message via SMS), the UMC service 1020 can process the audio data prior to sending the SMS message to the chat thread service 1025. For example, the UMC service 1020 can convert the audio data to text data. The UMC service 1020 can provide the processed SMS message (as text data) to the SMS communication service 1015 for the SMS communication service 1015 to relay to the bot 1005.

At some point during the SMS conversation of the UMC session between the user 1000 and the bot 1005, another participant (e.g., user2 1010) may be added to the conversation. For example, the user 1000 may state "I would like to speak with a live agent." In another example, the bot 1005 may state "I'm unable to answer the question but let me connect you to a technician who can help."

To continue the SMS conversation with the live agent (e.g., user2 1010), the bot 1005 can communicate a request to add user2 1010 to the SMS communication channel of the UMC session to the UMC service 1020, as shown in flow 1070. The request can include user2 configuration information for the SMS communication channel. The user2 configuration information can include a user2 channel identifier (e.g., a phone number for the live agent) associated with the SMS communication channel.

The UMC service 1020 can add user2 1010 to the UMC thread using communication channel information of the SMS communication channel and the user2 configuration information. The UMC service 1020 can also update the subscription for the SMS communication channel to subscribe to SMS messages associated with the user2 channel identifier from the SMS communication service 1015.

Once user2 1010 is added to the SMS conversation, the user2 1010A can send an SMS text message to the user 1000A. The SMS text message is sent from the user2 1010A to the SMS communication service 1015, as shown in flow 1075. The SMS communication service 1015 can relay the SMS text message to the user 1000A, as shown in flow 1080.

The UMC service 1020 can receive the SMS text message from the SMS communication service 1015, as shown in flow 1085. The UMC service 1020 can provide the SMS text message to the chat thread service 1025 to be added to the UMC thread, as shown in flow 1090.

Figure 11:
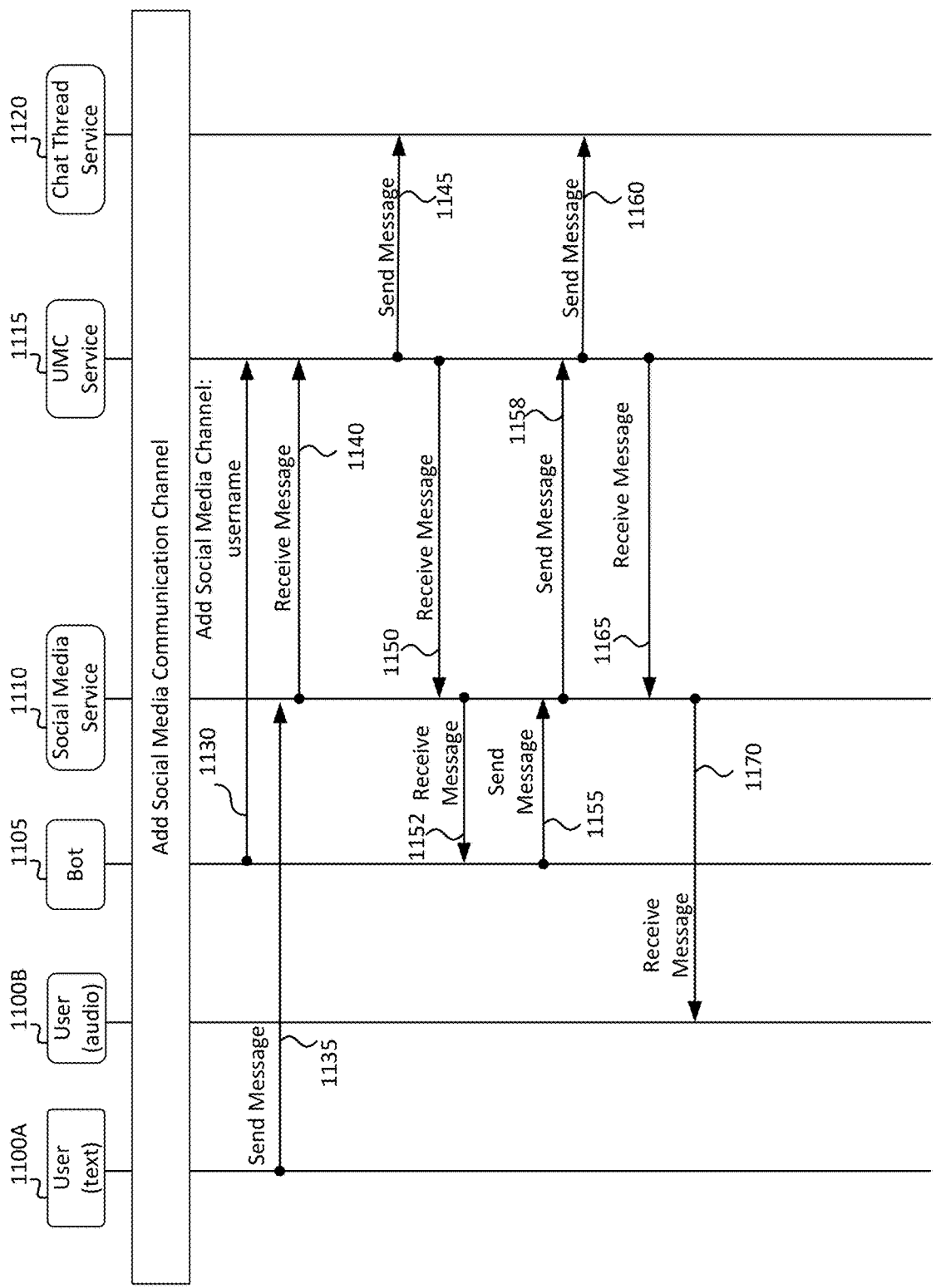
FIG. 11 illustrates an example sequence diagram for adding a communication channel to a UMC thread, where the communication channel is a social media communication channel.

FIG. 11 illustrates an example sequence diagram for adding a communication channel to a UMC thread, where the communication channel is a social media communication channel. Referring to FIG. 11, the sequence diagram includes a user 1100, a bot 1105, a social media communication service 1110, a UMC service 1115, and a chat thread service 1120. The user 1100 and the bot 1105 can be participants in a UMC session. The user 1100 can be a human interacting through text (e.g., user 1100A) or a human interacting through audio (e.g., user 1100B).

At some point during a conversation of a UMC session, the user 1100A and the bot 1105 may continue the conversation through a different communication channel. For example, the bot 1105 may ask the user 1100A to contact the bot 1105 through social media.

The bot 1105 can communicate a request to add a social media communication channel to the UMC session to the UMC service 1115, as shown in flow 1130. The request can include user configuration information for the social media communication channel. The user configuration information can include a user channel identifier associated with the social media communication channel, such as a username or telephone number.

The UMC service 1115 can add the social media communication channel to the UMC session and subscribe to social media messages associated with the user channel identifier from the social media communication service 1110.

When the user 1100A sends a social media message to the bot 1105, the social media message is sent to the social media communication service 1110, as shown in flow 1135. The social media communication service 1110 can send the social media message to the UMC service 1115, as shown in flow 1140.

The UMC service 1115 can provide the social media message to the chat thread service 1120 to be added to the UMC thread, as shown in flow 1145.

The social media message is sent to the social media communication service 1110 from the UMC service 1115, as shown in flow 1150. The social media communication service 1110 can send the social media message to the bot 1105, as shown in flow 1152.

The bot 1105 can respond to the social media message by communicating a social media message to the social media communication service 1110, as shown in flow 1155, which communicates the social media message to the UMC service 1115, as shown in flow 1158.

The UMC service 1115 can provide the social media message to the chat thread service 1120 to be added to the UMC thread, as shown in flow 1160. The UMC service 1115 can send the social media message to the social media communication service 1110, as shown in flow 1165. The social media communication service 1110 can then relay the social media message to the user 1100A, as shown in flow 1170.

Figure 12:
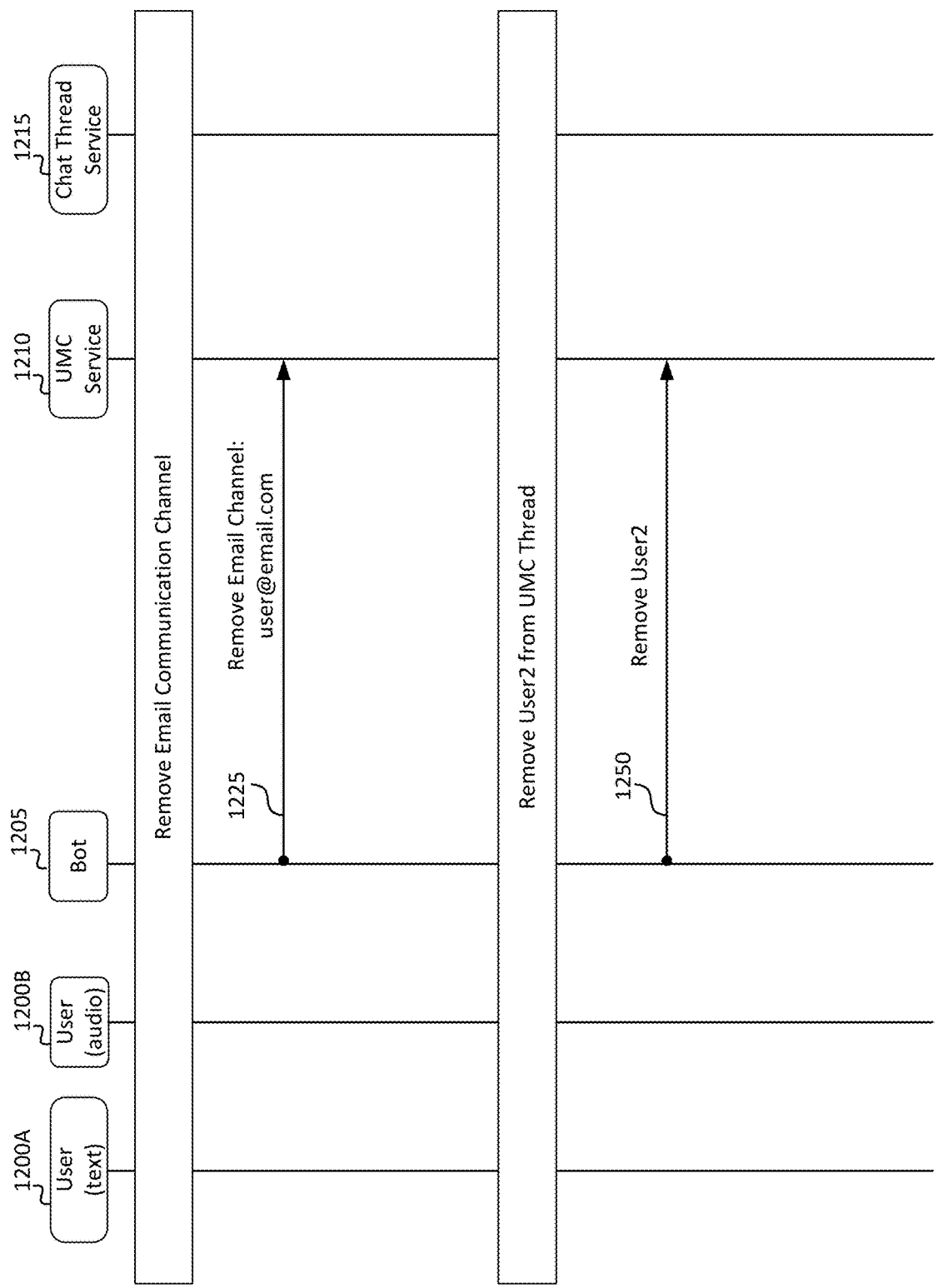
FIG. 12 illustrates an example sequence diagram for removing a communication channel and a participant from a UMC thread.

FIG. 12 illustrates an example sequence diagram for removing a communication channel and a participant from a UMC thread. Referring to FIG. 12, the sequence diagram includes a user 1200, a bot 1205, a UMC service 1210, and a chat thread service 1215. The user 1000 (e.g., user 1200A and user 1200B), the bot 1005, and a user2 (not shown) can be participants in a UMC session.

During a UMC session, participants and communication channels can be added and removed from the UMC thread. In some cases, only participants of the UMC thread can send or receive messages, add participants, remove participants, add communication channels, or remove communication channels.

At some point during a conversation of a UMC session, the user 1200 or the bot 1205 may decide to remove one of the existing communication channels from the UMC thread. For example, the company managing the bot 1205 may no longer have an active email account and may want to remove the existing email communication channel.

The bot 1205 can communicate a request to the UMC service 1210 to remove an email communication channel, as shown in flow 1225. The request may include communication channel information of the email communication channel. The UMC service 1020 can detach the email communication channel from the UMC thread using the communication channel information of the email communication channel. The UMC service 1020 can also remove the subscription for the email communication channel from an email communication service (not shown).

At some point during a conversation of a UMC session, the user 1200 or the bot 1205 may decide to remove one of the existing participants from the UMC thread. For example, an employee (e.g., user2) may have left the company managing the bot 1205. The company may want to remove the existing employee from the UMC thread so that employee no longer has access to any of the data stored in the UMC thread.

The bot 1205 can communicate a request to the UMC service 1210 to remove user2 from the UMC thread, as shown in flow 1250. In some cases, the request is for an existing participant (e.g., user2) to be removed from only a portion of the UMC thread (e.g., any number of communication channels to which the participant is connected). In some cases, the request is for an existing participant (e.g., user2) to be removed entirely from the UMC thread (e.g., all communication channels to which the participant is connected).

The request can include configuration information for user2, such as a user2 channel identifier for each of the communication channels associated with user2. For example, if user2 is connected to a chat communication channel and an SMS communication channel, the configuration information for user2 would include a user2 channel identifier for the chat communication channel and a user2 channel identifier for the SMS communication channel.

The UMC service 1020 can remove user2 from the UMC thread using communication channel information and the configuration information for user2 for each of the communication channels associated with user2. The UMC service 1020 can also update the subscription for each of the communication channels in which user2 was removed.

Figure 13:
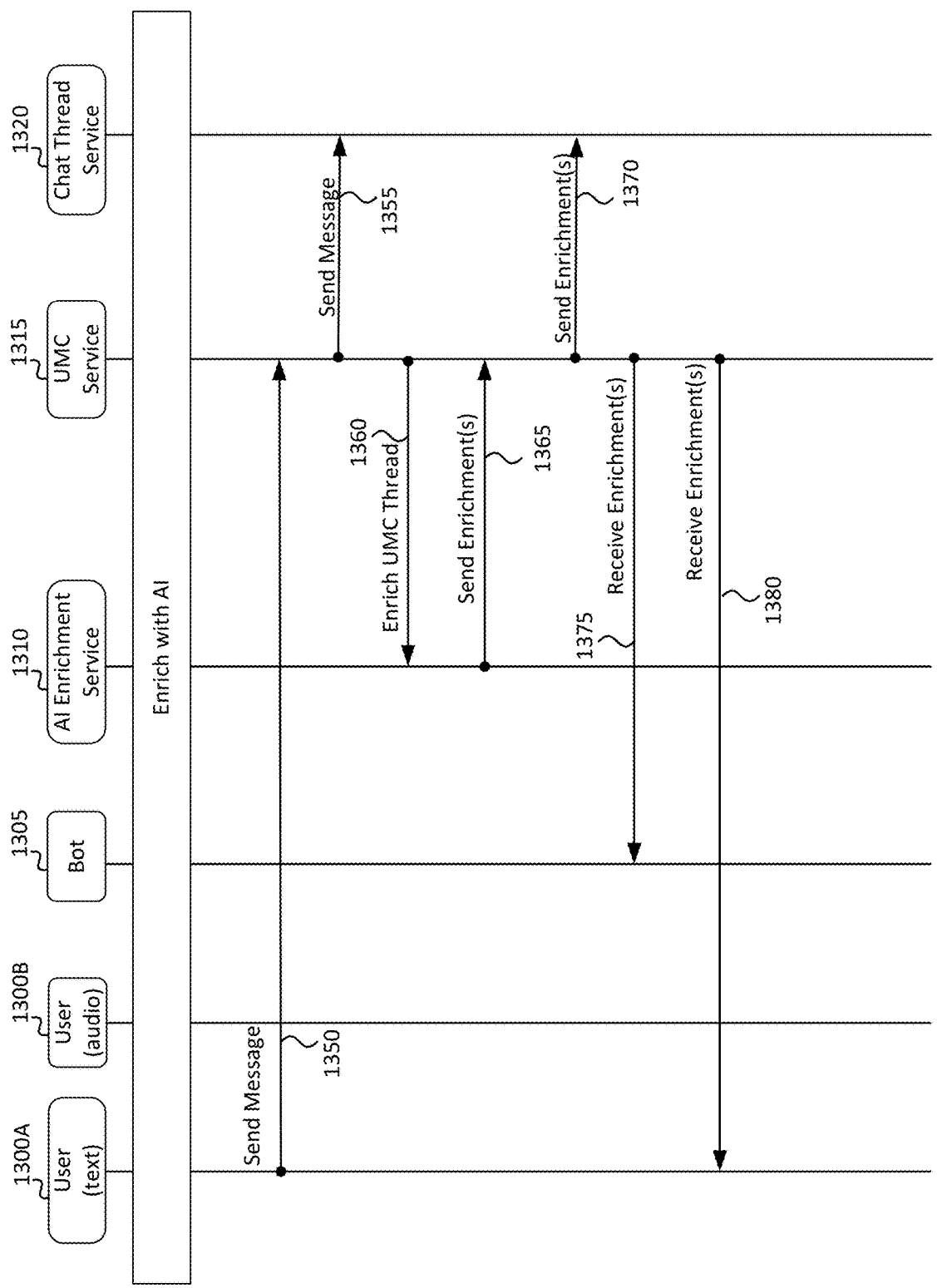
FIG. 13 illustrates an example sequence diagram for providing artificial intelligence ("AI") enrichments to data in a UMC thread.

FIG. 13 illustrates an example sequence diagram for providing AI enrichments to data in a UMC thread. Referring to FIG. 13, the sequence diagram includes a user 1300, a bot 1305, an AI enrichment service 1310, a UMC service 1315, and a chat thread service 1320. The user 1300 and the bot 1305 can be participants in a UMC session. The user 1300 can be a human interacting through text (e.g., user 1300A) or a human interacting through audio (e.g., user 1300B).

Throughout the UMC session, the AI enrichment service 1310 can listen to events from the UMC thread and can generate AI enrichments for the message data. The AI enrichments can include, for example, conversation summaries, a list of follow-up tasks, and user sentiment.

In the illustrative example of FIG. 13, the user 1300A, can send a message to the UMC service 1315, as shown in flow 1350. The UMC service 1315 can provide the message to the chat thread service 1320 to be added to the UMC thread. The UMC service 1315 can also send a request to enrich the UMC thread to the AI enrichment service 1310, as shown in flow 1360. The AI enrichment service 1310 can return one or more enrichments to the UMC service 1315, as shown in flow 1365.

The UMC service 1315 can provide the enrichments to the chat thread service 1320 to be added to the UMC thread, as shown in flow 1370. The UMC service 1315 can provide the enrichments to the bot 1305 and the user 1300A, as shown in flow 1375 and flow 1380, respectively.

The AI enrichments can be provided to any of the participants of the UMC session. As an example, the bot 1305 may be provided user sentiment enrichments throughout the UMC session to help the bot 1305 understand the current emotion of the user 1300. As another example, the user 1300 may be provided a list of follow-up tasks at the end of the UMC session. As yet another example, both the user 1300 and the bot 1305 may be provided with a summary of any conversations during the UMC session.

FIGS. 14A-14D illustrate example scenarios for providing unified multichannel communication according to example embodiments. In a scenario where a user is experiencing an issue with their internet connection, there are multiple ways of contacting an internet provider for technical support.

Figure 14A:
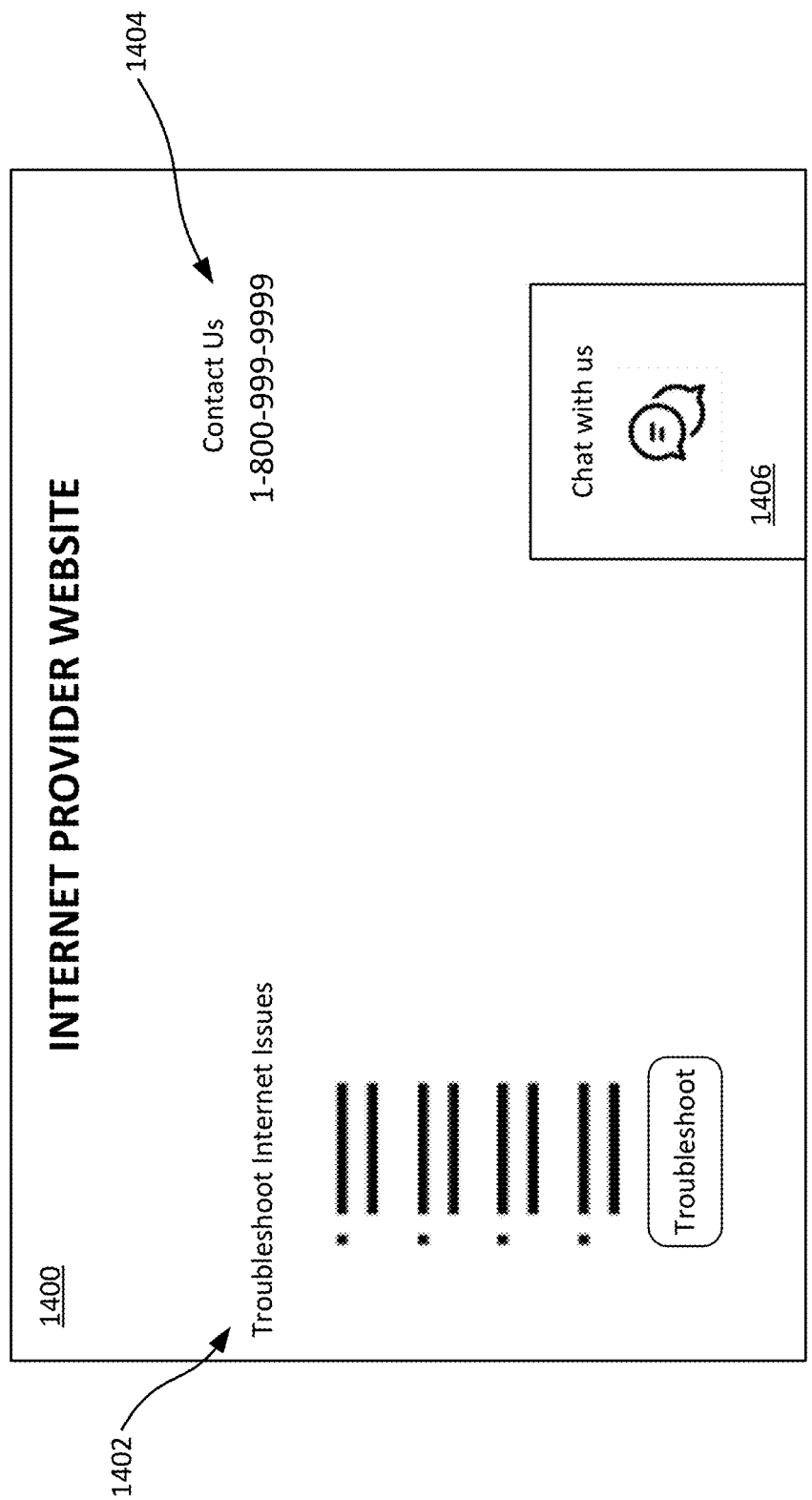
FIGS. 14A-14D illustrate example scenarios for providing unified multichannel communication according to example embodiments.

Referring to FIG. 14A, the user can browse to a website 1400 for the internet provider on their computing device. The computing device may be any computing device such as, but not limited to, a laptop computer, a tablet, a personal digital assistant, a smart phone, a smart television, a gaming console, wearable device, and the like.

The website 1400 can provide the user with a variety of options for receiving technical support. Here, the user is provided options for troubleshooting the issue without contacting the internet provider by selecting a troubleshoot command (e.g., command 1402), contacting the internet provider by calling a phone number (e.g., phone number 1404), or chatting with the internet provider by selecting a chat command (e.g., command 1406).

Figure 14B:
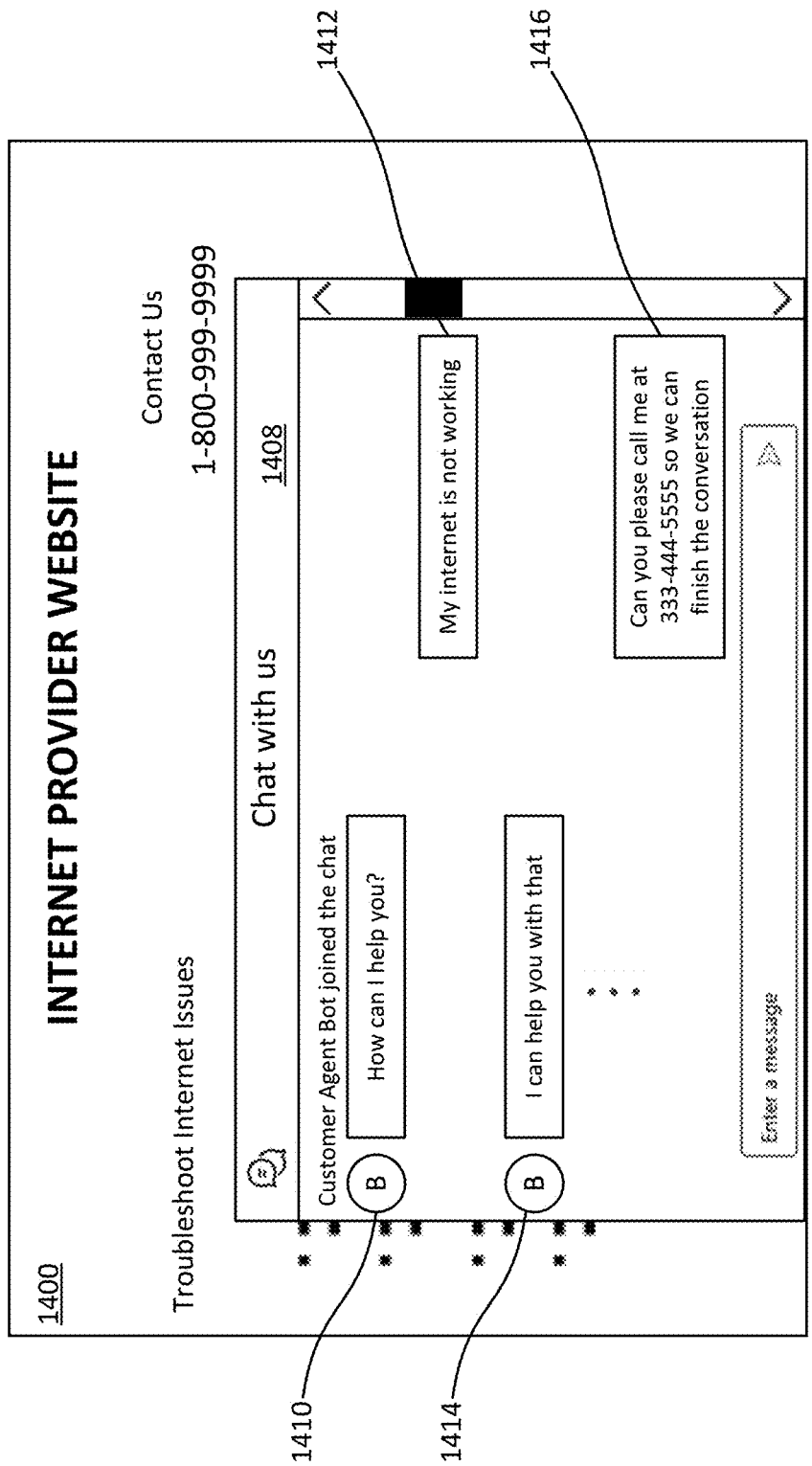

Referring to FIG. 14B, the user begins a conversation with the internet provider by selecting a chat command (e.g., command 1406 shown in FIG. 14A). When the user selects the chat command, a chat UI 1408 is displayed on the website 1400. Through the chat UI 1408, the user can communicate with a customer agent bot ("Bot") provided by the internet provider. Here, the conversation between the user and the Bot is a chat conversation over a communication channel having a chat communication mode.

In the illustrative example of FIG. 14B, the Bot and the user exchange chat messages (e.g., chat message 1410, chat message 1412, and chat message 1414) to try to resolve the internet connection issue. The Bot starts the chat conversation by sending chat message 1410, which includes "How can I help you?", to the user and the user responds with chat message 1412 stating "My internet is not working." In chat message 1414, the Bot states "I can help you with that." Each chat message is displayed as part of a UMC thread on the chat UI 1408.

At some point during the chat conversation, the user decides to change to a different communication mode and sends a chat message 1416 to the Bot asking to continue the conversation through a voice call. The chat message 1416 includes "Can you please call me at 333-444-5555 so we can finish the conversation."

Figure 14C:
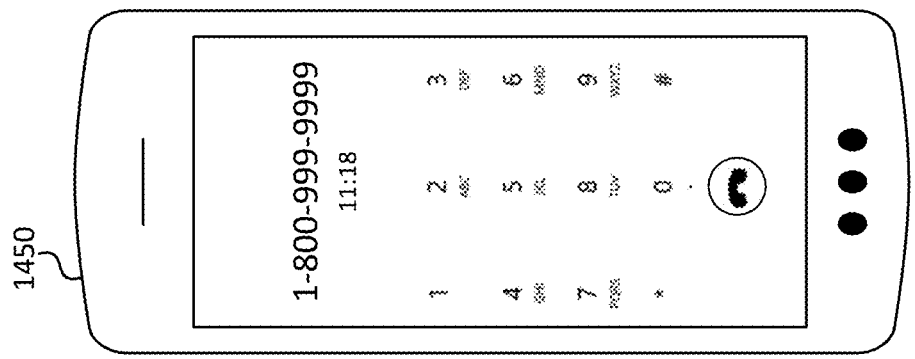
Figure 14C:
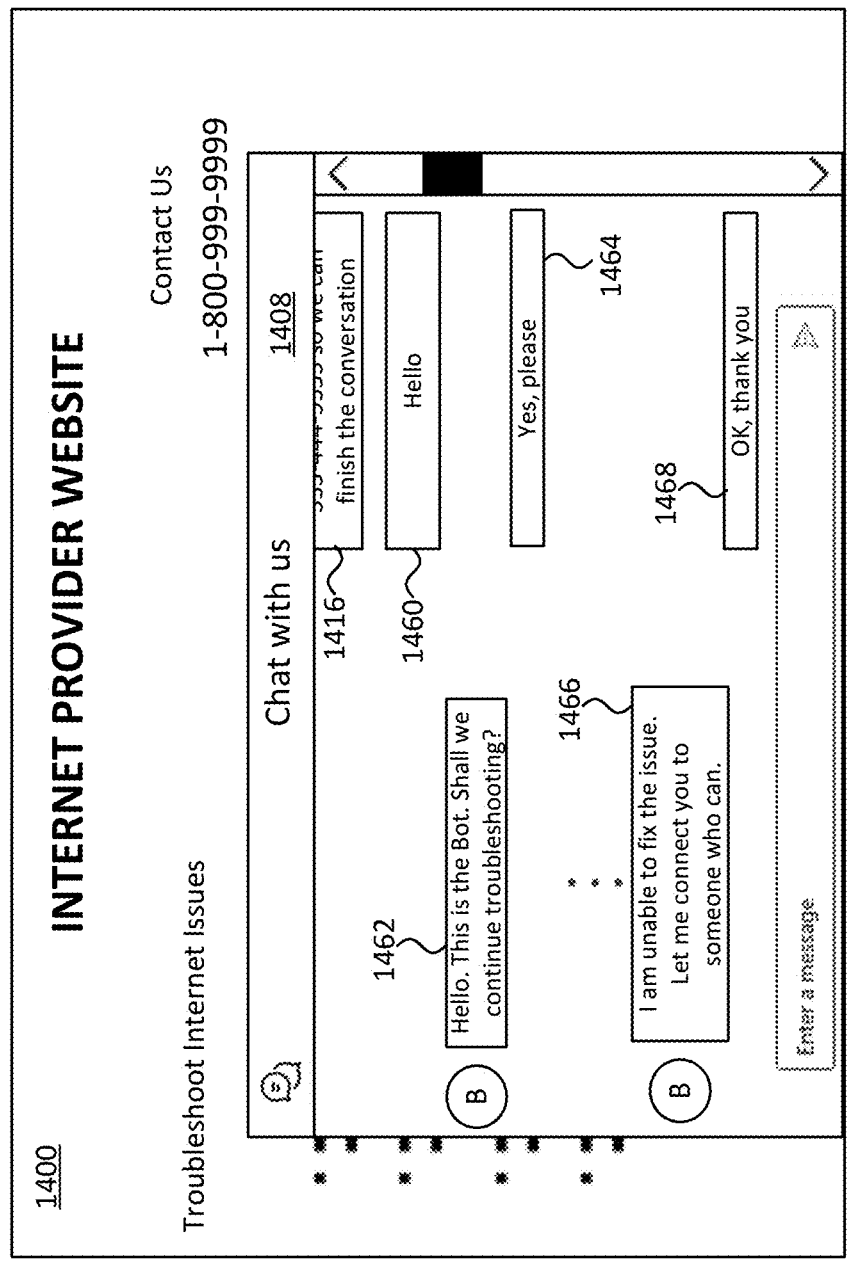

Referring to FIG. 14C, the user is called on a mobile device 1450 using the phone number provided in chat message 1416 described in FIG. 14B. The conversation between the user and the Bot is continued as a voice call conversation over a communication channel having a voice call communication mode.

In the illustrative example of FIG. 14C, the user can participate in the conversation with the Bot through two different communication modes. Indeed, while the user is communicating with the Bot through the voice call, the user can continue to interact with the Bot through the UMC thread (e.g., by also having their browser window open to website 1400 displaying the chat UI 1408).

Within the chat UI 1408, not only can the user see the chat messages from the chat conversation as described with respect to FIG. 14B, but the user can also see a transcript of the voice call as text messages in the UMC thread (e.g., message 1460, message 1462, message 1464, message 1466, and message 1468). The user can interact with the UMC thread as well.

Figure 14D:
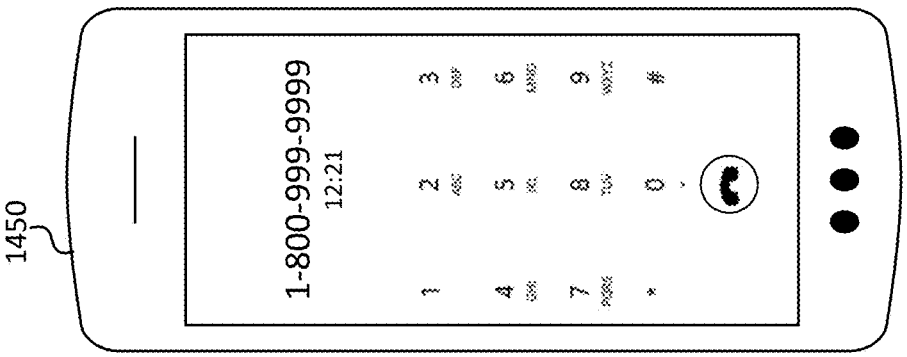
Figure 14D:
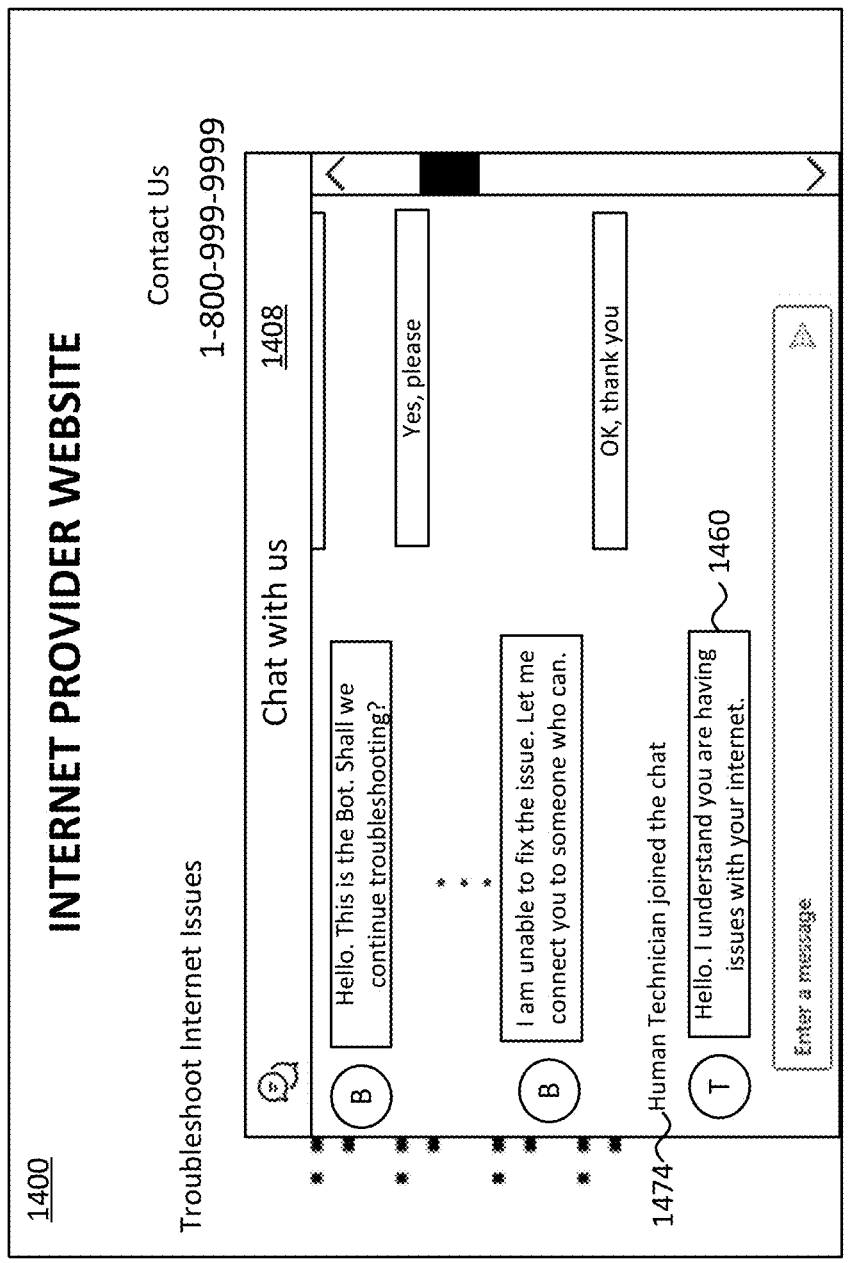

Referring to FIG. 14D, while the user remains on the voice call conversation on mobile device 1450, a human technician for the internet provider is added to the voice call and audio is communicated between the user and the technician over the communication channel having a voice call communication mode.

Like the conversation with the Bot described in FIG. 14C, the user can participate in the conversation with the technician through two different communication modes. While the user is communicating with the technician through the voice call, the user can continue to interact through the UMC thread (e.g., by also having their browser window open to website 1400 displaying the chat UI 1408).

In the illustrative example of FIG. 14D, an indication 1474 that the human technician joined the chat is displayed on the chat UI 1408 and then any audio communicated between the user and the technician is converted into text and added to the UMC thread as a message (e.g., message 1480). Here, the technician says "Hello. I understand you have having issues with your internet." to the user and this is displayed as text in message 1480. As the user and the human technician continue the conversation, additional messages are added and displayed on the chat UI 1408.

Figure 15A:
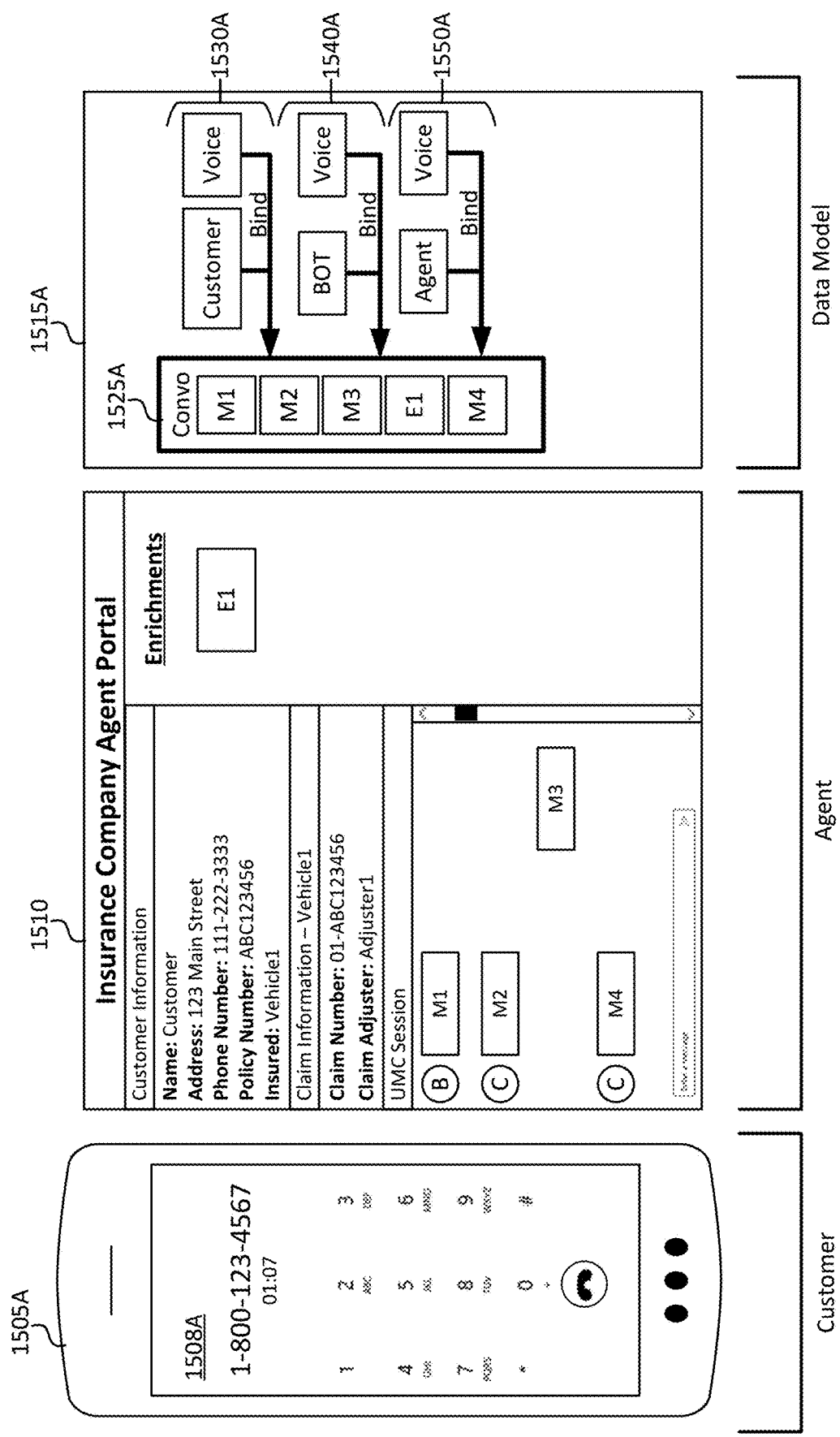
FIGS. 15A-15C illustrate example scenarios for providing unified multichannel communication according to example embodiments.
Figure 15B:
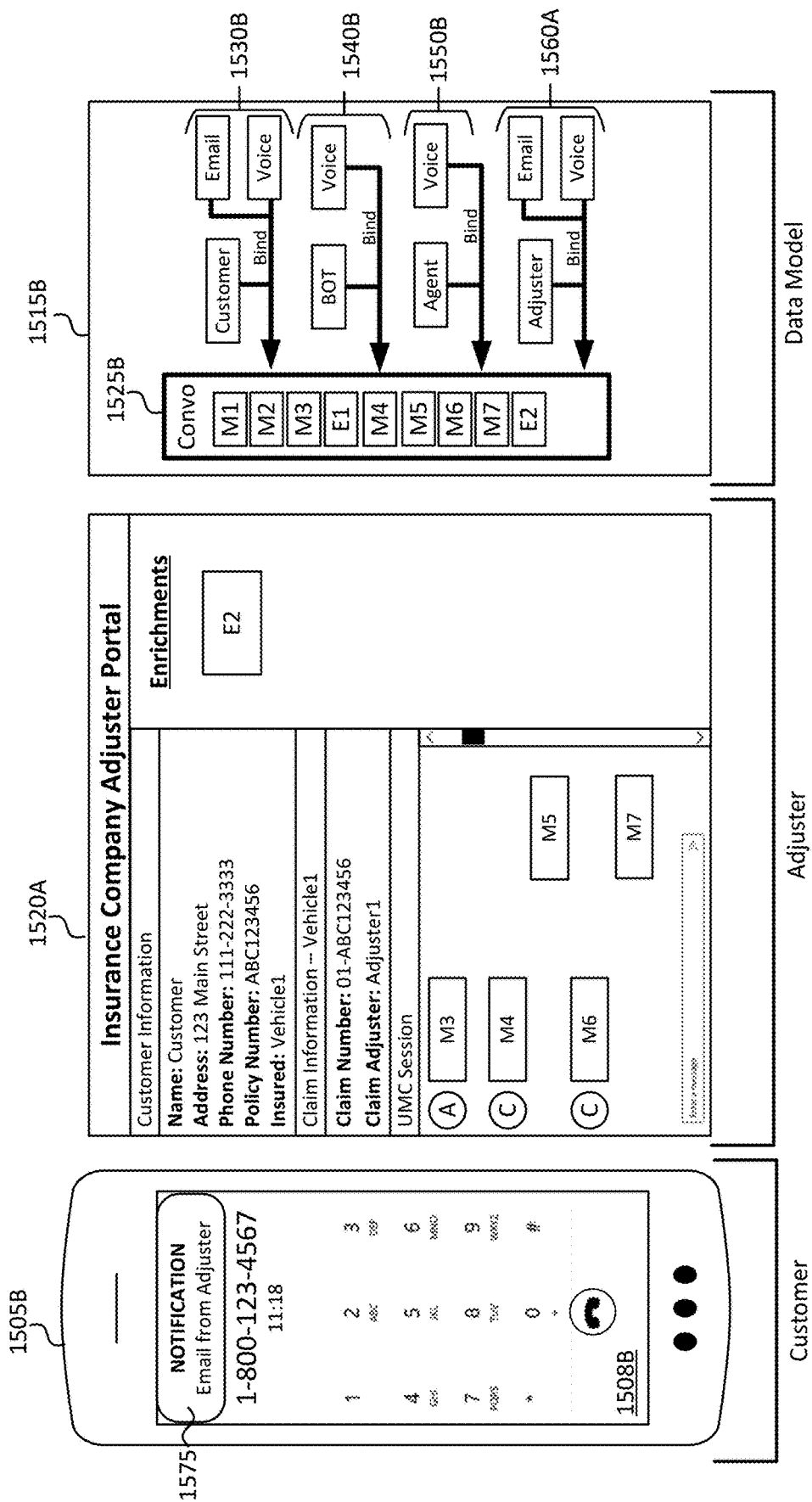
Figure 15C:
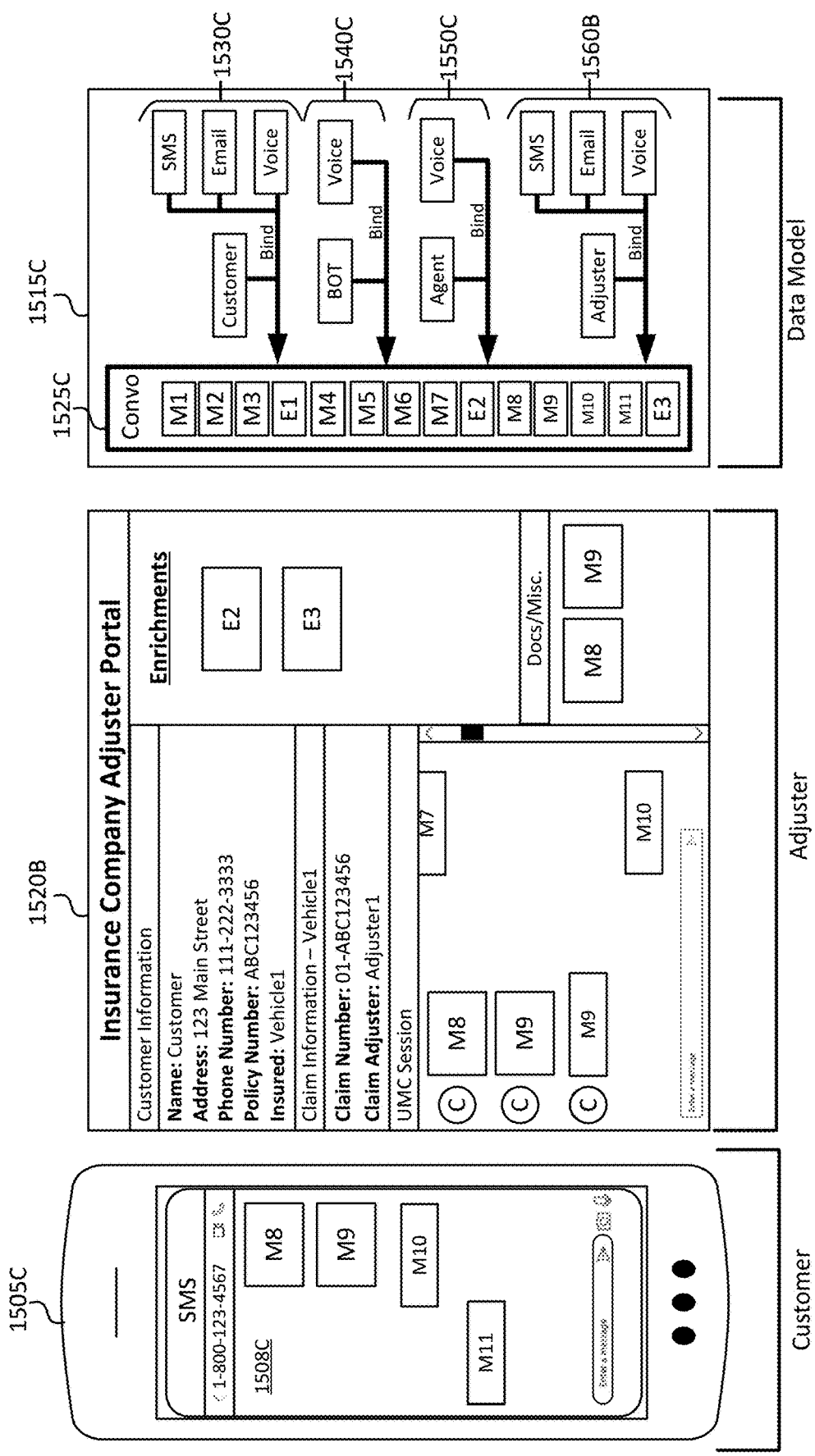

FIGS. 15A-15C illustrate example scenarios for providing unified multichannel communication according to example embodiments. In a scenario where a customer is involved in a minor car accident, there are many steps the customer must take when dealing with the aftermath of the accident. For example, there are multiple entities for the customer to contact. For example, the customer may first contact an insurance company (via a bot or a live agent), then a claims adjuster for the insurance company, and then an automotive repair shop to repair the vehicle. There are a variety of ways of contacting each of these entities.

Referring to FIGS. 15A-15C, the customer can initiate a UMC session with the insurance company. The customer can communicate with the insurance company during the UMC session using a mobile device 1505 displaying a user interface 1508 (e.g., mobile device 1505A displaying UI 1508A shown in FIG. 15A, mobile device 1505B displaying UI 1508B shown in FIG. 15B, and mobile device 1505C displaying UI 1508C shown in FIG. 15C).

While communicating with the insurance company during the UMC session, the customer can speak with a bot, a live customer agent, and a claims adjuster. During any communication with the live customer agent, the live customer agent can view an agent portal 1510 shown in FIG. 15A. During any communication with the claims adjuster, the claims adjuster can view an adjuster portal 1520 (e.g., adjuster portal 1520A shown in FIG. 15B and adjuster portal 1520B shown in FIG. 15C).

The communication between the customer and the insurance company during the UMC session can be stored in a UMC thread. As the customer communicates with the insurance company, data from the interactions are added to the UMC thread. The UMC thread can be represented as a conversation object, which is bound by a communication channel to a user and messages can pass through those communication channels, as shown in an example data model.

In FIGS. 15A-15C, an example data model 1515 illustrating the UMC thread is shown at various points during the UMC session and can include a conversation object 1525, information for the customer 1530, information for the bot 1540, information for the agent 1550, and information for the adjuster 1560.

In FIG. 15A, data model 1515A includes conversation object 1525A, information for the customer 1530A, information for the bot 1540A, and information for the agent 1550A. In FIG. 15B, data model 1515B includes conversation object 1525B, information for the customer 1530B, information for the bot 1540B, information for the agent 1550B, and information for the adjuster 1560A. In FIG. 15C, data model 1515C includes conversation object 1525C, information for the customer 1530C, information for the bot 1540C, information for the agent 1550C, and information for the adjuster 1560B.

Referring to FIG. 5A, the customer can contact the insurance company by calling the insurance company's 1-800 number (e.g., 1-800-123-4567) through the UI 1508A of the mobile device 1505A.

When the customer calls the insurance company, the customer can first talk to a bot, and the bot can route the customer to the correct agent. Here, the customer and the bot are connected to and communicating over a voice calling communication channel.

The UMC thread can be updated to include the voice calling communication channel, the customer, and the bot. In data model 1515A, information for the customer 1530A shows the customer is connected to the voice calling communication channel and information for the bot 1540A shows the bot is connected to the voice calling communication channel. The conversation object 1525A shows the interaction between the customer and the bot as messages (e.g., M1 and M2).

When the customer is transferred to the agent, the customer and the agent are then connected to and communicating over the voice calling communication channel. The UMC thread can be updated to add the agent as being connected to the voice calling communication channel. In data model 1515A, information for the agent 1550A shows the agent is connected to the voice calling communication channel. As the customer and the agent interact, the interactions between the customer and the agent are added to the UMC thread and stored in the conversation object 1525A as messages (e.g., M3 and M4).

Advantageously, context persists naturally between the bot and the agent. That is, when the customer is transferred from the bot to the agent, the agent is added to the UMC thread and can now have access to the context of the conversation the customer had with the bot. Therefore, the agent does not have to ask for the same information from the customer over again (e.g., name, policy number, and details about the car accident).

While the customer and the agent are communicating over the voice call, the agent can be interacting with the agent portal 1510. In the illustrative example of FIG. 15A, the agent portal 1510 includes a section for customer information (e.g., name, address, phone number, policy number, and information about any insured vehicles), a section for claim information (e.g., claim number and claim adjuster), a display of the UMC session with the customer, and a section for any added enrichments (e.g., E1).

Through the display of the UMC session with the customer in the agent portal 1510, the agent can not only see the messages between the customer and the agent (e.g., M3 and M4), but also the customer and the bot (e.g., M1 and M2). As previously described, the agent has access to the messages between the customer and the bot (e.g., M1 and M2) because the context persists naturally between the bot and the agent.

Similar to the messages (e.g., M1-M4), any enrichments can be added to the UMC thread and stored in the conversation object 1525A, as shown in data model 1515A. There are a wide variety of enrichments which can be added to the UMC thread. While the customer and the agent are discussing the car accident, the communication is being added to the UMC thread as messages. Those messages can also be sent to an AI service to be analyzed and enriched. In one example, the added enrichment can include information about which adjuster to assign to the customer's new claim. In another example, the added enrichment can include a summary of the conversation between the customer and the bot and the customer and the agent.

Referring to FIG. 5B, once the adjuster is assigned to the customer's claim, the adjuster can contact the customer to follow up by calling the customer's phone number. The customer can communicate with the adjuster through the user's mobile device 1505B. Here, the customer and the adjuster are connected to and communicating over a voice calling communication channel.

The UMC thread can be updated to add the adjuster as being connected to the voice calling communication channel. In data model 1515B, information for the adjuster 1560A shows the agent is connected to the voice calling communication channel.

As the customer and the adjuster interact, the interactions between the customer and the adjuster are added to the UMC thread and stored in the conversation object 1525B as messages (e.g., M5, M6, and M7).

Advantageously, context now persists naturally between the bot, the agent, and the adjuster. That is, when the customer is communicating with the adjuster after speaking with the agent, the adjuster is added to the UMC thread and can now have access to the context of the conversation the customer had with both the bot and the agent. Therefore, the adjuster does not have to ask for the same information from the customer over again (e.g., name, policy number, and details about the car accident).

While the customer and the adjuster are communicating over the voice call, the adjuster can be interacting with the adjuster portal 1520A. In the illustrative example of FIG. 15B, the adjuster portal 1520A includes a section for customer information (e.g., name, address, phone number, policy number, and information about any insured vehicles), a section for claim information (e.g., claim number and claim adjuster), a display of the UMC session with the customer, and a section for any added enrichments (e.g., E2).

Through the display of the UMC session with the customer in the adjuster portal 1520A, the adjuster can not only see the messages between the customer and the adjuster (e.g., M5, M6, and M7), but also the messages from the previous conversation between customer and the agent (e.g., M3 and M4), as described with respect to FIG. 15A. As previously described, the adjuster has access to the messages between the customer and the agent (e.g., M3 and M4) because the context persists naturally between the bot, the agent, and now the adjuster.

Similar to the messages (e.g., M1-M4), any enrichments can be added to the UMC thread and stored in the conversation object 1525B, as shown in data model 1515B. There are a wide variety of enrichments which can be added to the UMC thread. While the customer and the adjuster are discussing the next steps in the claims process, the communication is being added to the UMC thread as messages. Those messages can also be sent to an AI service to be analyzed and enriched.

In one example, the AI service can analyze the messages to prepare an email for the customer outlining the process for filing the claim, as well as contact information for the agent and/or adjuster. The email can be displayed in the adjuster portal 1520A as an enrichment (e.g., E2).

While the customer and the adjuster are still communicating over the voice call, the adjuster can communicate the email to the customer using an email communication channel. When the customer receives the email, a notification 1575 for the email can be displayed on the UI 1508B of the user's mobile device 1505B. The UMC thread can be updated to include the email communication channel for the customer and the adjuster. In data model 1515B, information for the customer 1530B shows the customer is connected to the email communication channel and information for the agent 1550A shows the adjuster is connected to the email communication channel.

Referring to FIG. 15C, after a period of time (e.g., days), the customer can receive estimate documents for the repair of the vehicle from the body shop. The customer can provide those estimate documents to the adjuster via SMS using the user's mobile device 1505C. The estimate documents are displayed as M8 and M9 in the UI 1508C of the user's mobile device 1505C. Here, the customer and the adjuster are connected to and communicating over an SMS calling communication channel.

The UMC thread can be updated to include the SMS communication channel for the customer and the adjuster. In data model 1515C, information for the customer 1530C shows the customer is connected to the email communication channel and information for the agent 1550B shows the adjuster is connected to the email communication channel.

As the customer and the adjuster interact, the interactions between the customer and the adjuster are added to the UMC thread and stored in the conversation object 1525C as messages (e.g., M8, M9, M10, and M11).

Advantageously, context remains persistent between the bot, the agent, and the adjuster. That is, when the customer continues communicating with the adjuster at a later time (even days, weeks, or years later), the conversation between the customer and the adjuster is not a cold start conversation. Both the customer and the adjuster have access to the entire conversation (and context) through the UMC thread. Therefore, the adjuster can pick up where they last left without having to gather the context from the customer again.

While the customer and the adjuster are communicating over the voice call, the adjuster can be interacting with the adjuster portal 1520B. In the illustrative example of FIG. 15C, the adjuster portal 1520B includes a section for customer information (e.g., name, address, phone number, policy number, and information about any insured vehicles), a section for claim information (e.g., claim number and claim adjuster), a display of the UMC session with the customer, a section for any added enrichments (e.g., E2 and E3), and a section for documents (e.g., M8 and M9).

Through the display of the UMC session with the customer in the adjuster portal 1520B, the adjuster can see the messages sent from the customer via text (e.g., M8, M9, M10, and M11). The documents sent as M8 and M9 can be displayed in the to the adjuster in the section for documents in the adjuster portal 1520B.

Similar to the messages (e.g., M8, M9, M10, and M11), any enrichments can be added to the UMC thread and stored in the conversation object 1525C, as shown in data model 1515C. There are a wide variety of enrichments which can be added to the UMC thread. While the customer and the adjuster are communicating via text, the communication is being added to the UMC thread as messages. Those messages can also be sent to an AI service to be analyzed and enriched.

In one example, the AI service can analyze the documents sent as M8 and M9 to provide a report for the adjuster. The report can be displayed in the adjuster portal 1520B as an enrichment (e.g., E3).

Figure 16A:
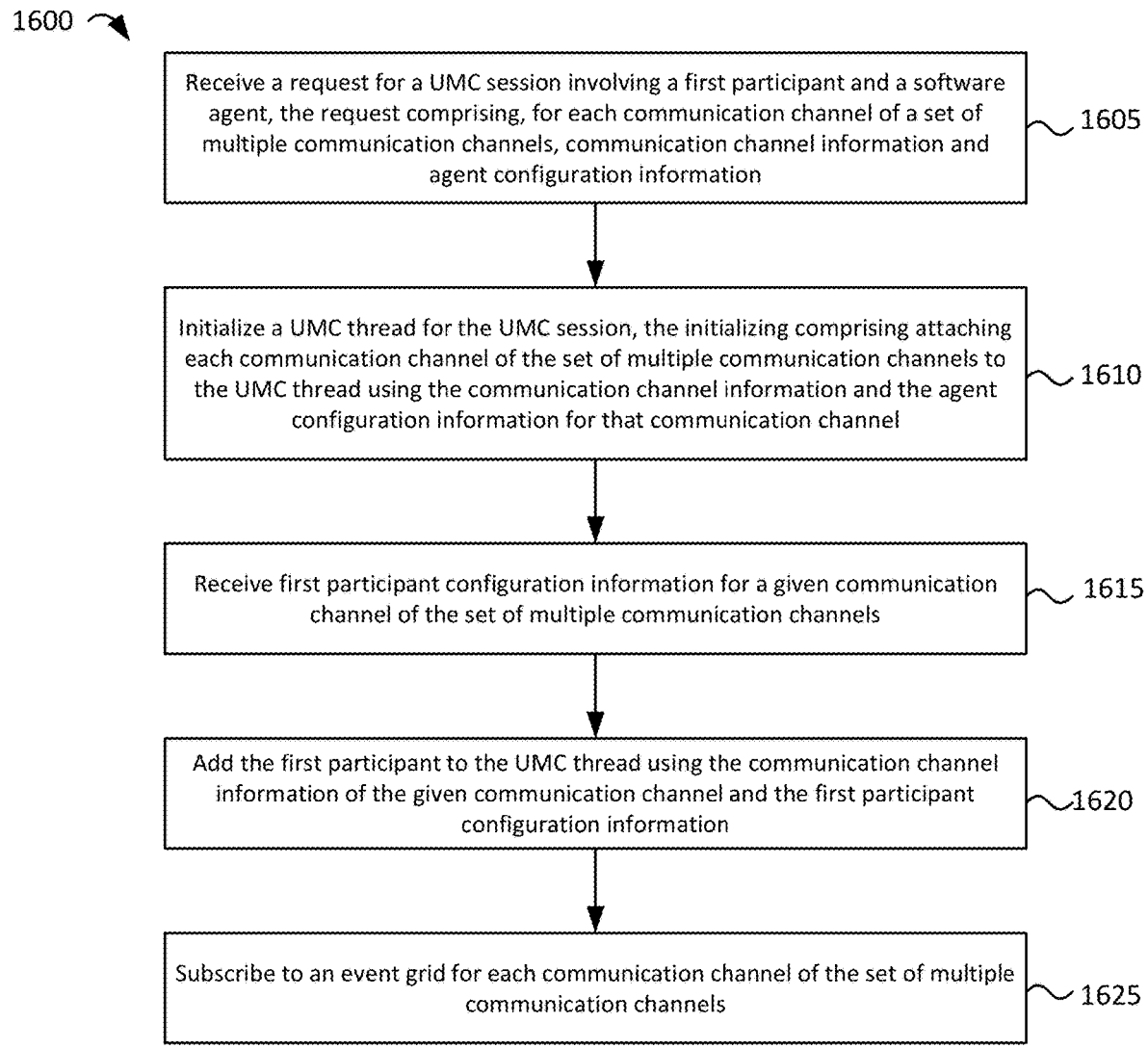
Figure 16B:
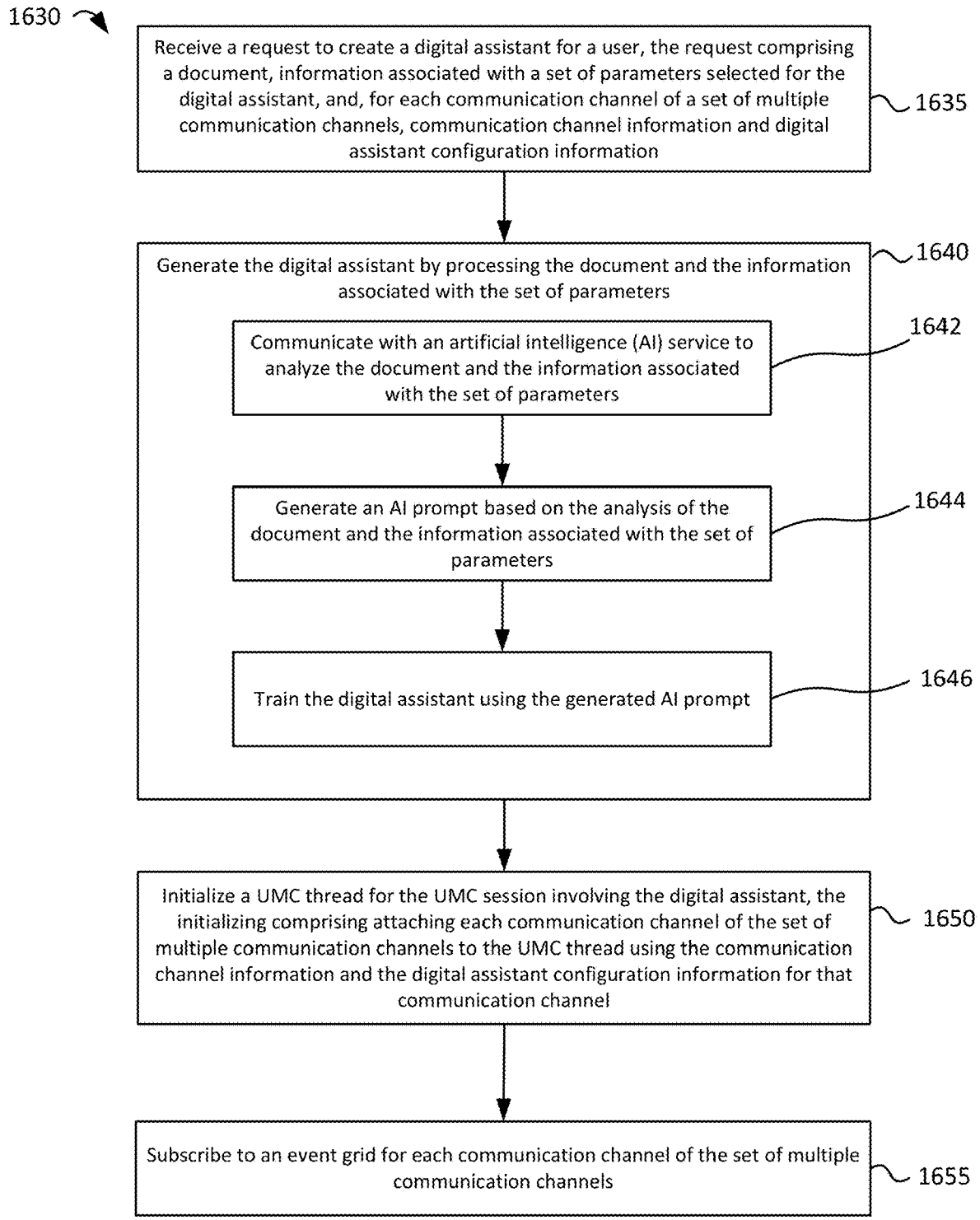

FIGS. 16A-16C illustrate an example process flow diagram for providing unified multichannel communication according to certain embodiments, where FIG. 16A illustrates an example process flow diagram for providing unified multichannel communication for a UMC session involving a software agent; FIG. 16B illustrates an example process flow diagram for creating a digital assistant providing unified multichannel communication; and FIG. 16C illustrates an example process flow diagram for interacting with a digital assistant providing unified multichannel communication.

Referring to FIGS. 16A-16C, a service (e.g., a UMC service and/or an agent service) performing process 1600 described with respect to FIG. 16A, process 1630 described with respect to FIG. 16B, and process 1660 described with respect to FIG. 16C can be implemented by a server, which can be embodied as described with respect to computing system 2000 shown in FIG. 20 and even, in whole or in part, by mobile device 2100 as shown in FIG. 2100. The UMC service enables conversations between multiple participants and across different communication channels. In some cases, the UMC service and the agent service are separate services. In some cases, the UMC service and the agent service are a same service.

Referring to process 1600 of FIG. 16A, the UMC service can receive (1605) a request for a UMC session involving a first participant and a software agent. The first participant can be a human interacting through text or audio and the software agent can be any suitable software agent interacting through text.

The request can include communication channel information and agent configuration information for each communication channel of a set of multiple communication channels. The set of multiple communication channels can include communication channels having different communication modes and associated data types. The data types can include audio data types, video data types, and text data types.

For example, the set of communication channels can include a chat communication channel having a chat message communication mode and an associated text data type, a chat communication channel having a chat message communication mode and an associated audio data type, an SMS communication channel having an SMS message communication mode and associated text data type, an email communication channel having an email message communication mode and associated text data type, and a social media communication channel having a chat message communication mode and associated text data type.

As previously described, configuration information can include, but is not limited to, an agent channel identifier associated with each communication channel of the set of communication channels. For example, an agent channel identifier for an SMS communication channel could include a phone number of the agent, an agent channel identifier for an email communication channel could include an email address of the agent, an agent channel identifier for a calling communication channel could include a same or different phone number for the agent, and an agent channel identifier for a social media communication channel could include a social media identifier for the agent.

The UMC service can initialize (1610) a UMC thread for the UMC session. The initializing can include attaching each communication channel of the set of multiple communication channels to the UMC thread using the communication channel information and the agent configuration information for that communication channel. The agent configuration information comprising an agent channel identifier.

The UMC service can receive (1615) a first participant configuration information for a given communication channel of the set of multiple communication channels. The first participant configuration information comprising a first participant channel identifier. In some cases, the first participant configuration information for the first participant for a given communication channel of the set of communication channels is received with the request described in step 1605. In some cases, the first participant configuration information is received in a separate request.

The UMC service can add (1620) the first participant to the UMC thread using the communication channel information of the given communication channel and the first participant configuration information. The UMC service can subscribe (1625) to events for each communication channel of the set of multiple communication channels.

In some cases, the UMC service can receive a new request to add a second participant to the UMC session. The new request can include second participant configuration information for an additional given communication channel of the set of multiple communication channels. The second participant configuration information can include a second participant channel identifier. The UMC service can add the second participant to the UMC thread using the communication channel information of the additional given communication channel and the second participant configuration information and update the subscription for the events for the additional given communication channel.

In some cases, the UMC service can receive a new request to add an additional communication mode for the first participant to the UMC session. The new request can include first participant configuration information for an additional given communication channel of the set of multiple communication channels. The UMC service can update the UMC thread using the communication channel information of the additional given communication channel and the first participant configuration information for the additional given communication channel. The UMC service can also update the subscription for the events for the additional given communication channel.

In some cases, the UMC service can receive a new request to remove a communication mode for the first participant from the UMC session. The new request can include first participant configuration information for an additional given communication channel of the set of multiple communication channels. The UMC service can update the UMC thread to remove the communication mode using the communication channel information of the additional given communication channel and the first participant configuration information for the additional given communication channel. The UMC service can also update the subscription for the events for the additional given communication channel.

In some cases, the UMC service can receive a new request to remove the second participant from the UMC session. The new request can include second participant configuration information for an additional given communication channel of the set of multiple communication channels. The UMC service can update the UMC thread to remove the second participant using the communication channel information of the additional given communication channel and the second participant configuration information for the additional given communication channel. The UMC service can also update the subscription for the events for the additional given communication channel.

Referring to process 1630 of FIG. 16B, the agent service can receive (1635) a request to create a digital assistant for a user. The request can include an artifact, information associated with a set of parameters selected for the digital assistant, and, for each communication channel of a set of multiple communication channels, communication channel information and digital assistant configuration information.

The artifact can be, for example, a document, an image, or a video. The set of multiple communication channels can include communication channels having different communication modes and associated data types.

The agent service can (1640) generate the digital assistant by processing the artifact and the information associated with the set of parameters. During the generation of the digital assistant, the agent service can communicate (1642) with an AI service to analyze the artifact and the information associated with the set of parameters. The agent service can generate (1644) an AI prompt based on the analysis of the artifact and the information associated with the set of parameters; and train (1646) the digital assistant using the generated AI prompt.

The UMC service can initialize (1650) a UMC thread for the UMC session involving the digital assistant. The initializing of the UMC thread can include attaching each communication channel of the set of multiple communication channels to the UMC thread using the communication channel information and the digital assistant configuration information for that communication channel. The UMC service can subscribe (1655) to events for each communication channel of the set of multiple communication channels.

The UMC service can facilitate unified multichannel communication between the digital assistant and other participants using the UMC thread. Referring to process 1660 of FIG. 16C, the UMC service can receive (1665) a first communication message from a first participant to a digital assistant. The first participant can be connected to a first communication channel of a set of multiple communication channels, and the digital assistant can be connected to a second communication channel of the set of multiple communication channels.

The set of multiple communication channels includes communication channels having different communication modes and associated data types. The data types can include audio data types, video data types, and text data types. In some cases, the first communication channel and the second communication channel are communication channels having a same communication mode and data type. In some cases, the first communication channel and the second communication channel are communication channels having a different communication mode and data type.

The first communication message can be an event received from the first communication channel. The event can include a first participant channel identifier for the first communication channel and event data having a data type associated with the communication mode of the first communication channel.

The UMC service can process (1670) the event data of the first communication message. During the processing (1670) of the event data, the UMC service can determine (1675) the data type associated with the communication mode of the first communication channel.

If the data type associated with the communication mode of the first communication channel is not a text data type, the UMC service can convert (1680) the event data to a text message. The UMC service can add (1685) the event data of the first communication message to a UMC thread. Here, the UMC service can incorporating any conversion to text when adding the event data to the UMC thread.

If the data type associated with the communication mode of the first communication channel is different from a data type associated with a communication mode of the second communication channel, the UMC service can convert (1690) the event data to the data type associated with the communication mode of the second communication channel.

The UMC service can provide (1695) the event data of the first communication message to the digital assistant. Here, the UMC service can incorporate any conversion to the data type associated with the communication mode of the second communication channel when providing the event data to the digital assistant.

In some cases, processing of the event data of the first communication message also includes providing the event data of the first communication message, incorporating any conversion to the data type associated with the communication mode of the second communication channel, to the first participant. The UMC service can provide the message to the first participant for any communication channels the first participant is actively connected to. For example, the first participant may be talking on the phone, but also has the chat open in a browser. In this example, the UMC service can provide the message to the first participant through a calling communication channel and a chat communication channel. Advantageously, the UMC service can manage the communications to make sure the messages are provided having the correct data type associated with the communication mode of the communication channel through which the message is being provided.

In some cases, the UMC service can receive a second communication message from the first participant to a third participant, where both the first participant and the third participant are connected to the first communication channel. The second communication message can be an event received from the first communication channel. The event can include the first participant channel identifier corresponding to the first communication channel and event data having the data type associated with the communication mode of the first communication channel.

The UMC service can process the event data of the second communication message. During the processing of the event data, the UMC service can determine the data type associated with the communication mode of the first communication channel. If the data type associated with the communication mode of the first communication channel is not a text data type, the UMC service can convert the event data to a text message. The UMC service can then add the event data of the second communication message, incorporating any conversion to text, to the UMC thread. The UMC service can also provide the event data of the second communication message to the third participant.

In some cases, the digital assistant is still active in the UMC session. Here, if the data type associated with the communication mode of the first communication channel is different from the data type associated with the communication mode of the second communication channel, the UMC service can convert the event data to the data type associated with the communication mode of the second communication channel; and provide the event data of the second communication message, incorporating any conversion to the data type associated with the communication mode of the second communication channel, to the digital assistant.

In some cases, the UMC service can receive a third communication message from the first participant to the digital assistant, where the first participant is connected to the second communication channel and the digital assistant is connected to the first communication channel. The third communication message can be an event received from the second communication channel. The event can include a first participant channel identifier corresponding to the second communication channel and event data having a data type associated with a communication mode of the second communication channel.

The UMC service can process the event data of the third communication message. During the processing of the event data, the UMC service can determine the data type associated with the communication mode of the second communication channel. If the data type associated with the communication mode of the second communication channel is not a text data type, the UMC service can convert the event data to a text message and add the event data of the third communication message, incorporating any conversion to text, to the UMC thread.

If the data type associated with the communication mode of the second communication channel is different from the data type associated with the communication mode of the first communication channel, the UMC service can convert the event data to the data type associated with the communication mode of the first communication channel and provide the event data of the third communication message, incorporating any conversion to the data type associated with the communication mode of the first communication channel, to the digital assistant.

As an example, the data type associated with the communication mode of the first communication channel is a voice data type and the data type associated with the communication mode of the second communication channel is a text data type. In this example, during the processing of the event data of the first communication message, the UMC service can determine the data type associated with the communication mode of the first communication channel is the voice data type; convert the event data to a text message; and add the event data of the first communication message, incorporating any conversion to text, to the UMC thread. The UMC service can also provide the event data of the first communication message converted to the text message to the second participant.

During the processing of the event data of the first communication message, the UMC service can also provide the event data of the first communication message converted to the text message to the first participant.

Continuing with the example where the data type associated with the communication mode of the first communication channel is a voice data type and the data type associated with the communication mode of the second communication channel is a text data type, the UMC service can receive a fourth communication message from the digital assistant to the first participant. The digital assistant can be connected to the second communication channel and the first participant can be connected to the first communication channel. The fourth communication message can be an event received from the second communication channel. The event can include a second participant channel identifier corresponding to the second communication channel and event data having the text data type associated with the communication mode of the second communication channel.

The UMC service can process the event data of the fourth communication message. During the processing of the event data, the UMC service can determine the data type associated with the communication mode of the second communication channel is the text data type and add the event data of the fourth communication message to the UMC thread. The UMC service can convert the event data to the voice data type and provide the event data of the fourth communication message, incorporating the conversion to the voice data type, to the first participant. The UMC service can provide the event data of the fourth communication message to the first participant.

In some cases, the UMC service can providing the event data of the first communication message, incorporating any conversion to text, to an AI service and receive AI enrichments associated with the event data from the AI service. The UMC service can provide the AI enrichments to any or all the participants.

A more detailed discussion of initializing the UMC thread is discussed in FIG. 6 and a more detailed discussion of facilitating unified multichannel communication is discussed in FIGS. 7-13.

Figure 17:
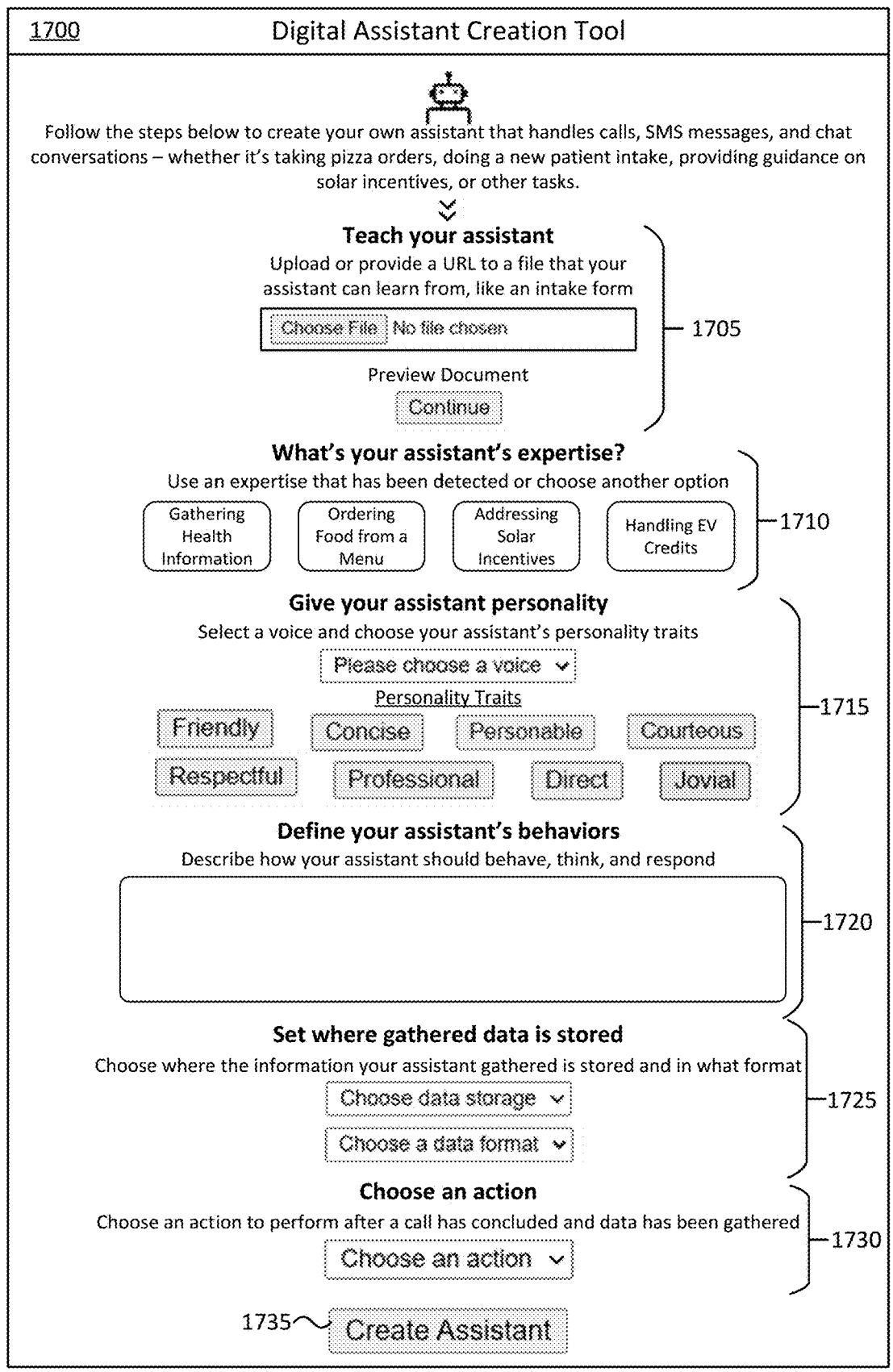
FIG. 17 illustrates an example user interface of a digital assistant creation tool for a digital assistant providing unified multichannel communication.

FIG. 17 illustrates an example user interface of a digital assistant creation tool for a digital assistant providing unified multichannel communication. Referring to FIG. 17, the digital assistant creation tool can be used to create a digital assistant for a variety of scenarios and roles, such as a receptionist at a medical clinic, a waiter at a restaurant, or a technician at a company.

Through the user interface of the digital assistant creation tool 1700, a number of sections (e.g., a document section 1705, an expertise section 1710, a personality section 1715, a behaviors section 1720, a data storage section 1725, and an action section 1730) can be displayed to allow for a variety of parameters to be selected for the digital assistant. The parameters can include, but are not limited to, parameters for personality (e.g., polite, concise and/or friendly), expertise, role, and behaviors for the digital assistant. The parameters can also include parameters for where any gathered data is stored and the type of action to perform after the data is gathered.

The digital assistant can be managed by the UMC platform and tied to a large language model, allowing for a multichannel experience with the digital assistant. For example, a user can interact with the digital assistant over any suitable communication channel, such as, a voice calling communication channel, a video calling communication channel, an SMS communication, a chat communication, or a social media communication channel.

Advantageously, through the digital assistant, a user can have a conversation with a physical document that the user would typically read/or and write on. For example, a user can have a conversation with a form (e.g., a patient intake form for a doctor or an insurance claim form) or a menu. Filling out forms can often be difficult and error prone. When the user is having a conversation with the document (e.g., the form), the digital assistant can help fill in any gaps and deal with the more natural nuances of a real human conversation. The digital assistant can also fill out the form for the user.

The document and selected parameters can be analyzed with generative AI with large language models (e.g., Generative Pre-trained Transformers ("GPT")). Adding the document and selected parameters to a customized, tailored prompt can help provide context for the large language models. The digital assistant can then, through the AI, have a conversation about that document.

In the document section 1705, the user can provide a document to help teach the digital assistant. The document can be any suitable document, such as, but not limited to, a patient intake form for a doctor, a menu at a restaurant, an insurance claim form, or a school field trip form. In some cases, the document may be an image or a video instead.

To select the document, the user can choose a document to upload or provide a uniform resource locator (URL) to the document. In some cases, the document can be previewed before continuing.

In the expertise section 1710, the user can select an expertise for the digital assistant. The expertise can be automatically detected based on the selected document or the user can choose another option. Examples of expertise include, but are not limited to, "Gathering Health Information," "Ordering Food from a Menu," "Addressing Solar Incentives," or "Handling EV Credits."

In the personality section 1715, the user can select parameters for the personality of the digital assistant. The user can select a voice for the digital assistant and choose personality traits for the digital assistant. Examples of the personality traits include, but are not limited to, "Friendly," "Concise," "Personable," "Courteous," "Respectful," "Professional," "Direct," and "Jovial."

In the behaviors section 1720, the user can define the behaviors of the digital assistant. Here, the user can input natural language text describing how the digital assistant should behave, think, and respond.

In the data storage section 1725, the user can set where gathered data is stored. The user may be provided drop-down menus to choose where the information the digital assistant gathered is stored and in what format. For example, the user can select to have the gathered data stored in an existing 'system of record' such as a SQL data or customer data store.

In the action section 1730, the user can choose an action to perform after an interaction has concluded and data has been gathered. The user may be provided a drop-down menu to choose the action. For example, the user can choose to have an email or SMS summary be sent. The information provided with the action performed can be obtained from an AI service as AI enrichments.

Once the user provided the document and selected all of the parameters, the user can create the digital assistant by clicking on a "Create Assistant" command 1735.

Figure 18A:
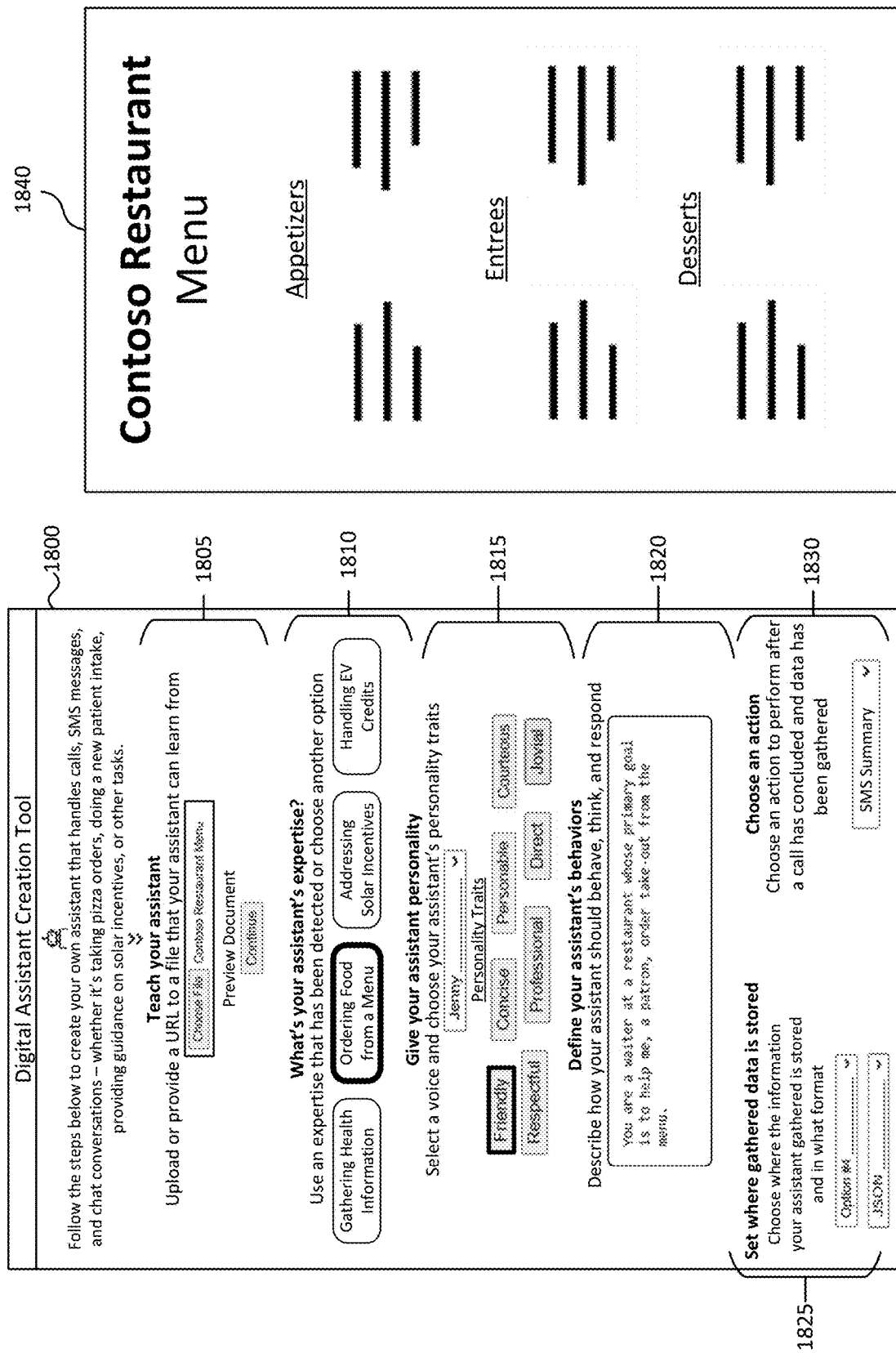
FIGS. 18A and 18B illustrate example scenarios for creating and interacting with a digital assistant providing unified multichannel communication.
Figure 18B:
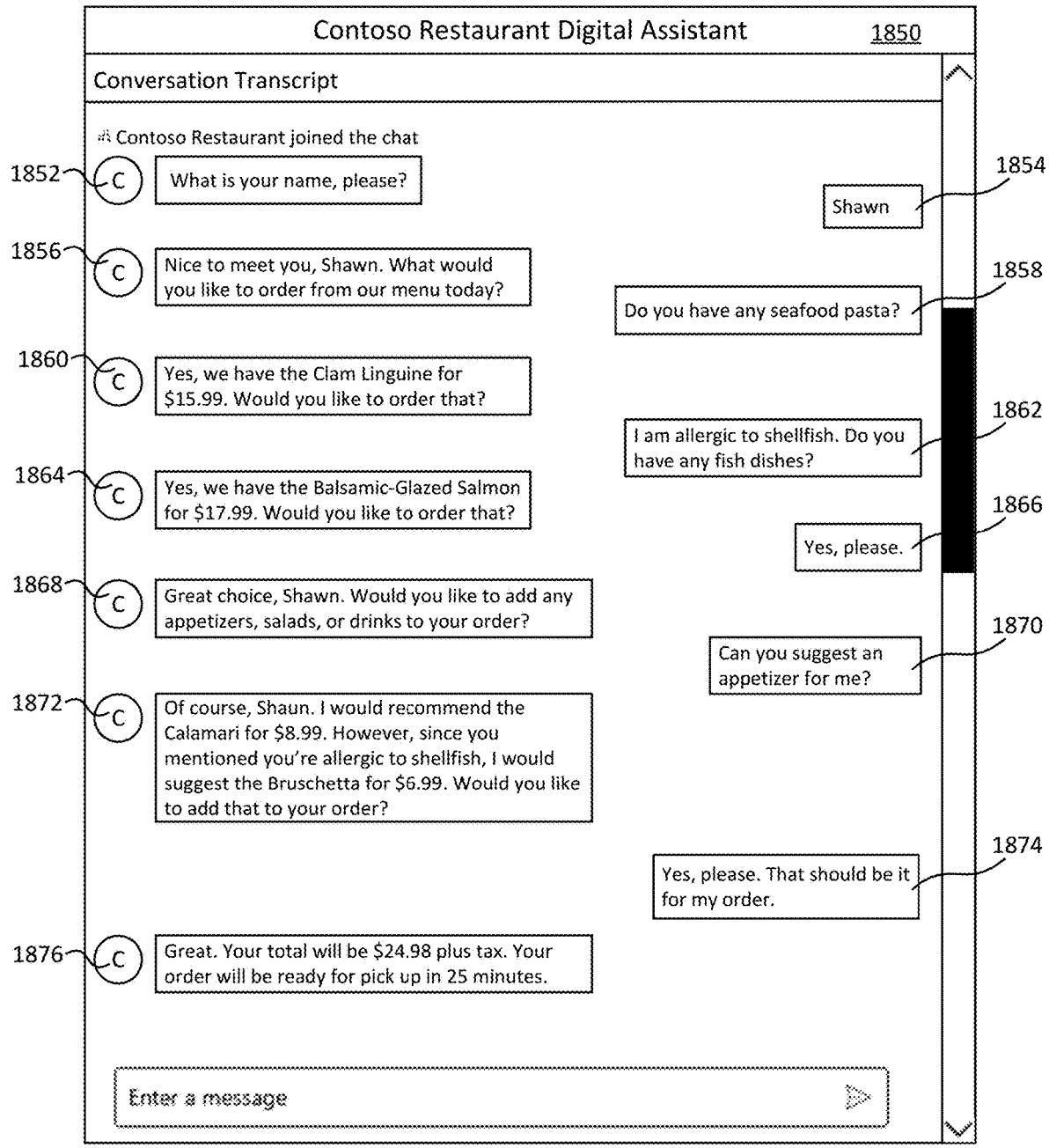

FIGS. 18A and 18B illustrate example scenarios for creating and interacting with a digital assistant providing unified multichannel communication. Referring to FIGS. 18A and 18B, a digital assistant can be created for an order handling system of a restaurant. The restaurant can input information regarding the business process for ordering at the restaurant, the menu of the restaurant, and contact information for the restaurant (e.g., a phone number or social media username). The contact information can be for any number of communication channels.

The digital assistant can be managed by a UMC platform and tied to a large language model, allowing for a multi-channel experience with the digital assistant. Once the digital assistant is created, the digital assistant can perform the interactions with a customer ordering from the restaurant through one of the communication channels. The digital assistant can then provide the order to the restaurant for the restaurant to prepare.

Referring to FIG. 18A, the digital assistant can be created using a digital assistant creation tool 1800. Similar to the digital assistant creation tool 1700 as described with respect to FIG. 17, the digital assistant creation tool 1800 can include a number of sections (e.g., a document section 1805, an expertise section 1810, a personality section 1815, a behaviors section 1820, a data storage section 1825, and an action section 1830) to allow for a variety of parameters to be selected for the digital assistant.

In the document section 1805, a document can be provided to help teach the digital assistant. In the illustrative example of FIG. 18A, the restaurant chooses a menu (e.g., Contoso Restaurant Menu 1840) to upload to be used to teach the digital assistant.

In the expertise section 1810, the restaurant can select an expertise for the digital assistant. The expertise can be automatically detected based on an analysis of the menu or the restaurant can choose another option. In the illustrative example of FIG. 18A, "Ordering Food from a Menu," is selected as the expertise of the digital assistant.

In the personality section 1815, the restaurant can select parameters for the personality of the digital assistant. The restaurant can select a voice for the digital assistant and choose personality traits for the digital assistant. In the illustrative example of FIG. 18A, "Jenny" is selected as the voice of the digital assistant and "Friendly" is selected as the personality trait for the digital assistant.

In the behaviors section 1820, the restaurant can define the behaviors of the digital assistant. Here, the restaurant can input natural language text describing how the digital assistant should behave, think, and respond. In the illustrative example of FIG. 18A, the restaurant inputs "You are a waiter at a restaurant whose primary goal is to help me, a patron, order take-out from the menu" to define the behaviors of the digital assistant.

In the data storage section 1825, the restaurant can set where gathered data is stored. The restaurant may be provided drop-down menus to choose where the information the digital assistant gathered is stored and in what format. In the illustrative example of FIG. 18A, the restaurant selects "Option #4" for where the gathered data is stored and "JSON" for the format of the stored data.

In the action section 1830, the restaurant can choose an action to perform after an interaction has concluded and data has been gathered. The restaurant may be provided a drop-down menu to choose the action. In the illustrative example of FIG. 18A, "SMS Summary" is selected as the action to perform. Here, the restaurant can receive the necessary information for an order from a customer via an SMS message.

Once the restaurant has provided the menu and selected all the parameters, the restaurant can create the digital assistant by clicking on a "Create Assistant" command 1835. The menu and selected parameters can be analyzed with generative AI with large language models (e.g., Generative Pre-trained Transformers ("GPT")) and the digital assistant created.

Referring to FIG. 18B, a customer can contact the restaurant to place an order for take-out. The customer can contact the restaurant through any of the communication channels (e.g., a voice calling communication channel or a chat communication channel). Advantageously, the conversation between the customer and the restaurant is written to a UMC thread. Therefore, the conversation can transition between communication channels seamlessly.

In the illustrative example of FIG. 18B, the customer calls the restaurant to place the order. While the customer and the digital assistant are interacting over a voice call, the audio data can be converted to text data and added to the UMC thread as messages, using for example, process 500 as described with respect to FIG. 5A. Advantageously, through a Contoso Restaurant digital assistant UI 1850, the customer can see a transcript of the phone call as messages (e.g., messages 1852-1876) in the UMC thread. Not only can the customer see the transcript of the phone call as messages in the UMC thread, but the customer can interact with the UMC thread while on the phone call (e.g., by also having their browser window open with the Contoso Restaurant digital assistant UI 1850 displayed).

The conversation between the customer and the digital assistant begins when the digital assistant asks, "What is your name, please?" as shown in message 1852. The customer responds with "Shawn" as shown in message 1854.

The digital assistant then states "Nice to meet you, Shawn. What would you like to order from our menu today?" as shown in message 1856. The customer asks, "Do you have any seafood pasta?" as shown in message 1858.

Since the digital assistant was trained on the menu for the restaurant (e.g., Contoso Restaurant Menu 1840 described with respect to FIG. 18A), the digital assistant knows what is on the menu and can answer with "Yes, we have the Clam Linguine for $15.99. Would you like to order that?" as shown in message 1860.

The customer states, "I am allergic to shellfish. Do you have any fish dishes?" as shown in message 1862; and the digital assistant responds with "Yes, we have the Balsamic-Glazed Salmon for $17.99. Would you like to order that?" as shown in message 1864.

As shown in message 1866, the customer says "Yes, please."; and the digital assistant then states, "Great choice, Shawn. Would you like to add any appetizers, salads, or drinks to your order?" as shown in message 1868.

When the customer next asks, "Can you suggest an appetizer for me?" as shown in message 1870, the digital assistant (through, for example, the large language model) remembers things the customer previously said and can use that context later. Here, the digital assistant remembers that the customer previously stated they were allergic to shellfish (e.g., in message 1862). Thus, the digital assistant can answer the customer with "Of course, Shaun. I would recommend the Calamari for $8.99. However, since you mentioned you're allergic to shellfish, I would suggest the Bruschetta for $6.99. Would you like to add that to your order?" as shown in message 1872.

The customer wraps up the order by stating "Yes, please. That should be it for my order." as shown in message 1874 The digital assistant then responds with "Great. Your total will be $24.98 plus tax. Your order will be ready for pick up in 25 minutes." as shown in message 1876.

Based on the parameters selected during the creation of the digital assistant, the digital assistant can store the data from the conversation in the JSON format and send the necessary information for the order to the restaurant in an SMS summary sent through the SMS communication channel.

Figure 19A:
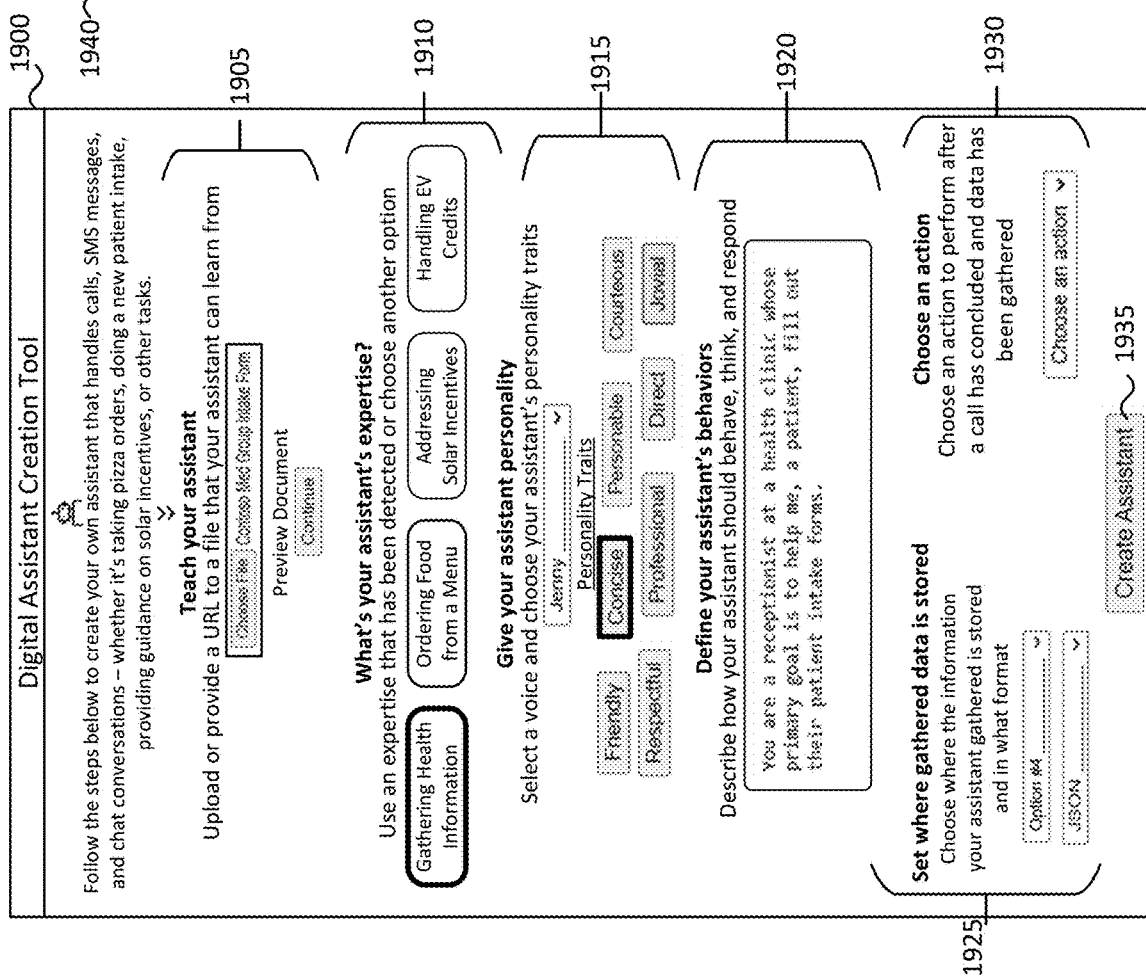
FIGS. 19A-19C illustrate example scenarios for creating and interacting with a digital assistant providing unified multichannel communication.
Figure 19B:
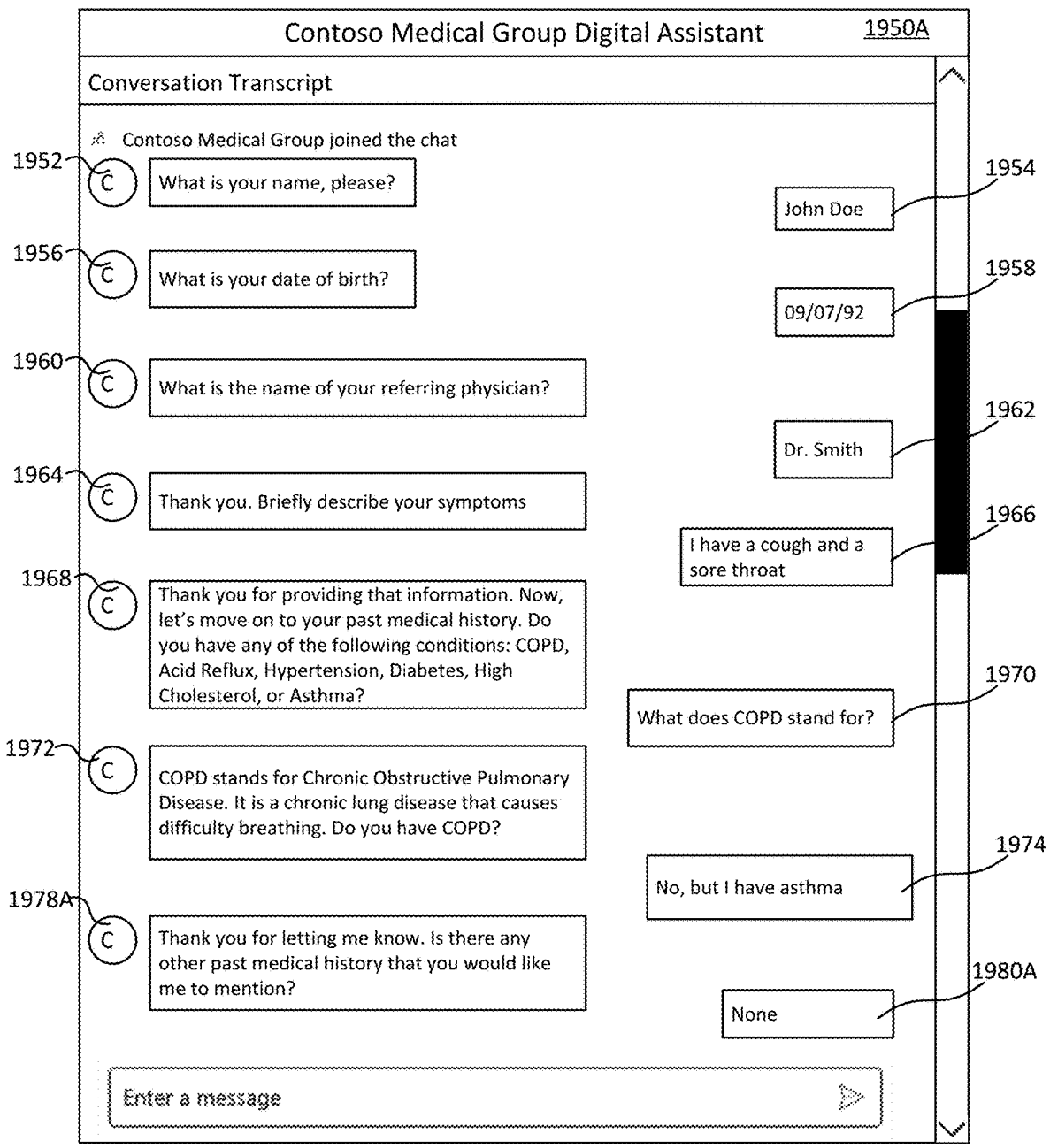
Figure 19C:
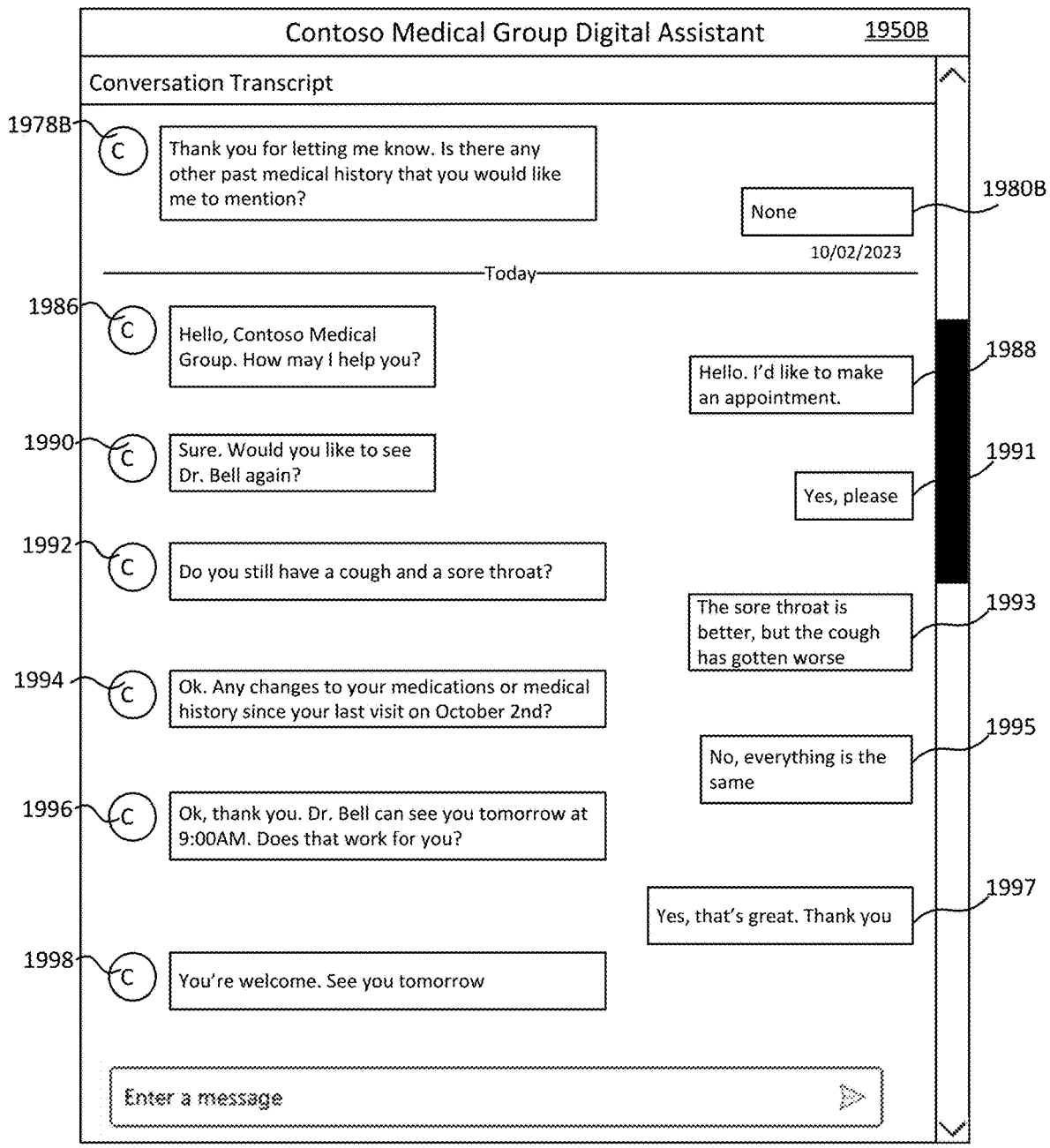

FIGS. 19A-19C illustrate example scenarios for creating and interacting with a digital assistant providing unified multichannel communication. Referring to FIGS. 19A and 19B, a digital assistant can be created to act as a medical receptionist for a medical group. The medical group can input information regarding the business process for interacting with patients (e.g., filling out patient intake forms), the patient intake form for the medical group, and contact information for the medical group (e.g., a phone number or social media username). The contact information can be for any number of communication channels.

The digital assistant can be managed by a UMC platform and tied to a large language model, allowing for a multichannel experience with the digital assistant. Once the digital assistant is created, the digital assistant can interact with a patient through any of the communication channels.

Referring to FIG. 19A, the digital assistant can be created using a digital assistant creation tool 1900. Similar to the digital assistant creation tool 1700 as described with respect to FIG. 17, the digital assistant creation tool 1900 can include a number of sections (e.g., a document section 1905, an expertise section 1910, a personality section 1915, a behaviors section 1920, a data storage section 1925, and an action section 1930) to allow for a variety of parameters to be selected for the digital assistant.

In the document section 1905, a document can be provided to help teach the digital assistant. In the illustrative example of FIG. 19A, the medical group chooses a patient intake form (e.g., Contoso Medical Group Patient Intake Form 1940) to upload to be used to teach the digital assistant.

In the expertise section 1910, the medical group can select an expertise for the digital assistant. The expertise can be automatically detected based on an analysis of the patient intake form or the medical group can choose another option. In the illustrative example of FIG. 19A, "Gathering Health Information" is selected as the expertise of the digital assistant.

In the personality section 1915, the medical group can select parameters for the personality of the digital assistant.

The medical group can select a voice for the digital assistant and choose personality traits for the digital assistant. In the illustrative example of FIG. 19A, "Jenny" is selected as the voice of the digital assistant and "Concise" is selected as the personality trait for the digital assistant.

In the behaviors section 1920, the medical group can define the behaviors of the digital assistant. Here, the medical group can input natural language text describing how the digital assistant should behave, think, and respond. In the illustrative example of FIG. 19A, the medical group inputs "You are a receptionist at a health clinic whose primary goal is to help me, a patient, fill out their intake forms" to define the behaviors of the digital assistant.

In the data storage section 1925, the medical group can set where gathered data is stored. The medical group may be provided drop-down menus to choose where the information the digital assistant gathered is stored and in what format. In the illustrative example of FIG. 19A, the medical group selects "Option #4" for where the gathered data is stored and "JSON" for the format of the stored data.

In the action section 1930, the medical group can choose an action to perform after an interaction has concluded and data has been gathered. The medical group may be provided a drop-down menu to choose the action. In the illustrative example of FIG. 19A, "SMS Summary" is selected as the action to perform. Here, the medical group can receive an SMS message notifying the nurses at the medical group that new information for a patient has been received by the digital assistant.

Once the medical group has provided the patient intake form and selected all the parameters, the medical group can create the digital assistant by clicking on a "Create Assistant" command 1935.

The patient intake form and selected parameters can be analyzed with generative AI with large language models (e.g., Generative Pre-trained Transformers ("GPT")) and the digital assistant created.

Referring to FIG. 19B, a patient can contact the medical group to fill out a patient intake form. The patient can contact the medical group through any of the communication channels (e.g., a voice calling communication channel or a chat communication channel). Advantageously, the conversation between the patient and the medical group is written to a UMC thread. Therefore, the conversation can transition between communication channels seamlessly.

In the illustrative example of FIG. 19B, the patient calls the medical group to fill out the intake form. While the patient and the digital assistant are interacting over a voice call, the audio data can be converted to text data and added to the UMC thread as messages, using for example, process 500 as described with respect to FIG. 5A. Advantageously, through a Contoso Medical Group digital assistant UI 1950A, the patient can see a transcript of the phone call as messages (e.g., messages 1952-1980) in the UMC thread. Not only can the patient see the transcript of the phone call as messages in the UMC thread, but the patient can interact with the UMC thread while on the phone call (e.g., by also having their browser window open with the Contoso Medical Group digital assistant UI 1950A displayed).

The conversation between the patient and the digital assistant begins when the digital assistant asks, "What is your name, please?" as shown message 1952 and the patient responds with "Shawn" as shown in message 1954.

The digital assistant then asks, "What is your date of birth?" as shown in message 1956, to which the patient replies, "Sep. 7, 1992" as shown in message 1958.

Next, the digital assistant asks, "What is the name of your referring physician?" as shown in message 1960, to which the patient responds, "Dr. Smith" as shown in message 1962.

The digital assistant states, "Thank you. Briefly describe your symptoms" as shown in message 1964. The patient responds with "I have a cough and a sore throat" as shown in message 1966.

Next, the digital assistant states, "Thank you for providing that information. Now, let's move on to your past medical history. Do you have any of the following conditions: COPD, Acid Reflux, Hypertension, Diabetes, High Cholesterol, or Asthma?" as shown in message 1968.

In the illustrative example, the patient does not understand one of the conditions and asks, "What does COPD stand for?" as shown in message 1970. Here, the digital assistant, using the large language models in the background, knows what COPD stands for and can provide context to the patient. The digital assistant responds with "COPD stands for Chronic Obstructive Pulmonary Disease. It is a chronic lung disease that causes difficulty breathing. Do you have COPD?" as shown in message 1972.

Having been provided context on what COPD stand for, the patient can now accurately answer the digital assistant's question. The patient response with "No, but I have asthma" as shown in message 1974.

The patient and the digital assistant can end the conversation with the digital assistant stating, "Thank you for letting me know. Is there any other past medical history that you would like me to mention?" as shown in message 1978A and the patient responding with "None" as shown in message 1980A.

Referring to FIG. 19C, after a period of time has passed since the patient and the digital assistant interacted to fill out the patient intake fore, the patient can contact the medical group to schedule an appointment. The patient can contact the medical group through any of the communication channels (e.g., a voice calling communication channel or a chat communication channel). Advantageously, the conversation between the patient and the medical group is written to a UMC thread. Therefore, the conversation can transition between communication channels seamlessly.

Since the UMC thread is persisted long-term in a compliant data store, the conversation can be resumed at any period of time later (e.g., many days, months, or even years later). When the patient continues a conversation at a later date, the conversation is not a cold start conversation. Advantageously, the UMC thread can include historical information from past conversations (e.g., the chat conversation between the patient and the digital assistant shown in FIG. 19B). The historical information can be brought in to have a more valuable, more insightful, and more meaningful conversation.

In the illustrative example of FIG. 19C, the patient calls the medical group to schedule an appointment and speaks to a human receptionist. While the patient and the human receptionist are interacting over a voice call, the audio data can be converted to text data and added to the UMC thread as messages, using for example, process 500 as described with respect to FIG. 5. Advantageously, through a Contoso Medical Group digital assistant UI 1950B, the patient can see a transcript of the phone call as messages (e.g., messages 1982-1998) in the UMC thread. The patient can interact with the UMC thread while on the phone call (e.g., by also having their browser window open with the Contoso Medical Group digital assistant UI 1950B displayed).

Not only can the patient see the transcript of the current phone call with the human receptionist, but the patient can see a transcript of previous interactions with the medical group (e.g., the patient and the digital assistant). In the Contoso Medical Group digital assistant UI 1950B, the patient can view the last two messages of the previous conversation the patient had with the digital assistant while filling out the patient intake form, which includes "Thank you for letting me know. Is there any other past medical history that you would like me to mention?" as shown in message 1978A and the patient responding with "None" as shown in message 1980A.

The conversation between the patient and the human receptionist in FIG. 19C, begins when the human receptionist states, "Hello, Contoso Medical Group. How may I help you?" as shown message 1986 and the patient responds with "Hello. I'd like to make an appointment." as shown in message 1988.

Advantageously, context persists naturally between the digital assistant and the human receptionist. That is, when the patient calls into the medical group and speaks to the human receptionist, the human receptionist is added to the UMC thread and can now have access to the context of the conversation the patient had with the digital assistant. Therefore, the human receptionist does not have to ask for the same information from the patient over again.

The human receptionist asks, "Sure. Would you like to see Dr. Bell again?" as shown in message 1990, and the patient responds with "Yes, please" as shown in message 1991.

The human receptionist asks, "Do you still have a cough and a sore throat?" as shown in message 1992 and the patient responds with "The sore throat is better, but the cough has gotten worse." as shown in message 1993.

When the human agent asks, "Ok. Any changes to your medications or medical history since your last visit on October 2nd?" as shown in message 1994, the patient responds with "No, everything is the same" as shown in message 1995. The human receptionist then says, "Ok, thank you. Dr. Bell can see you tomorrow at 9:00 AM. Does that work for you?" as shown in message 1996.

The patient and the human receptionist can end the conversation with the patient saying, "Yes, that's great. Thank you" as shown in message 1997 and the human receptionist responding with "You're welcome. See you tomorrow" as shown in message 1998.

FIG. 20 illustrates a generalized example of a suitable computing system 2000 in which the described innovations may be implemented. The computing system 2000 is not intended to suggest any limitation as to scope of use or functionality, as the innovations may be implemented in diverse general-purpose or special-purpose computing systems.

Referring to FIG. 20, the computing system 2000 includes one or more processing units 2010, 2015 and memory 2020, 2025. In FIG. 20, this basic configuration 2030 is included within a dashed line. The processing units 2010, 2015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s). The memory 2020, 2025 stores software 2080 implementing one or more innovations described herein, in the form of computer-executable instructions suitable for execution by the processing unit(s).

A computing system may have additional features. For example, the computing system 2000 includes storage 2040, one or more input devices 2050, one or more output devices 2060, and one or more communication connections 2070. An interconnection mechanism (not shown) such as a bus, controller, or network interconnects the components of the computing system 2000. Typically, operating system software (not shown) provides an operating environment for other software executing in the computing system 2000, and coordinates activities of the components of the computing system 2000.

The tangible storage 2040 may be removable or non-removable, and includes magnetic disks, magnetic tapes or cassettes, CD-ROMs, DVDs, or any other medium which can be used to store information and which can be accessed within the computing system 2000. The storage 2040 stores instructions for the software 2080 implementing one or more innovations described herein.

The input device(s) 2050 may be a touch input device such as a keyboard, mouse, pen, or trackball, a voice input device, a scanning device, or another device that provides input to the computing system 2000. For video encoding, the input device(s) 2050 may be a camera, video card, TV tuner card, or similar device that accepts video input in analog or digital form, or a CD-ROM or CD-RW that reads video samples into the computing system 2000. The output device(s) 2060 may be a display, printer, speaker, CD-writer, or another device that provides output from the computing system 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 21:
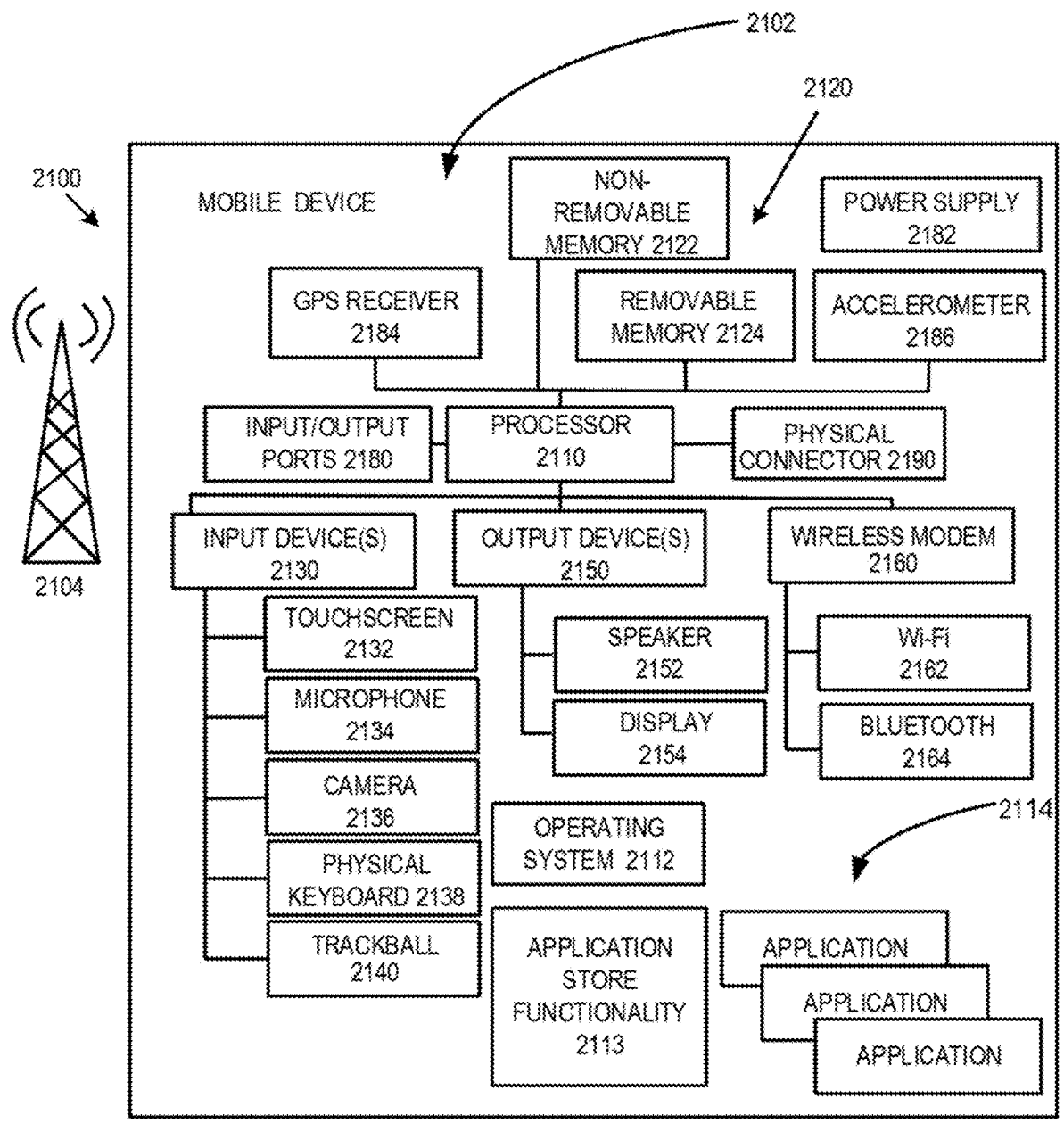
FIG. 21 illustrates an example mobile device that can be used in conjunction with the technologies described herein.

FIG. 21 illustrates a system diagram depicting an example mobile device 2100 including a variety of optional hardware and software components, shown generally at 2102. Any components 2102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 2104, such as a cellular, satellite, or other network.

The illustrated mobile device 2100 can include a controller or processor 2110 (e.g., signal processor, microprocessor, ASIC, or other control and processing logic circuitry) for performing such tasks as signal coding, data processing, input/output processing, power control, and/or other functions. An operating system 2112 can control the allocation and usage of the components 2102 and support for one or more application programs 2114. The application programs can include common mobile computing applications (e.g., email applications, calendars, contact managers, web browsers, messaging applications), or any other computing application. Functionality 2113 for accessing an application store can also be used for acquiring and updating application programs 2114.

The illustrated mobile device 2100 can include memory 2120. Memory 2120 can include non-removable memory 2122 and/or removable memory 2124. The non-removable memory 2122 can include RAM, ROM, flash memory, a hard disk, or other well-known memory storage technologies. The removable memory 2124 can include flash memory or a Subscriber Identity Module (SIM) card, which is well known in GSM communication systems, or other well-known memory storage technologies, such as "smart cards." The memory 2120 can be used for storing data and/or code for running the operating system 2112 and the applications 2114. Example data can include web pages, text, images, sound files, video data, or other data sets to be sent to and/or received from one or more network servers or other devices via one or more wired or wireless networks. The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 2100 can support one or more input devices 2130, such as a touchscreen 2132, microphone 2134, camera 2136, physical keyboard 2138 and/or trackball 2140 and one or more output devices 2150, such as a speaker 2152 and a display 2154. Other possible output devices (not shown) can include piezoelectric or other haptic output devices. Some devices can serve more than one input/output function. For example, touchscreen 2132 and display 2154 can be combined in a single input/output device.

The input devices 2130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 2112 or applications 2114 can comprise speech-recognition software as part of a voice user interface that allows a user to operate the device 2100 via voice commands. Further, the device 2100 can comprise input devices and software that allows for user interaction via a user's spatial gestures, such as detecting and interpreting gestures to provide input to a gaming application.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM network for data and voice communications within a single cellular network, between cellular networks, or between the mobile device and a public switched telephone network (PSTN).

The mobile device can further include at least one input/output port 2180, a power supply 2182, a satellite navigation system receiver 2184, such as a Global Positioning System (GPS) receiver, an accelerometer 2186, and/or a physical connector 2190, which can be a USB port, IEEE 1394 (FireWire) port, and/or RS-232 port. The illustrated components 2102 are not required or all-inclusive, as any components can be deleted and other components can be added.

Figure 22:
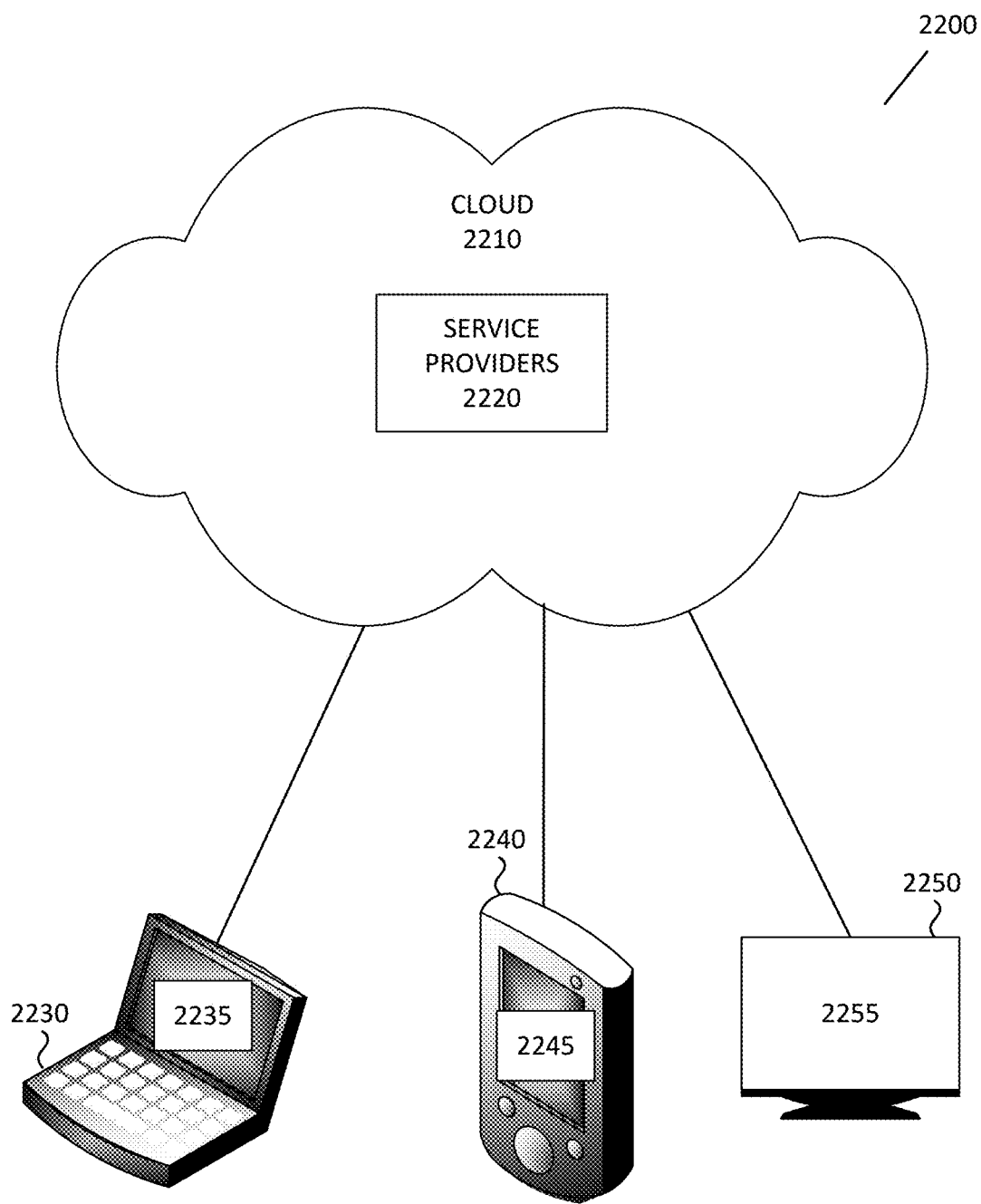
FIG. 22 illustrates an example cloud-support environment that can be used in conjunction with the technologies described herein.

FIG. 22 illustrates a generalized example of a suitable cloud-supported environment 2200 in which described embodiments, techniques, and technologies may be implemented. In the example environment 2200, various types of services (e.g., computing services) are provided by a cloud 2210. For example, the cloud 2210 can comprise a collection of computing devices, which may be located centrally or distributed, that provide cloud-based services to various types of users and devices connected via a network such as the Internet. The implementation environment 2200 can be used in different ways to accomplish computing tasks. For example, some tasks (e.g., processing user input and presenting a user interface) can be performed on local computing devices (e.g., connected devices 2230, 2240, 2250) while other tasks (e.g., storage of data to be used in subsequent processing) can be performed in the cloud 2210.

In example environment 2200, the cloud 2210 provides services for connected devices 2230, 2240, 2250 with a variety of screen capabilities. Connected device 2230 represents a device with a computer screen 2235 (e.g., a mid-size screen). For example, connected device 2230 could be a personal computer such as desktop computer, laptop, notebook, netbook, or the like. Connected device 2240 represents a device with a mobile device screen 2245 (e.g., a small size screen). For example, connected device 2240 could be a mobile phone, smart phone, personal digital assistant, tablet computer, and the like. Connected device 2250 represents a device with a large screen 2255. For example, connected device 2250 could be a television screen (e.g., a smart television) or another device connected to a television (e.g., a set-top box or gaming console) or the like. One or more of the connected devices 2230, 2240, 2250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2200. For example, the cloud 2210 can provide services for one or more computers (e.g., server computers) without displays.

Services can be provided by the cloud 2210 through service providers 2220, or through other providers of online services (not depicted). For example, cloud services can be customized to the screen size, display capability, and/or touchscreen capability of a particular connected device (e.g., connected devices 2230, 2240, 2250).

In example environment 2200, the cloud 2210 provides the technologies and solutions described herein to the various connected devices 2230, 2240, 2250 using, at least in part, the service providers 2220. For example, the service providers 2220 can provide a centralized solution for various cloud-based services. The service providers 2220 can manage service subscriptions for users and/or devices (e.g., for the connected devices 2230, 2240, 2250 and/or their respective users).

Certain aspects of the invention provide the following non-limiting embodiments:

Example 1. In a computer system that implements a unified multichannel communication (UMC) service, a method comprising: receiving, at the UMC service, a request for a UMC session; with the UMC service, initializing a UMC thread for the UMC session; with the UMC service, attaching, to the UMC thread, a first communication channel having a first data type and a second communication channel having a second data type different than the first data type, wherein the attaching includes: retrieving, based on a thread identifier of the UMC thread, a thread metadata record for the UMC thread; storing, in the thread metadata record for the UMC thread, a first communication channel identifier for the first communication channel; and storing, in the thread metadata record for the UMC thread, a second communication channel identifier for the second communication channel; receiving, at the UMC service, a first communication message communicated over the first communication channel; adding, to the UMC thread, event data for the first communication message; receiving, at the UMC service, a second communication message communicated over the second communication channel; converting event data for the second communication message from the second data type to the first data type; and adding, to the UMC thread, the converted event data for the second communication message.

Example 2. The method of example 1, further comprising: rendering event data for the first communication message to a window on a display device; and rendering the converted event data for the second communication message to the window on the display device.

Example 3. The method of example 1 or 2, wherein the initializing the UMC thread includes: creating the thread metadata record for the UMC thread, wherein the thread metadata record for the UMC thread is configured to store: information about any communication channels attached to the UMC thread; and information about users of the any communication channels attached to the UMC thread; adding the thread metadata record for the UMC thread to a database of thread metadata records for different UMC threads; creating a thread content record for the UMC thread, wherein the thread content record for the UMC thread is configured to store event data for messages on the any communication channels attached to the UMC thread; and adding the thread content record for the UMC thread to a database of thread content records for the different UMC threads.

Example 4. The method of any of examples 1-3, wherein the attaching the first communication channel and the second communication channel further includes: storing, in the thread metadata record for the UMC thread, a user identifier for each user communicating over the first communication channel; storing, in the thread metadata record for the UMC thread, a user identifier for each user communicating over the second communication channel; with the UMC service, subscribing to events on the first communication channel; and with the UMC service, subscribing to events on the second communication channel.

Example 5. The method of any of examples 1-4, wherein: the receiving, at the UMC service, the first communication message communicated over the first communication channel comprises receiving a first event representing the first communication message and retrieving the event data for the first event from a first communication service associated with the first communication channel; and the receiving, at the UMC service, the second communication message communicated over the second communication channel comprises receiving a second event representing the second communication message and retrieving the event data for the second event from a second communication service associated with the second communication channel.

Example 6. The method of any of examples 1-5, wherein the adding, to the UMC thread, the event data for the first communication channel comprises: based on the thread identifier of the UMC thread, retrieving, from a database of thread content records for different UMC threads, a thread content record for the UMC thread; and storing, in the thread content record for the UMC thread, the event data for the first communication message.

Example 7. The method of any of examples 1-6, wherein the converting includes: with the UMC service, sending the event data for the second communication message to a processing service; and receiving, at the UMC service, the converted event data for the second communication message from the processing service.

Example 8. The method of example 7, wherein the processing service is selected from the group consisting of a speech-to-text conversion service, an image-to-text conversion service, a video-to-text conversion service, and a translation service.

Example 9. The method of any of examples 1-8, further comprising: with the UMC service, attaching, to the UMC thread, a third communication channel having a third data type different than the first data type and the second data type.

Example 10. The method of any of examples 1-9, further comprising removing the first communication channel from the UMC thread, wherein the removing includes: based on the thread identifier of the UMC thread, retrieving, from a database of thread metadata records for different UMC threads, the thread metadata record for the UMC thread; and removing, from the thread metadata record for the UMC thread, the first communication channel identifier; and removing, from the thread metadata record for the UMC thread, a user identifier for each user communicating over the first communication channel.

Example 11. The method of any of examples 1-10, wherein the first communication message is from a first user to a second user over the first communication channel.

Example 12. The method of example 11, wherein the first user is a human user and the second user is a bot.

Example 13. The method of example 11 or 12, further comprising adding a third user to the first communication channel, wherein the adding the third user includes: based on the thread identifier of the UMC thread, retrieving, from a database of thread metadata records for different UMC threads, the thread metadata record for the UMC thread; and storing, in the thread metadata record for the UMC thread, a user identifier for the third user.

Example 14. The method of any of examples 11-13, further comprising removing the second user from the first communication channel, wherein the removing the second user includes: based on the thread identifier of the UMC thread, retrieving, from a database of thread metadata records for different UMC threads, the thread metadata record for the UMC thread; and removing, from the thread metadata record for the UMC thread, a user identifier for the second user.

Example 15. The method of any of examples 11-14, wherein the second user receives the first communication message over the first communication channel, the method further comprising: sending, to the second user over the first communication channel, the converted event data for the second communication message.

Example 16. The method of any of examples 11-15, further comprising: sending, to an artificial intelligence ("AI") enrichment service, the event data for the first communication message and the converted event data for the second communication message; and receiving, from the AI enrichment service, AI enrichments based on the event data for the first communication message and the converted event data for the second communication message.

Example 17. The method of any of examples 1-16, wherein the first data type is text, and wherein the second data type is selected from the group consisting of audio, video, and image, the method further comprising: determining that the second data type is not text, wherein the converting the event data for the second communication message from the second data type to the first data type is performed responsive to the determining that the second data type is not text.

Example 18. The method of any of examples 1-17, wherein: the first communication channel is a chat communication channel or a Short Message Service ("SMS") communication channel; and the second communication channel is a voice calling communication channel, a video calling communication channel, a social media communication channel, or an email communication channel.

Example 19. One or more computer readable storage media having instructions stored thereon that, when executed by one or more processors, direct the one or more processors to perform operations comprising: receiving, at the UMC service, a request for a UMC session; with the UMC service, initializing a UMC thread for the UMC session; with the UMC service, attaching, to the UMC thread, a first communication channel having a first data type and a second communication channel having a second data type different than the first data type, wherein the attaching includes: retrieving, based on a thread identifier of the UMC thread, a thread metadata record for the UMC thread; storing, in the thread metadata record for the UMC thread, a first communication channel identifier for the first communication channel; and storing, in the thread metadata record for the UMC thread, a second communication channel identifier for the second communication channel; receiving, at the UMC service, a first communication message communicated over the first communication channel; adding, to the UMC thread, event data for the first communication message; receiving, at the UMC service, a second communication message communicated over the second communication channel; converting event data for the second communication message from the second data type to the first data type; and adding, to the UMC thread, the converted event data for the second communication message.

Example 20. A computer system comprising a processing system and memory, wherein the computer system is configured to perform operations comprising: receiving, at the UMC service, a request for a UMC session; with the UMC service, initializing a UMC thread for the UMC session; with the UMC service, attaching, to the UMC thread, a first communication channel having a first data type and a second communication channel having a second data type different than the first data type, wherein the attaching includes: retrieving, based on a thread identifier of the UMC thread, a thread metadata record for the UMC thread; storing, in the thread metadata record for the UMC thread, a first communication channel identifier for the first communication channel; and storing, in the thread metadata record for the UMC thread, a second communication channel identifier for the second communication channel; receiving, at the UMC service, a first communication message communicated over the first communication channel; adding, to the UMC thread, event data for the first communication message; receiving, at the UMC service, a second communication message communicated over the second communication channel; converting event data for the second communication message from the second data type to the first data type; and adding, to the UMC thread, the converted event data for the second communication message.

Example 21. In a computer system that implements an agent service, a method comprising: receiving, at the agent service, a request to create a digital assistant for a user, the request comprising an artifact and further comprising information associated with a set of parameters for the digital assistant; generating, at the agent service, the digital assistant by processing the artifact and the information associated with the set of parameters, wherein the processing the artifact and the information associated with the set of parameters comprises: communicating with an artificial intelligence (AI) service to analyze the artifact and the information associated with the set of parameters; generating an AI prompt based on the analysis of the artifact and the information associated with the set of parameters; and training the digital assistant using the generated AI prompt; with a unified multichannel communication (UMC) service, initializing a UMC thread for a UMC session involving the digital assistant and a user; with the UMC service, attaching, to the UMC thread, a first communication channel having a first data type and a second communication channel having a second data type different than the first data type, wherein the attaching includes: retrieving, based on a thread identifier of the UMC thread, a thread metadata record for the UMC thread; storing, in the thread metadata record for the UMC thread, a first communication channel identifier for the first communication channel; storing, in the thread metadata record for the UMC thread, a second communication channel identifier for the second communication channel; and storing, in the thread metadata record for the UMC thread, at least one user identifier for the user and at least one user identifier for the digital assistant; and processing a first communication message, from the user to the digital assistant, communicated over the first communication channel and a second communication message, from the user to the digital assistant, communicated over the second communication channel, wherein the thread metadata record continues to associate the digital assistant with the UMC thread when the user switches between the first communication channel and the second communication channel.

Example 22. The method of example 21, wherein the agent service and the UMC service are implemented as a single service.

Example 23. The method of example 21 or 22, wherein the processing the first communication message and the second communication message includes: receiving, at the UMC service, the first communication message; adding, to the UMC thread, event data for the first communication message; receiving, at the UMC service, the second communication message; converting event data for the second communication message from the second data type to the first data type; and adding, to the UMC thread, the converted event data for the second communication message.

Example 24. The method of example 23, further comprising: rendering the event data for the first communication message to a window on a display device; and rendering the converted event data for the second communication message to the window on the display device.

Example 25. The method of example 23 or 24, wherein: the receiving, at the UMC service, the first communication message comprises receiving a first event representing the first communication message and retrieving the event data for the first event from a first communication service associated with the first communication channel; and the receiving, at the UMC service, the second communication message comprises receiving a second event representing the second communication message and retrieving the event data for the second event from a second communication service associated with the second communication channel.

Example 26. The method of any of examples 23-25, wherein the adding, to the UMC thread, the event data for the first communication channel comprises: based on the thread identifier of the UMC thread, retrieving, from a database of thread content records for different UMC threads, a thread content record for the UMC thread; and storing, in the thread content record for the UMC thread, the event data for the first communication message.

Example 27. The method of any of examples 23-26, wherein the converting includes: with the UMC service, sending the event data for the second communication message to a processing service; and receiving, at the UMC service, the converted event data for the second communication message from the processing service.

Example 28. The method of example 27, wherein the processing service is selected from the group consisting of a speech-to-text conversion service, an image-to-text conversion service, a video-to-text conversion service, and a translation service.

Example 29. The method of any of examples 23-28, wherein the digital assistant receives the first communication message over the first communication channel, the method further comprising: sending, to the digital assistant over the first communication channel, the converted event data for the second communication message.

Example 30. The method of any of examples 23-29, wherein the first data type is text, and wherein the second data type is selected from the group consisting of audio, video, and image, the method further comprising: determining that the second data type is not text, wherein the converting the event data for the second communication message from the second data type to the first data type is performed responsive to the determining that the second data type is not text.

Example 31. The method of any of examples 21-30, wherein the artifact is a fillable form document, and wherein the processing the first communication message includes: with the agent service, analyzing event data for the first communication message to determine an input for a field within the fillable form document; and completing part of the fillable form document by adding the input for the field to the fillable form document.

Example 32. The method of any of examples 21-31, wherein the initializing the UMC thread includes: creating the thread metadata record for the UMC thread, wherein the thread metadata record for the UMC thread is configured to store: information about any communication channels attached to the UMC thread; and information about users of the any communication channels attached to the UMC thread; adding the thread metadata record for the UMC thread to a database of thread metadata records for different UMC threads; creating a thread content record for the UMC thread, wherein the thread content record for the UMC thread is configured to store event data for messages on the any communication channels attached to the UMC thread; and adding the thread content record for the UMC thread to a database of thread content records for the different UMC threads.

Example 33. The method of any of examples 21-32, wherein the attaching the first communication channel and the second communication channel further includes: with the UMC service, subscribing to events on the first communication channel; and with the UMC service, subscribing to events on the second communication channel.

Example 34. The method of any of examples 21-33, wherein: the at least one user identifier for the user include a first channel-specific user identifier for the user on the first communication channel and a second channel-specific user identifier for the user on the second communication channel; and the at least one user identifier for the digital assistant include a first channel-specific user identifier for the digital assistant on the first communication channel and a second channel-specific user identifier for the digital assistant on the second communication channel.

Example 35. The method of any of examples 21-34, further comprising: with the UMC service, attaching, to the UMC thread, a third communication channel having a third data type different than the first data type and the second data type.

Example 36. The method of any of examples 21-35, wherein the first communication message is from the user to the digital assistant over the first communication channel, and wherein the second communication message is from the user to the digital assistant over the second communication channel.

Example 37. The method of example 36, further comprising adding another user to the first communication channel, wherein the adding the other user includes: based on the thread identifier of the UMC thread, retrieving, from a database of thread metadata records for different UMC threads, the thread metadata record for the UMC thread; and storing, in the thread metadata record for the UMC thread, a user identifier for the other user.

Example 38. The method of any of examples 21-37, wherein: the first communication channel is a chat communication channel or a Short Message Service ("SMS") communication channel; and the second communication channel is a voice calling communication channel, a video calling communication channel, a social media communication channel, or an email communication channel.

Example 39. One or more computer readable storage media having instructions stored thereon that, when executed by one or more processors, direct the one or more processors to perform operations comprising: receiving, at the agent service, a request to create a digital assistant for a user, the request comprising an artifact and further comprising information associated with a set of parameters for the digital assistant; generating, at the agent service, the digital assistant by processing the artifact and the information associated with the set of parameters, wherein the processing the artifact and the information associated with the set of parameters comprises: communicating with an artificial intelligence (AI) service to analyze the artifact and the information associated with the set of parameters; generating an AI prompt based on the analysis of the artifact and the information associated with the set of parameters; and training the digital assistant using the generated AI prompt; with a unified multichannel communication (UMC) service, initializing a UMC thread for a UMC session involving the digital assistant and a user; with the UMC service, attaching, to the UMC thread, a first communication channel having a first data type and a second communication channel having a second data type different than the first data type, wherein the attaching includes: retrieving, based on a thread identifier of the UMC thread, a thread metadata record for the UMC thread; storing, in the thread metadata record for the UMC thread, a first communication channel identifier for the first communication channel; storing, in the thread metadata record for the UMC thread, a second communication channel identifier for the second communication channel; and storing, in the thread metadata record for the UMC thread, at least one user identifier for the user and at least one user identifier for the digital assistant; and processing a first communication message, from the user to the digital assistant, communicated over the first communication channel and a second communication message, from the user to the digital assistant, communicated over the second communication channel, wherein the thread metadata record continues to associate the digital assistant with the UMC thread when the user switches between the first communication channel and the second communication channel.

Example 40. A computer system comprising a processing system and memory, wherein the computer system is configured to perform operations comprising: receiving, at the agent service, a request to create a digital assistant for a user, the request comprising an artifact and further comprising information associated with a set of parameters for the digital assistant; generating, at the agent service, the digital assistant by processing the artifact and the information associated with the set of parameters, wherein the processing the artifact and the information associated with the set of parameters comprises: communicating with an artificial intelligence (AI) service to analyze the artifact and the information associated with the set of parameters; generating an AI prompt based on the analysis of the artifact and the information associated with the set of parameters; and training the digital assistant using the generated AI prompt; with a unified multichannel communication (UMC) service, initializing a UMC thread for a UMC session involving the digital assistant and a user; with the UMC service, attaching, to the UMC thread, a first communication channel having a first data type and a second communication channel having a second data type different than the first data type, wherein the attaching includes: retrieving, based on a thread identifier of the UMC thread, a thread metadata record for the UMC thread; storing, in the thread metadata record for the UMC thread, a first communication channel identifier for the first communication channel; storing, in the thread metadata record for the UMC thread, a second communication channel identifier for the second communication channel; and storing, in the thread metadata record for the UMC thread, at least one user identifier for the user and at least one user identifier for the digital assistant; and processing a first communication message, from the user to the digital assistant, communicated over the first communication channel and a second communication message, from the user to the digital assistant, communicated over the second communication channel, wherein the thread metadata record continues to associate the digital assistant with the UMC thread when the user switches between the first communication channel and the second communication channel.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that implements an agent service, a method comprising:
   receiving, at the agent service, a request to create a digital assistant for a user, the request comprising an artifact and further comprising information associated with a set of parameters for the digital assistant;
   generating, at the agent service, the digital assistant by processing the artifact and the information associated with the set of parameters, wherein the processing the artifact and the information associated with the set of parameters comprises:
      communicating with an artificial intelligence (AI) service to analyze the artifact and the information associated with the set of parameters;
      generating an AI prompt based on the analysis of the artifact and the information associated with the set of parameters; and
      training the digital assistant using the generated AI prompt;
   with a unified multichannel communication (UMC) service, initializing a UMC thread for a UMC session involving the digital assistant and a user;
   with the UMC service, attaching, to the UMC thread, a first communication channel having a first data type and a second communication channel having a second data type different than the first data type, wherein the attaching includes:
      retrieving, based on a thread identifier of the UMC thread, a thread metadata record for the UMC thread;
      storing, in the thread metadata record for the UMC thread, a first communication channel identifier for the first communication channel;
      storing, in the thread metadata record for the UMC thread, a second communication channel identifier for the second communication channel; and
      storing, in the thread metadata record for the UMC thread, at least one user identifier for the user and at least one user identifier for the digital assistant; and
   processing a first communication message, from the user to the digital assistant, communicated over the first communication channel and a second communication message, from the user to the digital assistant, communicated over the second communication channel, wherein the thread metadata record continues to associate the digital assistant with the UMC thread when the user switches between the first communication channel and the second communication channel, wherein the first communication message is from the user to the digital assistant over the first communication channel, and wherein the second communication message is from the user to the digital assistant over the second communication channel.

2. The method of claim 1, wherein the agent service and the UMC service are implemented as a single service.

3. The method of claim 1, wherein the processing the first communication message and the second communication message includes:
   receiving, at the UMC service, the first communication message;
   adding, to the UMC thread, event data for the first communication message;
   receiving, at the UMC service, the second communication message;
   converting event data for the second communication message from the second data type to the first data type; and
   adding, to the UMC thread, the converted event data for the second communication message.

4. The method of claim 3, further comprising:
   rendering the event data for the first communication message to a window on a display device; and
   rendering the converted event data for the second communication message to the window on the display device.

5. The method of claim 3, wherein:
   the receiving, at the UMC service, the first communication message comprises receiving a first event representing the first communication message and retrieving the event data for the first event from a first communication service associated with the first communication channel; and
   the receiving, at the UMC service, the second communication message comprises receiving a second event representing the second communication message and retrieving the event data for the second event from a second communication service associated with the second communication channel.

6. The method of claim 3, wherein the adding, to the UMC thread, the event data for the first communication channel comprises:
   based on the thread identifier of the UMC thread, retrieving, from a database of thread content records for different UMC threads, a thread content record for the UMC thread; and
   storing, in the thread content record for the UMC thread, the event data for the first communication message.

7. The method of claim 3, wherein the converting includes:
   with the UMC service, sending the event data for the second communication message to a processing service; and
   receiving, at the UMC service, the converted event data for the second communication message from the processing service.

8. The method of claim 7, wherein the processing service is selected from the group consisting of a speech-to-text conversion service, an image-to-text conversion service, a video-to-text conversion service, and a translation service.

9. The method of claim 3, wherein the digital assistant receives the first communication message over the first communication channel, the method further comprising:
sending, to the digital assistant over the first communication channel, the converted event data for the second communication message.

10. The method of claim 3, wherein the first data type is text, and wherein the second data type is selected from the group consisting of audio, video, and image, the method further comprising:
determining that the second data type is not text, wherein the converting the event data for the second communication message from the second data type to the first data type is performed responsive to the determining that the second data type is not text.

11. The method of claim 1, wherein the artifact is a fillable form document, and wherein the processing the first communication message includes:
with the agent service, analyzing event data for the first communication message to determine an input for a field within the fillable form document; and
completing part of the fillable form document by adding the input for the field to the fillable form document.

12. The method of claim 1, wherein the initializing the UMC thread includes:
creating the thread metadata record for the UMC thread, wherein the thread metadata record for the UMC thread is configured to store:
information about any communication channels attached to the UMC thread; and
information about users of the any communication channels attached to the UMC thread;
adding the thread metadata record for the UMC thread to a database of thread metadata records for different UMC threads;
creating a thread content record for the UMC thread, wherein the thread content record for the UMC thread is configured to store event data for messages on the any communication channels attached to the UMC thread; and
adding the thread content record for the UMC thread to a database of thread content records for the different UMC threads.

13. The method of claim 1, wherein the attaching the first communication channel and the second communication channel further includes:
with the UMC service, subscribing to events on the first communication channel; and
with the UMC service, subscribing to events on the second communication channel.

14. The method of claim 1, wherein:
the at least one user identifier for the user include a first channel-specific user identifier for the user on the first communication channel and a second channel-specific user identifier for the user on the second communication channel; and
the at least one user identifier for the digital assistant include a first channel-specific user identifier for the digital assistant on the first communication channel and a second channel-specific user identifier for the digital assistant on the second communication channel.

15. The method of claim 1, further comprising:
with the UMC service, attaching, to the UMC thread, a third communication channel having a third data type different than the first data type and the second data type.

16. The method of claim 1, further comprising adding another user to the first communication channel, wherein the adding the other user includes:
based on the thread identifier of the UMC thread, retrieving, from a database of thread metadata records for different UMC threads, the thread metadata record for the UMC thread; and
storing, in the thread metadata record for the UMC thread, a user identifier for the other user.

17. The method of claim 1, wherein:
the first communication channel is a chat communication channel or a Short Message Service ("SMS") communication channel; and
the second communication channel is a voice calling communication channel, a video calling communication channel, a social media communication channel, or an email communication channel.

18. One or more non-transitory computer readable media having instructions stored thereon that, when executed by one or more processors, direct the one or more processors to perform operations comprising:
receiving, at the agent service, a request to create a digital assistant for a user, the request comprising an artifact and further comprising information associated with a set of parameters for the digital assistant;
generating, at the agent service, the digital assistant by processing the artifact and the information associated with the set of parameters, wherein the processing the artifact and the information associated with the set of parameters comprises:
communicating with an artificial intelligence (AI) service to analyze the artifact and the information associated with the set of parameters;
generating an AI prompt based on the analysis of the artifact and the information associated with the set of parameters; and
training the digital assistant using the generated AI prompt;
with a unified multichannel communication (UMC) service, initializing a UMC thread for a UMC session involving the digital assistant and a user;
with the UMC service, attaching, to the UMC thread, a first communication channel having a first data type and a second communication channel having a second data type different than the first data type, wherein the attaching includes:
retrieving, based on a thread identifier of the UMC thread, a thread metadata record for the UMC thread;
storing, in the thread metadata record for the UMC thread, a first communication channel identifier for the first communication channel;
storing, in the thread metadata record for the UMC thread, a second communication channel identifier for the second communication channel; and
storing, in the thread metadata record for the UMC thread, at least one user identifier for the user and at least one user identifier for the digital assistant, wherein the at least one user identifier for the user include a first channel-specific user identifier for the user on the first communication channel and a second channel-specific user identifier for the user on the second communication channel, and wherein the at least one user identifier for the digital assistant include a first channel-specific user identifier for the digital assistant on the first communication channel and a second channel-specific user identifier for the digital assistant on the second communication channel; and processing a first communication message, from the user to the digital assistant, communicated over the first communication channel and a second communication message, from the user to the digital assistant, communicated over the second communication channel, wherein the thread metadata record continues to associate the digital assistant with the UMC thread when the user switches between the first communication channel and the second communication channel.

19. A computer system comprising a processing system and memory, wherein the computer system is configured to perform operations comprising:

receiving, at the agent service, a request to create a digital assistant for a user, the request comprising an artifact and further comprising information associated with a set of parameters for the digital assistant;

generating, at the agent service, the digital assistant by processing the artifact and the information associated with the set of parameters, wherein the processing the artifact and the information associated with the set of parameters comprises:

communicating with an artificial intelligence (AI) service to analyze the artifact and the information associated with the set of parameters;

generating an AI prompt based on the analysis of the artifact and the information associated with the set of parameters; and training the digital assistant using the generated AI prompt;

with a unified multichannel communication (UMC) service, initializing a UMC thread for a UMC session involving the digital assistant and a user;

with the UMC service, attaching, to the UMC thread, a first communication channel having a first data type and a second communication channel having a second data type different than the first data type, wherein the first communication channel is a chat communication channel or a Short Message Service ("SMS") communication channel, wherein the second communication channel is a voice calling communication channel, a video calling communication channel, a social media communication channel, or an email communication channel, and wherein the attaching includes:

retrieving, based on a thread identifier of the UMC thread, a thread metadata record for the UMC thread;

storing, in the thread metadata record for the UMC thread, a first communication channel identifier for the first communication channel;

storing, in the thread metadata record for the UMC thread, a second communication channel identifier for the second communication channel; and storing, in the thread metadata record for the UMC thread, at least one user identifier for the user and at least one user identifier for the digital assistant; and processing a first communication message, from the user to the digital assistant, communicated over the first communication channel and a second communication message, from the user to the digital assistant, communicated over the second communication channel, wherein the thread metadata record continues to associate the digital assistant with the UMC thread when the user switches between the first communication channel and the second communication channel.

20. The computer system of claim 19, wherein the processing the first communication message and the second communication message includes:

receiving, at the UMC service, the first communication message;

adding, to the UMC thread, event data for the first communication message;

receiving, at the UMC service, the second communication message;

converting event data for the second communication message from the second data type to the first data type; and adding, to the UMC thread, the converted event data for the second communication message.

* * * * *